United States Patent
Kazuhisa et al.

(10) Patent No.: US 7,291,402 B2
(45) Date of Patent: Nov. 6, 2007

(54) SURFACE-TREATED STEEL SHEETS OF GOOD WHITE RUST RESISTANCE, AND METHOD FOR PRODUCING THEM

(75) Inventors: Okai Kazuhisa, Tokyo (JP); Akira Matsuzaki, Tokyo (JP); Naoto Yoshimi, Tokyo (JP); Takahiro Kubota, Tokyo (JP); Masaaki Yamashita, Tokyo (JP); Hisato Noro, Tokyo (JP); Haruo Nakamichi, Tokyo (JP); Kaoru Sato, Tokyo (JP); Hiroyasu Matsuki, Hiratsuka (JP); Reijiro Nishida, Hiratsuka (JP); Masahiro Murata, Hiratsuka (JP); Shoichi Tanaka, Hiratsuka (JP); Yoshikazu Morohoshi, Hiratsuka (JP); Shingo Amaki, Hiratsuka (JP)

(73) Assignees: JFE Steel Corporation, Tokyo (JP); Kansai Paint Co., Ltd., Hyogo (JP)

( * ) Notice: Subject to any disclaimer, the term of this patent is extended or adjusted under 35 U.S.C. 154(b) by 0 days.

(21) Appl. No.: 10/515,303

(22) PCT Filed: Feb. 14, 2003

(86) PCT No.: PCT/JP03/01531

§ 371 (c)(1),
(2), (4) Date: Jan. 24, 2005

(87) PCT Pub. No.: WO2004/009870

PCT Pub. Date: Jan. 29, 2004

(65) Prior Publication Data
US 2005/0147832 A1 Jul. 7, 2005

(30) Foreign Application Priority Data
Jul. 23, 2002 (JP) .............................. 2002-214579

(51) Int. Cl.
| B32B 15/08 | (2006.01) |
| B32B 15/092 | (2006.01) |
| B32B 15/18 | (2006.01) |
| B32B 15/20 | (2006.01) |
| B05D 3/02 | (2006.01) |

(52) U.S. Cl. ............... 428/626; 428/632; 428/653; 428/659; 428/681; 428/215; 428/336; 428/418; 428/447; 428/457; 428/469; 427/372.2; 427/384; 427/385.5; 427/388.1

(58) Field of Classification Search ............... 428/632, 428/633, 626, 624, 625, 650, 653, 658, 659, 428/681, 213, 215, 336, 413, 414, 416, 418, 428/447, 448, 450, 457, 469, 472, 699, 704, 428/702; 427/372.2, 384, 385.5, 386, 388.1, 427/388.4

See application file for complete search history.

(56) References Cited

U.S. PATENT DOCUMENTS

| 5,693,371 A | * | 12/1997 | Rodzewich et al. ...... 427/421.1 |
| 6,509,099 B1 | * | 1/2003 | Urata et al. ............... 428/423.1 |
| 6,562,474 B1 | | 5/2003 | Yoshimi et al. .......... 428/472.3 |
| 2003/0072962 A1 | * | 4/2003 | Matsuzaki et al. .......... 428/623 |
| 2004/0054044 A1 | * | 3/2004 | Bittner et al. ............... 524/261 |

FOREIGN PATENT DOCUMENTS

| JP | 7-216268 | | 8/1995 |
| JP | 8-325760 | | 12/1996 |
| JP | 10-80664 | | 3/1998 |
| JP | 11-106945 | | 4/1999 |
| JP | 2968959 | | 8/1999 |
| JP | 11-256096 | | 9/1999 |
| JP | 2000-34578 | | 2/2000 |
| JP | 2000-119879 | | 4/2000 |
| JP | 2000-144443 | * | 5/2000 |
| JP | 2000-144444 | | 5/2000 |
| JP | 2000-160353 | * | 6/2000 |
| JP | 2000-199076 | | 7/2000 |
| JP | 2000-248380 | | 9/2000 |
| JP | 2000-281946 | | 10/2000 |
| JP | 2000-319787 | | 11/2000 |
| JP | 2001-158969 | | 6/2001 |
| JP | 2001-214283 | * | 8/2001 |
| JP | 2001-335954 | | 12/2001 |

| WO | 96/07772 | 3/1996 |
| WO | 98/16324 | 4/1998 |
| WO | WO 01/92602 | * 12/2001 |
| WO | 02/31222 | 4/2002 |

OTHER PUBLICATIONS

Copy of the European communication dated Sep. 13, 2005.

* cited by examiner

*Primary Examiner*—Michael E. Lavilla
(74) *Attorney, Agent, or Firm*—Nields & Lemack

(57) ABSTRACT

The invention is to provide a surface-treated steel sheet of good white rust resistance with no chromium in its surface treatment film, and it has realized a surface-treated steel sheet of higher-level corrosion resistance by forming a reaction layer of plating metal with a barrier layer effective for anticorrosion not in a two-layered film but in a single-layered film. The surface-treated steel sheet is fabricated by applying a surface-treating composition that contains:

(a) a water-dispersible resin and/or a water-soluble resin obtained through reaction of an epoxy group-containing resin (A) with an active hydrogen-containing compound (B) a part or all of which is an active hydrogen-containing hydrazine derivative and preferably with a hydrophilic organic component (C), (b) a silane coupling agent, (c) a phosphoric acid and/or a hexafluoro-metal acid, and (d) preferably an aqueous dispersion of an urethane resin, to a zinc-plated or aluminium-plated steel sheet followed by drying it to form thereon a surface treatment film having a thickness of from 0.02 to 5 μm. Regarding its film structure, the surface treatment film comprises an amorphous compound layer containing P, Zn and/or Al, and O, and an overlying organic resin matrix layer where the matrix is a hydrazine derivative-modified epoxy group-containing resin or the epoxy group-containing resin and an urethane resin.

33 Claims, 4 Drawing Sheets

SURFACE-TREATED STEEL SHEETS OF GOOD WHITE RUST RESISTANCE, AND METHOD FOR PRODUCING THEM

TECHNICAL FIELD

The present invention relates to surface-treated steel sheets most suitable for application to vehicles, electric and electronic appliances for household use and construction materials, and in particular to environment-friendly, surface-treated steel sheets for which the surface-treating composition as well as the surface treatment film contains no chromium, and to a method for producing them.

BACKGROUND ART

For application to electric and electronic appliances for household use, construction materials and vehicles, heretofore widely used are chromate-treated steel sheets that are fabricated by treating the surfaces of zinc-plated steel sheets or aluminium-plated steel sheets with a surface-treating agent comprising, as the essential ingredient, chromic acid, bichromic acid or its salt for improving the corrosion resistance (white rust resistance, red rust resistance) of the steel sheets. The chromate treatment is a relatively simple and economical method for forming films of good corrosion resistance.

In such chromate treatment, used is hexavalent chromium, a substance of which the use is controlled for antipollution. The hexavalent chromium is post-treated in a closed system, in which it is completely reduced and collected, and is therefore not discharged out into the natural world, and, in addition, the chromium release from chromate films can be almost zero owing to the sealing action of the organic films. Accordingly, the environment and human bodies are not substantially polluted by hexavalent chromium. However, from the recent global environmental problems, a tendency toward self-imposed restraints on the use of heavy metals including hexavalent chromium is increasing. In addition, for protecting the environment from pollution by dumped shredder dust of wastes, a movement of not using as much as possible heavy metals or reducing them in products has begun.

Given that situation, many proposals of chromium-free technology with no chromate treatment have been made for preventing white rust formation on zinc-plated steel sheets. For example, steel sheets are dipped in, or coated with or electrolyzed in a solution of an inorganic compound, an organic compound, an organic polymer material or a combination of any of them to thereby form a thin film thereon. Concretely, the following methods may be employed.

(1) A method of dipping steel sheets in a processing solution that comprises a polyphenol-carboxylic acid such as tannic acid and a silane coupling agent, or applying the processing solution to them to thereby form a film on them (e.g., JP-A 7-216268, Japanese Patent 2,968,959).

(2). A method of using a processing solution that is prepared by adding a polyphenol-carboxylic acid such as tannic acid or a phosphoric acid compound to an organic resin, for forming a film (e.g., JP-A 8-325760, 2000-34578, 2000-199076, 2000-248380).

(3) A method of applying a processing solution that is prepared by mixing an organic resin and a silane coupling agent, onto steel sheets (e.g., JP-A 10-80664).

According to the above-mentioned method (1), steel sheets are treated with an aqueous solution that comprises a polyphenol-carboxylic acid, a silane coupling agent and optionally a metal ion. One example of the method is described in JP-A 7-216268. The method ensures good adhesiveness of the film to steel sheets, but is defective in that the corrosion resistance of the film is not enough.

For the method (2), for example, JP-A 8-325760 discloses a method of processing steel sheets with a processing solution that comprises a polyphenol-carboxylic acid, an organic resin and a metal ion. JP-A 2000-34578 discloses a method of dipping steel sheets in a processing solution that comprises an organic resin and a phosphoric acid compound, or applying the processing solution to steel sheets, followed by drying the thus-processed steel sheets. The protective films formed from these processing solutions could be effective in some degree for improving the corrosion resistance of steel, but they could not attain high-level corrosion resistance like chromate treatment.

For the method (3), JP-A 10-80664 discloses a method of applying a processing solution that is prepared by mixing an organic resin and a silane coupling agent, to steel to thereby form a film thereon. In the processing solution, however, the silane coupling agent is not satisfactorily active on an inert metal surface and therefore the adhesiveness and the corrosion resistance of the film formed are unsatisfactory.

DISCLOSURE OF THE INVENTION

An object of the invention is to solve the problems with related art mentioned above, and to provide a surface-treated steel sheet which does not contain a heavy metal such as chromium in the surface treatment film and which has excellent corrosion resistance.

Another object of the invention is to provide a method of economically and stably producing a surface-treated steel sheet, in which the surface-treated steel sheet produced has excellent corrosion resistance as above.

To solve the above-mentioned problems, we, the present inventors have studied the principle of corrosion retardation for preventing corrosion of plated steel sheets, as follows:

The corrosion of zinc-plated steel sheets that are coated with a surface treatment film proceeds as follows:

(1) Corrosive factors (oxygen, water, chloride ion, etc.) penetrate into the surface treatment film, and these diffuse in the interface between the metal film/surface treatment film.

(2) In the interface of metal film/surface treatment film, zinc dissolves according to the following redox reaction.

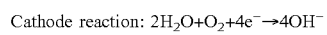

Cathode reaction: $2H_2O+O_2+4e^- \rightarrow 4OH^-$

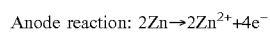

Anode reaction: $2Zn \rightarrow 2Zn^{2+}+4e^-$

Accordingly, for improving the corrosion resistance of zinc-plated steel sheets, it is indispensable to stop the progress of both the reactions of above (1) and (2). For it, the coating film is so designed as to have any of the following:

<1> a high-performance barrier layer capable of being a barrier against diffusion of the corrosive factors (this essentially acts to inhibit the cathode reaction), <2> a reaction layer with the plating metal that inactivates the surface layer of the metal film (this essentially acts to inhibit the anode reaction).

More preferably, it is the most effective that the film structure is enough for self-repairing for any defect in the reaction layer.

We, the present inventors have found that, when the film structure is realized in a single-layered film formed in one coating, not in the two-layered film that is formed through coating separately with the barrier layer-coating composition and with the reaction layer-coating composition, as in the related art, concretely when the barrier layer <1> (this is an organic resin matrix layer to be mentioned hereinunder) is formed in the upper part of the film and the reaction layer <2> (this is an amorphous compound layer to be mentioned hereinunder) is formed in the lower part thereof, more preferably when a substance that may act for self-repairing in the film is additionally deposited in the film, then the film ensures remarkably-improved corrosion resistance owing to the synergistic effects of these therein. Now that the single-layered film of the type is defined as a pseudo-two-layered film, there is no definite interface between the barrier layer and the reaction layer in the pseudo-two-layered film, as in the two-layered film formed through ordinary two coating operations. It is rather believed that, when the two are specifically modified to have an inclined composition profile therein, then the pseudo-two-layered film may exhibit high-level corrosion resistance which ordinary single-layer coating could not attain.

We, the present inventors have assiduously studied and, as a result, have further found that the above-mentioned pseudo-two-layered film may be formed by applying a surface-treating composition, which is prepared by adding a silane coupling agent and a specific acid component (phosphoric acid and/or hexafluoro-metal acid) to a water-dispersible resin and/or a water-soluble resin obtained through reaction of an epoxy group-containing resin with an active hydrogen-containing compound a part or all of which is an active hydrogen-containing hydrazine derivative, to a zinc-plated or aluminium-plated steel sheet followed by drying it.

Heretofore, it is known that a silane coupling agent is effective for improving the adhesiveness between an organic compound and an inorganic compound, and the agent can increase the adhesiveness of a water-dispersible or water-soluble resin to a plating metal. The effect of the silane coupling agent in the invention will differ from the known effect thereof as above. In the invention, it is believed that the acid component in the surface-treating composition etches the metal film surface to activate it, and the silane coupling agent therein chemically bonds to both the activated plating metal and the film-forming resin, to thereby ensure extremely excellent adhesiveness of the film-forming resin to the plating metal. Specifically, both a silane coupling agent and a specific acid component are added to the surface-treating composition in the invention, and it is believed that the adhesiveness between the plating metal and the film-forming resin may be thereby remarkably increased to improve the corrosion resistance of the plating metal, as compared with the case of single addition of a silane coupling agent alone to the surface-treating composition.

In the invention, the mechanism of forming the pseudo-two-layered film having the film structure as above is not completely clarified as yet, but there is a probability that the reaction between the acid component in the surface-treating composition with the surface of the metal film may participate in the film formation. On the other hand, the following effect of the silane coupling agent in the composition may be taken into consideration. Specifically, since the silane coupling agent having hydrolyzed in an aqueous solution has a silanol group (Si—OH), the hydrogen-bonding adsorption of the silane coupling agent to the surface of the metal activated by the acid component is thereby promoted, and the silane coupling agent is concentrated in the surface of the plating metal. When dried after this, there occurs dehydrating condensation to give a strong chemical bond, and the lower reaction layer of the film is thereby formed while the upper barrier layer of a concentrated water-dispersible resin and/or a water-soluble resin is formed as well. This is one probable mechanism of the pseudo-two-layer formation in the invention. Further, it is possible that the above described actions work together to form the pseudo-two-layer in the invention. In addition, it may also be considered that, in the process of film formation, a reaction product (compound) of the melted plating metal such as zinc and the acid component may deposit in the film formed.

The corrosion-resisting mechanism of the pseudo-two-layered film is not also completely clarified as yet, but the individual corrosion-resisting mechanism may be as follows: (a) The barrier layer <1> is of a dense, organic polymer film formed of an epoxy group-containing resin and a hydrazine derivative added thereto, and this prevents the penetration of corrosive factors (oxygen, water, chloride ion, etc.) through it to effectively inhibit the cathodic reaction that causes corrosion; (b) the free hydrazine derivative in the film traps the metal ions having been released from the metal film through corrosion reaction to thereby form a stable insoluble chelate compound layer; (c) the reaction layer <2> inactivates the metal film surface layer to thereby effectively inhibit the anode reaction that causes corrosion; (d) the self-constructed compounds having deposited in the film dissolves under a corrosive environment to form an acid component (phosphate ion, etc.), and the acid component exhibits self-repairing to trap the metal ion such as zinc ion having been released from the metal film (by bonding to the metal ion to form an insoluble compound); (e) the silane coupling agent firmly bonds to the plating metal surface that has been activated by the acid component, to thereby inhibit the dissolution of the metal, while, on the other hand, it also bonds to the film-forming resin to thereby form a dense film of high adhesiveness. These will be combined to give a composite corrosion-resisting mechanism of exhibiting extremely excellent corrosion resistance (white rust resistance).

We, the present inventors have further found that, when an aqueous dispersion of a modified epoxy resin that is obtained through reaction with a specific hydrophilic organic component is combined with the epoxy group-containing resin and the active hydrogen-containing hydrazine derivative for the water-dispersible resin to be added to the surface-treating composition, more preferably when the aqueous epoxy resin dispersion further contains an aqueous dispersion of an urethane resin along with the silane coupling agent and the specific acid component mentioned above, then the film formed of the composition ensures especially excellent white rust resistance.

In addition, we have still further found that, when a water-soluble inorganic compound and a chromium-free antirust additive are added to the surface-treating composition, then the film formed of the composition ensures further more excellent white rust resistance, especially that even after degreasing with alkali.

The present invention has been made on the basis of the above-mentioned findings, and includes surface-treated steel sheets of the following three basic aspects [1] to [3]:

[1] A surface-treated steel sheet of good white rust resistance, which is fabricated by applying a surface-treating composition that contains:

(a) a water-dispersible resin and/or a water-soluble resin obtained through reaction of an epoxy group-containing resin (A) with an active hydrogen-containing compound (B) a part or all of which is an active hydrogen-containing hydrazine derivative, (b) a silane coupling agent, and
(c) a phosphoric acid and/or a hexafluoro-metal acid, to a zinc-plated or aluminium-plated steel sheet followed by drying it to form thereon a surface treatment film having a thickness of from 0.02 to 5 μm.

[2] A surface-treated steel sheet of good white rust resistance, which is fabricated by applying a surface-treating composition that contains:
(a1) an aqueous epoxy resin dispersion of a modified epoxy resin dispersed in water, in which the modified epoxy resin is prepared by reacting an epoxy group-containing resin (A), an active hydrogen-containing compound (B) a part or all of which is an active hydrogen-containing hydrazine derivative, and a hydrophilic organic component (C),
(b) a silane coupling agent, and
(c) a phosphoric acid and/or a hexafluoro-metal acid, to a zinc-plated or aluminium-plated steel sheet followed by drying it to form thereon a surface treatment film having a thickness of from 0.02 to 5 μm.

[3] A surface-treated steel sheet of good white rust resistance, which is fabricated by applying a surface-treating composition that contains:
(a1) an aqueous epoxy resin dispersion of a modified epoxy resin dispersed in water, in which the modified epoxy resin is prepared by reacting an epoxy group-containing resin (A), an active hydrogen-containing compound (B) a part or all of which is an active hydrogen-containing hydrazine derivative, and a hydrophilic organic component (C),
(b) a silane coupling agent,
(c) a phosphoric acid and/or a hexafluoro-metal acid, and
(d) an aqueous dispersion of an urethane resin, to a zinc-plated or aluminium-plated steel sheet followed by drying it to form thereon a surface treatment film having a thickness of from 0.02 to 5 μm.

The surface treatment film in these surface-treated steel sheets [1] to [3] contains no Cr. Preferred embodiments of the surface treatment film (and the surface-treating composition to form it) in these surface-treated steel sheets are mentioned below.

The hydrophilic organic component (C) for the surface-treated steel sheets [2] and [3] is especially preferably the following:
(i) A polyalkylene glycol-modified epoxy resin obtained by reacting a polyalkylene glycol having a number-average molecular weight of from 400 to 20000, a bisphenol-type epoxy resin, an active hydrogen-containing compound, and a polyisocyanate compound;
(ii) a primary amine compound and/or a secondary amine compound.

For the surface-treated steel sheets of above [1] to [3], the surface-treating composition to form the surface treatment film preferably contains from 1 to 30 parts by mass, relative to 100 parts by mass of the solid content of the organic resin therein, a silane coupling agent, and from 0.1 to 80 parts by mass, relative to 100 parts by mass of the solid content of the organic resin therein, a phosphoric acid and/or a hexafluoro-metal acid.

For attaining better white rust resistance, the surface-treating composition preferably contains from 0.1 to 60 parts by mass, relative to 100 parts by mass of the solid content of the organic resin therein, a water-soluble inorganic component. More preferably, the cation of the water-soluble inorganic component is one or more selected from Mg, Ca, Y, Ti, Zr, Nb, Zn, Mn, Co, Ni, Zn, Al, In, Ce and La; and the anion thereof is one or more selected from nitrate, sulfate, acetate, carbonate, phosphate and chloride.

From the same viewpoint as above, the surface-treating composition preferably contains from 0.1 to 50 parts by mass, relative to 100 parts by mass of the solid content of the organic resin therein, a chromium-free antirust additive. More preferably, the chromium-free antirust additive is one or more selected from the following groups (e1) to (e5):
(e1) silicon oxide,
(e2) calcium and/or calcium compounds,
(e3) hardly-soluble phosphoric acid compounds,
(e4) molybdic acid compounds,
(e5) one or more, S atom-containing organic compounds selected from triazoles, thiols, thiadiazoles, thiazoles and thiurams.

Of those, more preferred is calcium ion-exchanged silica for the chromium-free antirust additive.

For attaining better workability, the surface-treating composition preferably contains from 1 to 50 parts by mass, relative to 100 parts by mass of the solid content of the organic resin therein, a solid lubricant.

Preferably, the silane coupling agent to be in the surface-treating composition has a reactive functional amino group, as highly reactive with aqueous resins. Also preferably, the hexafluoro-metal acid to be in the surface-treating composition contains at least one element selected from Ti, Si and Zr.

The epoxy group-containing resin (A) for the aqueous resin (a) and (a1) to be the base resin in the surface-treating composition is preferably a bisphenol A-type epoxy resin having a number-average molecular weight of from 1500 to 10000 and an epoxy equivalent of from 150 to 5000. In case where the aqueous resin is an aqueous epoxy resin dispersion, it preferably contains a curing agent that has a group capable of crosslinking with a hydroxyl group.

In the invention, the film structure of the surface treatment film to be formed on the surface of a zinc-plated or aluminium-plated steel sheet is composed of an amorphous compound layer that contains P, Zn and/or Al, and O, and an organic resin matrix layer which overlies it and of which the matrix is a hydrazine derivative-modified, epoxy group-containing resin or a combination of the modified epoxy group-containing resin and an urethane resin. In general, the surface treatment film contains a silane compound that is derived from the silane coupling agent in the surface-treating composition.

For attaining better white rust resistance, the surface treatment film preferably contains self-constructed compounds that contains P, Zn and/or Al, and O, more preferably a self-constructed compounds that contains P, Zn and/or Al, Si, and O.

In case where the plated steel sheet is a zinc-plated steel sheet, the molar ratio of Zn to P, [Zn]/[P] in the amorphous compound layer of the surface treatment film falls between 0.9 and 1.4. Similarly, the molar ratio of Zn to P, [Zn]/[P] in the self-constructed compounds in the surface treatment film generally falls between 0.9 and 1.4. However, when the molar ratio of Zn to P, [Zn]/[P] in the self-constructed compounds is smaller than 1.0, the white rust resistance of the film may be further better.

When containing the above-mentioned chromium-free antirust additive and solid lubricant, the surface treatment film ensures better white rust resistance and better workability.

The surface-treated steel sheets of the invention may have an organic resin film formed on the above-mentioned surface treatment film. In this case, it is desirable that the thickness of the surface treatment film is from 0.02 μm to smaller than 5 μm, the thickness of the overlying organic resin film is from 0.02 μm to smaller than 5 μm, and the total thickness of the surface treatment film and the organic resin film is at most 5 μm, from the viewpoint of the electroconductivity and the workability of the steel sheets.

One preferred method of fabricating the surface-treated steel sheets of the invention comprises controlling the pH of the surface-treating composition as above to fall between 0.5 and 6, applying the composition to a zinc-plated or aluminium-plated steel sheet, and, not washing it with water, drying it under heat at an ultimate sheet temperature of from 50° C. to 300° C. to thereby form thereon a surface treatment film having a thickness of from 0.02 to 5 μm.

In case where a surface-treated steel sheet that has an organic resin film on the surface treatment film is fabricated, it is desirable that the surface treatment film having a thickness of from 0.02 μm to smaller than 5 μm is first formed on the surface of a plated steel sheet, and then an organic resin film having a thickness of from 0.02 μm to smaller than 5 μm is formed thereon so that the total thickness of the two films may be at most 5 μm.

Though not containing chromium in its coating film, the surface-treated steel sheets of the invention have extremely excellent corrosion resistance and their film appearance and adhesiveness to paint are also good.

DETAILED DESCRIPTION OF THE INVENTION

Figure 1:
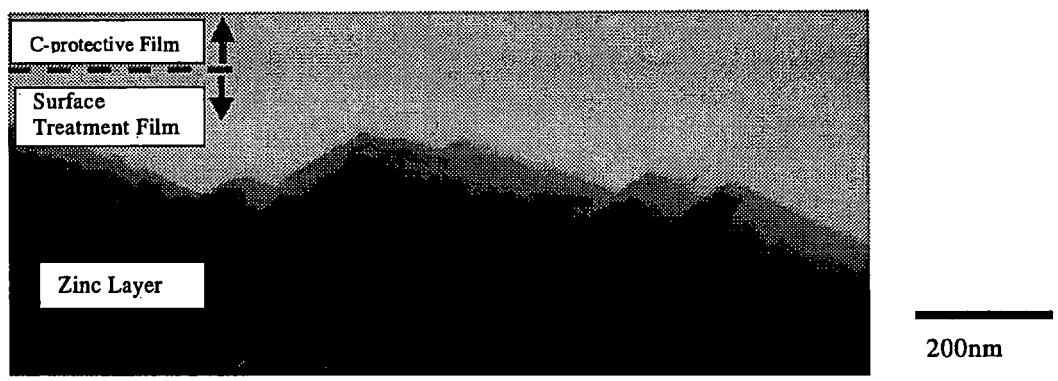
FIG. 1 is an enlarged electromicroscopic picture of the cross-section texture of the surface treatment film of a comparative sample in [Example 5].

The details of the invention and the reasons for defining the invention are described below.

The zinc-plated steel sheet which is the base of the surface-treated steel sheets of the invention includes zinc alone-plated steel sheets, Zn—Ni alloy-plated steel sheets, Zn—Fe alloy-plated steel sheets (electroplated steel sheets and alloying hot zinc-plated steel sheets), Zn—Cr alloy-plated steel sheets, Zn—Mn alloy-plated steel sheets, Zn—Co alloy-plated steel sheets, Zn—Co—Cr alloy-plated steel sheets, Zn—Cr—Ni alloy-plated steel sheets, Zn—Cr—Fe alloy-plated steel sheets, Zn—Al alloy-plated steel sheets (e.g., Zn-5% Al alloy-plated steel sheets, Zn-55% Al alloy-plated steel sheets), An-Mg alloy-plated steel sheets, Zn—Al—Mg alloy-plated steel sheets (e.g., Zn-6% Al-3% Mg alloy-plated steel sheets, Zn-11% Al-3% Mg alloy-plated steel sheets), and other zinc composite-plated steel sheets in which the plating film contains any of metal oxides, polymers and others dispersed therein (e.g., Zn—$SiO_2$ dispersion-plated steel sheets), etc.

Also employable are multi-layer-plated steel sheets with two or more of the same or different layers as above.

The aluminium-plated steel sheet which is also the base of the surface-treated steel sheets of the invention includes aluminium alone-plated steel sheets, Al—Si alloy-plated steel sheets, etc.

If desired, nude steel sheets may be pre-plated with thin Ni, and then plated in the manner as above to give the plated steel sheets.

For plating steel sheets, employable is any practicable method of an electroplating method (in an aqueous solution or in an non-aqueous solution), a hot-dip plating method and a vapor-phase plating method.

For preventing it from being blackened (blackening resistance), the plating film may have from 0.1 to 2000 ppm or so of at least one minor element of Ni, Co and Fe deposited therein, or its surface may be processed with an aqueous alkaline or acidic solution that contains at least one of Ni, Co and Fe to thereby make the element deposit in its surface. For attaining both better corrosion resistance and better blackening resistance, for example, an aqueous solution comprising, as the essential ingredient, a condensed phosphoric acid, Nihon Parkerizing's CL-342 (trade name) may be used, and the content of at least one of Ni, Co and Fe in the aqueous solution is preferably from 0.5 to 50 ppm, more preferably at least from 1 to 20 ppm. For better appearance of the steel sheets, it is desirable that the concentration of the agent, CL-342 is from 5 to 50 g/liter, more preferably from 10 to 30 g/liter.

Next described are the surface treatment film formed on the surface of the zinc-plated or aluminium-plated steel sheet, and the surface-treating composition for forming the film.

In the invention, the surface treatment film formed on the surface of the zinc-plated or aluminium-plated steel sheet to be the surface-treated steel sheets of the invention is one formed by applying a surface-treating composition that contains:

(a) a water-dispersible resin and/or a water-soluble resin obtained through reaction of an epoxy group-containing resin (A) with an active hydrogen-containing compound (B) a part or all of which is an active hydrogen-containing hydrazine derivative, (b) a silane coupling agent, and (c) a phosphoric acid and/or a hexafluoro-metal acid, onto a plated steel sheet followed by drying it. The surface treatment film contains no Cr.

First described is the epoxy group-containing resin (A) and the active hydrogen-containing compound (B) that are to form the water-dispersible or water-soluble resin for the component (a)

The epoxy group-containing resin (A) has at least one epoxy group in the molecule, including, for example, epoxy resins, modified epoxy resins, acrylic copolymer resins obtained through copolymerization of an epoxy group-containing monomer with any other monomer, epoxy group-having polybutadiene resins, epoxy group-having polyurethane resins and adducts and condensates of these resins. One or more of these may be used herein either singly or as combined.

The epoxy resins includes aromatic epoxy resins that are prepared by reacting a polyphenol such as bisphenol A, bisphenol F or novolak-type phenol with an epihalohydrin such as epichlorohydrin to introduce a glycidyl group into the resulting reaction products, or by further reacting the glycidyl group-introduced reaction product with a polyphenol to thereby increase the molecular weight of the product; and aliphatic epoxy resins, alicyclic epoxy resins, etc. One or more of these may be used herein either singly or as combined. Especially when the film-forming composition is required to form films at low temperatures, it is desirable that the epoxy resins to be therein have a number-average molecular weight of at least 1500.

The modified epoxy resins are, for example, those modified by reacting various modifying agents with the epoxy group or the hydroxyl group in the above-mentioned epoxy resins. Concretely, they include epoxy-ester resins reacted with drying oil fatty acids; epoxy-acrylate resins modified with polymerizing unsaturated monomers that contain acrylic acid, methacrylic acid or the like; urethane-modified epoxy resins reacted with isocyanate compounds, etc.

The acrylic copolymer resins include those prepared through solution polymerization, emulsion polymerization or suspension polymerization of a polymerizing unsaturated monomer component that indispensably comprises an epoxy group-having unsaturated monomer and an acrylate or methacrylate. The polymerizing unsaturated monomer component includes, for example, C1-24 alkyl esters of acrylic acid or methacrylic acid such as methyl (meth)acrylate, ethyl (meth)acrylate, propyl (meth)acrylate, n-, iso- or tert-butyl (meth)acrylate, hexyl (meth)acrylate, 2-ethylhexyl (meth) acrylate, decyl (meth)acrylate, lauryl (meth)acrylate; acrylic acid, methacrylic acid, styrene, vinyltoluene, acrylamide, acrylonitrile, N-methylol(meth).acrylamide, C1-4 alkyl ethers of N-methylol(meth)acrylamide; N,N-diethylaminoethyl methacrylate, etc. Not specifically defined, the epoxy group-having unsaturated monomer may be any one having an epoxy group and a polymerizing unsaturated group, and it includes glycidyl methacrylate, glycidyl acrylate, 3,4-epoxycyclohexyl-1-methyl (meth)acrylate, etc.

The acrylic copolymer resins may be modified with any of polyester resins, epoxy resins, phenol resins, etc.

Especially preferably, the epoxy resins are reaction products of bisphenol A and epihalohydrin that are typically represented by the following chemical formula. These are especially favorable as having good corrosion resistance.

surface treatment film have high-level corrosion resistance. Specific examples of the active hydrogen-containing hydrazine derivative are mentioned below.

<1> Hydrazide compounds such as carbohydrazide, propionic acid hydrazide, salicylic acid hydrazide, adipic acid hydrazide, sebacic acid hydrazide, dodecanoic acid dihydrazide, isophthalic acid dihydrazide, thiocarbohydrazide, 4,4'-oxybisbenzenesulfonylhydrazide, benzophenonehydrazone, aminopolyacrylamide.

<2> Pyrazole compounds such as pyrazole, 3,5-dimethylpyrazole, 3-methyl-5-pyrazolone, 3-amino-5-methylpyrazole.

<3> Triazole compounds such as 1,2,4-triazole, 3-amino-1,2,4-triazole, 4-amino-1,2,4-triazole, 3-mercapto-1,2,4-triazole, 5-amino-3-mercapto-1,2,4-triazole, 2,3-dihydro-3-oxo-1,2,4-triazole, 1H-benzotriazole, 1-hydroxybenzotriazole (monohydrate), 6-methyl-8-hydroxytriazolopyridazine, 6-phenyl-8-hydroxytriazolopyridazine, 5-hydroxy-7-methyl-1,3,8-triazaindolidine.

<4> Tetrazole compounds such as 5-phenyl-1,2,3,4-tetrazole, 5-mercapto-1-phenyl-1,2,3,4-tetrazole.

<5> Thiadiazole compounds such as 5-amino-2-mercapto-1,3,4-thiadiazole, 2,5-dimercapto-1,3,4-thiadiazole.

<6> Pyridadine compounds such as maleic acid hydrazide, 6-methyl-3-pyridazone, 4,5-dichloro-3-pyridazone, 4,5-dibromo-3-pyridazone, 6-methyl-4,5-dihydro-3-pyridazone.

Of those, especially preferred are pyrazole compounds and triazole compounds having a 5-membered or 6-membered cyclic structure and having a nitrogen atom in the cyclic structure, in view of their good corrosion resistance.

One or more of the above-mentioned hydrazine derivatives may be used herein either singly or as combined.

In the invention, any other active hydrogen-containing compounds than such hydrazine derivatives may be used as a part of the active hydrogen-containing compound (B).

The active hydrogen-containing compounds except hydrazine derivatives are, for example, the following compounds. One or more of these may be used herein.

Active hydrogen-containing, primary or secondary amine compounds.

Ammonia and organic acids such as carboxylic acids.

Hydrogen halides such as hydrogen chloride.

Alcohols, and thiols.

A quaternating agent of a mixture of a hydrazine derivative having no active hydrogen or a tertiary amine with an acid.

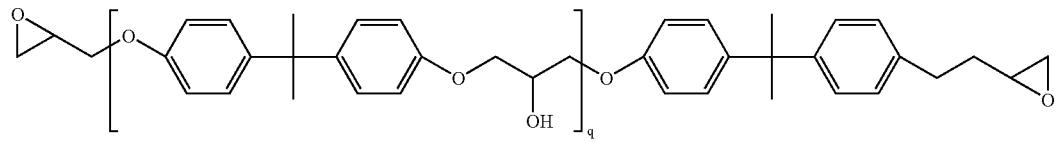

In the chemical structural formula, q indicates an integer of from 0 to 50, preferably an integer of from 1 to 40, more preferably an integer of from 2 to 20.

The bisphenol A-type epoxy resins may be obtained in any method well known in the art.

The active hydrogen-containing compound (B) a part or all of which is an active hydrogen-containing hydrazine derivative is an indispensable component for making the Typical examples of the active hydrogen-containing amine compounds are mentioned below.

(1) Aldimines, ketimines, oxazolines and imidazolines obtained through thermal modification of amine compounds having one secondary amino group and one or more primary amino groups, such as diethylenetriamine, hydroxyethylaminoethylamine, ethylaminoethylamine and methylaminopropylamine, at their primary amino group with any of ketones, aldehydes or carboxylic acids, for example, at a temperature of from 100 to 230° C. or so.
(2) Secondary monoamines such as diethylamine, diethanolamine, di-n- or -iso-propanolamine, N-methylethanolamine, N-ethylethanolamine.
(3) Secondary amine-containing compounds obtained through Michael addition reaction of monoalkanolamines such as monoethanolamine with dialkyl(meth)acrylamides.
(4) Ketimines obtained through modification of alkanolamines such as monoethanolamine, neopentanolamine, 2-aminopropanol, 3-aminopropanol and 2-hydroxy-2'-(aminopropoxy)ethyl ether, at their primary amine group.

In the above-mentioned quaternating agent that serves as a part of the active hydrogen-containing compound, the hydrazine derivative having no active hydrogen atom or the tertiary amine is not reactive with an epoxy group by itself, and therefore it is mixed with an acid so that the resulting mixture may be reactive with an epoxy group. The quaternating agent reacts with an epoxy group optionally in the presence of water to thereby form a quaternary salt with an epoxy group-having resin. The acid used for forming the quaternating agent may be any of an organic acid such as acetic acid or lactic acid, or an inorganic acid such as hydrochloric acid. The hydrazine derivative having no active hydrogen, which is used for forming the quaternating agent, may be, for example, 3,6-dichloropyridazine; and the tertiary amine includes, for example, dimethylethanolamine, triethylamine, trimethylamine, triisopropylamine and methyldiethanolamine.

The water-dispersible or water-soluble resin (a), which is a reaction product of the epoxy group-containing resin (A) with the active hydrogen-containing compound (B) a part or all of which is an active hydrogen-containing hydrazine derivative, may be obtained by reacting the epoxy group-containing resin (A) with the specific active hydrogen-containing compound (B) at 10 to 300° C., preferably at 50 to 150° C. for about 1 to 8 hours or so.

The reaction may be effected in the presence of an organic solvent, and the type of the organic solvent to be used is not specifically defined. For example, it includes ketones such as acetone, methyl ethyl ketone, methyl isobutyl ketone, dibutyl ketone, cyclohexanone; hydroxyl group-having alcohols and ethers such as ethanol, butanol, 2-ethylhexyl alcohol, benzyl alcohol, ethylene glycol, ethylene glycol monoisopropyl ether, ethylene glycol monobutyl ether, ethylene glycolmonohexyl ether, propylene glycol, propylene glycol monomethyl ether, diethylene glycol, diethylene glycol monoethyl ether, diethylene glycol monobutyl ether; esters such as ethyl acetate, butyl acetate, ethylene glycol monobutyl ether acetate; and aromatic hydrocarbons such as toluene, xylene. One or more of these may be used. Of those, especially preferred are ketone or ether solvents because of their good ability to dissolve epoxy resins and to form films.

The blend ratio of the active hydrogen-containing compound (B) a part or all of which is an active hydrogen-containing hydrazine derivative to the epoxy group-containing resin (A) preferably falls between 0.01 and 10, more preferably between 0.1 and 8, even more preferably between 0.2 and 4, in terms of the ratio of the number of the active hydrogen groups of the former to the number of the epoxy groups of the latter, [number of active hydrogen groups/ number of epoxy groups], in view of the corrosion resistance and the water dispersibility of the resin mixture.

The ratio of the active hydrogen-containing hydrazine derivative in the active hydrogen-containing compound (B) is preferably from 10 to 100 mol %, more preferably from 30 to 100 mol %, even more preferably from 40 to 100 mol %. If the ratio of the active hydrogen-containing hydrazine derivative is smaller than 10 mol %, the surface treatment film could not have a satisfactory antirust function, and its antirust effect will not significantly differ from the antirust effect of a mere mixture of a film-forming organic resin and a hydrazine derivative.

In the invention, one and the same type or two or more different types of the above-mentioned water-dispersible or water-soluble resins, which are the reaction products of the epoxy group-containing resin (A) with the active hydrogen-containing compound (B) a part or all of which is an active hydrogen-containing hydrazine compound, and are obtained in the manner as above, may be used either singly or as combined.

In the invention, it is desirable that a curing agent is added to the resin composition so that the film may be cured under heat to be a dense barrier film. The curing agent may be a polyisocyanate compound, an amino resin compound or the like.

The polyisocyanate compound has at least two isocyanate groups in one molecule, including, for example, aliphatic isocyanate compounds, alicyclic isocyanate compounds (including heterocyclic compounds), aromatic isocyanate compounds; and their derivatives obtained by partially reacting these isocyanate compounds with polyalcohols. A part or all of the isocyanate groups in these polyisocyanate compounds may be blocked with a blocking agent.

Examples of the polyisocyanate compounds are mentioned below.

<1> m- or p-phenylene diisocyanate, 2,4- or 2,6-tolylene diisocyanate, o- or p-xylylene diisocyanate, hexamethylene diisocyanate, dimer acid diisocyanate, isophorone diisocyanate.
<2> Reaction products of the compounds <1> alone or their mixtures with polyalcohols (dialcohols such as ethylene glycol, propylene glycol; trialcohols such as glycerin, trimethylolpropane; tetralcohols such as pentaerythritol; hexalcohols such as sorbitol, dipentaerythritol), in which at least two isocyanates still remain as such in one molecule.

One or more of these polyisocyanate compounds may be used herein either singly or as combined.

The blocking agent usable herein is, for example, as follows:
<1> Aliphatic monoalcohols such as methanol, ethanol, propanol, butanol, octyl alcohol.
<2> Monoethers of ethylene glycol and/or diethylene glycol, such as methyl, ethyl, propyl (n-, iso) and butyl (n-, iso) ethers thereof.
<3> Aromatic alcohols such as phenol, cresol.
<4> Oximes such as acetoxime, methyl ethyl ketonoxime.

One or more of these may be reacted with the above-mentioned polyisocyanate compounds to obtain polyisocyanate compounds that are stably protected at least at room temperature.

The amino resin compounds may be methylolated amino resins that are obtained through reaction of an amino component such as melamine, urea, benzoguanamine, acetoguanamine, steroguanamine, spiroguanamine or dicyandiamide, with an aldehyde. The aldehyde includes formaldehyde, paraformaldehyde, acetaldehyde and benzaldehyde. The methylolated amino resins may be etherified with suitable alcohol for use in the invention. Examples of the alcohol for etherification are methyl alcohol, ethyl alcohol, n-propyl alcohol, i-propyl alcohol, n-butyl alcohol, i-butyl alcohol, 2-ethylbutanol, 2-ethylhexanol. Of such amino resin compounds, especially preferred are methylolated melamine resins of which at least a part of the methylol groups are alkyl-etherified.

The blend ratio of the water-dispersible and/or water-soluble resin (a) to the curing agent (E), (a)/(E) preferably falls between 95/5 and 55/45, more preferably between-90/10 and 65/35 in terms of the solid content ratio by mass, in view of the adhesiveness and the top coat acceptability of the film.

The water-dispersible and/or water-soluble resin (a) may well crosslink in the presence of the above-mentioned crosslinking agent (curing agent), but for further enhancing its, low-temperature crosslinkability, it is desirable that a known curing promoter catalyst is added to the resin. In case where polyisocyanate compounds are used for the curing agent, the curing promoter catalyst for them may be, for example, any of N-ethylmorpholine, dibutyl tin dilaurate, cobalt naphthenate, stannous chloride, zinc naphthenate and bismuth nitrate. In case where amino resin compounds are used for the curing agent, for example, the curing promoter catalyst for them is preferably any of phosphoric acid, sulfonic acid compounds or amine-neutralized derivatives of sulfonic acid compounds. Typical examples of the sulfonic acid compounds are p-toluenesulfonic acid, dodecylbenzenesulfonic acid, dinonylnaphthalenesulfonic acid, dinonylnaphthalenedisulfonic acid. The amine for the amine-neutralized derivatives of sulfonic acid compounds may be any of primary amines, secondary amines or tertiary amines. For improving the physical properties such as adhesiveness of the films in some degree, any known acrylic, alkyd or polyester resin may be added to the epoxy group-containing resin.

For dispersing or dissolving the reaction product of the epoxy group-containing resin (A) and the specific active hydrogen-containing compound (B), for example, the following methods may be employed.

<1> The epoxy group of the epoxy group-containing resin is reacted with the dibasic acid or secondary amine of the active hydrogen-containing compound, then neutralized with a tertiary amine, acetic acid or phosphoric acid that serves as a neutralizing agent, and then dispersed in water.
<2> Using a modified epoxy resin (a') that is prepared by reacting an epoxy resin, a hydroxyl-terminated polyalkylene oxide such as polyethylene glycol or polypropylene glycol, and an isocyanate, the reaction products (A) and (B) are dispersed in water.
<3> The above <1> and <2> are combined.

In the methods of <2> and <3>, the ratio of the reaction product (a-) of the epoxy group-containing resin and the specific active hydrogen-containing compound (that is, the water-dispersible and/or water-soluble resin of the component (a)) to the modified epoxy resin (a'), (a)/(a') preferably falls between 90/5 and 60/40 (in terms of the weight ratio of the nonvolatile components), more preferably between 80/20 and 65/35. If the blend ratio of the reaction product (a), (a)/(a') is larger than 90/5, the resin could not well disperse and coarse resin particles may be formed to give defects in film formation, and, as a result, the film could not have the intended properties. If the blend ratio of the modified epoxy resin (a') oversteps (a)/(a')=60/40, it is unfavorable since the film may be too hydrophilic and its corrosion resistance may lower.

In addition to the above-mentioned specific water-dispersible and/or water-soluble resin, the surface-treating composition may additionally contain one or more other water-dispersible and/or water-soluble resins of, for example, acrylic resins, urethane resins, polyester resins, epoxy resins, ethylene resins, alkyd resins, phenolic resins and olefin resins, of which, however, the additional resin content must be at most 25% by mass of the overall solid resin content.

In the invention, an aqueous dispersion (a1) of a modified epoxy resin (aqueous epoxy resin dispersion) that is obtained through reaction of the epoxy group-containing resin (A) with the active hydrogen-containing compound (B) a part or all of which is an active hydrogen-containing hydrazine derivative, and further with a specific hydrophilic organic component (C) may be used for the water-dispersible resin (a) to be in the surface-treating composition, and it produces especially better white rust resistance.

The hydrophilic organic component (C) includes, for example, a specific polyalkylene glycol-modified epoxy resin (C1), and a primary amine compound and/or a secondary amine compound (C2).

First described is the specific polyalkylene glycol-modified epoxy resin (C1) for the hydrophilic organic component (C).

The polyalkylene glycol-modified epoxy resin (C1) is obtained through reaction of a polyalkylene glycol having a number-average molecular weight of from 400 to 20000, a bisphenol-type epoxy resin, an active hydrogen-containing compound, and a polyisocyanate compound.

The polyalkylene glycol includes, for example, polyethylene glycol, polypropylene glycol, polybutylene glycol. Of those, especially preferred is polyethylene glycol. The number-average molecular weight of the polyalkylene glycol is preferably from 400 to 20000, more preferably from 500 to 10000 in view of the water-dispersibility and the storability of the resin to be produced.

The bisphenol-type epoxy resin is a bisphenol compound having at least one epoxy group in one molecule. For it, especially preferred are bisphenol diglycidyl ethers that are obtained through condensation of bisphenol compounds with epihalohydrins (e.g., epichlorohydrin) as they give films of good flexibility and corrosion resistance.

Typical examples of the bisphenol compounds that are used for preparing the bisphenol-type epoxy resin are bis (4-hydroxyphenyl)-2,2-propane, bis(4-hydroxyphenyl)-1,1-ethane, bis (4-hydroxyphenyl) methane, 4,4'-dihydroxydiphenyl ether, 4,4'-dihydroxydiphenyl sulfone, bis(4-hydroxyphenyl)-1,1-isobutane, bis(4-hydroxy-3-t-butylphenyl)-2,2-propane. Of the epoxy resins produced from these bisphenol compounds, bisphenol A-type epoxy resins are especially preferred as giving films of good flexibility and corrosion resistance.

Preferably, the bisphenol-type epoxy resins have a number-average molecular weight of from approximately 310 to 10000, more preferably from approximately 320 to 2000 and have an epoxy equivalent of from approximately 155 to 5000, more preferably from approximately 160 to 1000, in view of the production stability in producing the polyalkylene glycol-modified epoxy resins.

The active hydrogen-containing compound is used for blocking the isocyanate group in the polyalkylene glycol-modified epoxy resin (C1). Its typical examples are monoalcohols such as methanol, ethanol, diethylene glycol monobutyl ether; monocarboxylic acids such as acetic acid, propionic acid; and monothiols such as ethylmercaptan. The other blocking agents (active hydrogen-containing compounds) are secondary amines such as diethylamine; aldimines, ketimines, oxazolines and imidazolines obtained through thermal modification of amine compounds having one secondary amino group or hydroxyl group and one or more primary amino groups, such as diethylenetriamine and monoethanolamine, at their primary amino group with any of ketones, aldehydes or carboxylic acids, for example, at a temperature of from 100 to 230° C. or so; oximes such as methylethyl ketoxime; and phenols such as phenol, nonylphenol. Preferably, these compounds have a number-average molecular weight of from 30 to 2000, more preferably from 30 to 200.

The polyisocyanate compound has at least 2, preferably 2 or 3 isocyanate groups in one molecule, and it may be any and every one generally used in production of polyurethane resins. The polyisocyanate compound of the type includes aliphatic, alicyclic and aromatic polyisocyanate compounds. Their typical examples are aliphatic polyisocyanate compounds such as hexamethylene diisocyanate (HMDI), biuret compound of HMDI, isocyanurate compound of HMDI; alicyclic polyisocyanate compounds such as isophorone diisocyanate (IPDI), biuret compound of IPDI, isocyanurate compound of IPDI, hydrogenated xylylene diisocyanate, hydrogenated 4,4'-diphenylmethane diisocyanate; and aromatic polyisocyanate compounds such as tolylene diisocyanate, xylylene diisocyanate.

The blend ratio of the components in producing the polyalkylene glycol-modified epoxy resin (C1) is preferably as follows:

Specifically, the equivalent ratio of the hydroxyl group in the polyalkylene glycol to the isocyanate group in the polyisocyanate compound preferably falls between 1/1.2 and 1/10, more preferably between 1/1.5 and 1/5, even more preferably between 1/1.5 and 1/3. The equivalent ratio of the hydroxyl group in the active hydrogen-containing compound to the isocyanate group in the polyisocyanate compound preferably falls between 1/2 and 1/100, more preferably between 1/3 and 1/50, even more preferably between 1/3 and 1/20. The equivalent ratio of the total amount of the hydroxyl groups in the polyalkylene glycol, the bisphenol-type epoxy resin and the active hydrogen-containing compound to the isocyanate group in the polyisocyanate compound is preferably at most 1/1.5, more preferably between 1/0.1 and 1/1.5, even more preferably between 1/0.1 and 1/1.1.

The polyalkylene glycol, the bisphenol-type epoxy resin, the active hydrogen-containing compound and the polyisocyanate compound may be reacted in any known method.

In case where the polyalkylene glycol-modified epoxy resin (C1) is used for the hydrophilic organic component (C), the modified epoxy resin for the aqueous epoxy resin dispersion (a1) may be obtained by reacting the epoxy group-containing resin (A), the polyalkylene glycol-modified epoxy resin (C1) and the active hydrogen-containing compound (B) a part or all of which is an active hydrogen-containing hydrazine derivative, and it is desirable that the reaction is effected generally at a temperature falling between 10 and 300° C., more preferably between 50 and 150° C., for about 1 to 8 hours or so.

For the epoxy group-containing resin (A) and the active hydrogen-containing compound (B) a part or all of which is an active hydrogen-containing hydrazine derivative, referred to are the same as those mentioned hereinabove.

The reaction may be effected in the presence of an organic solvent, and the type of the organic solvent to be used is not specifically defined. For example, the organic solvent includes ketones such as acetone, methyl ethyl ketone, methyl isobutyl ketone, dibutyl ketone, cyclohexanone; hydroxyl group-having alcohols and ethers such as ethanol, butanol, 2-ethylhexyl alcohol, benzyl alcohol, ethylene glycol, ethylene glycol monoisopropyl ether, ethylene glycol monobutyl ether, ethylene glycol monohexyl ether, propylene glycol, propylene glycol monomethyl ether, diethylene glycol, diethylene glycol monoethyl ether, diethylene glycol monobutyl ether; esters such as ethyl acetate, butyl acetate, ethylene glycol monobutyl ether acetate; and aromatic hydrocarbons such as toluene, xylene. One or more of these may be used herein. Of those, especially preferred are ketone or ether solvents because of their good ability to dissolve epoxy resins and to form films.

The blend ratio of polyalkylene glycol-modified epoxy resin (C1), the epoxy group-containing resin (A) and the active hydrogen-containing compound (B) a part or all of which is an active hydrogen-containing hydrazine derivative is preferably so controlled that the equivalent ratio of the active hydrogen group in the hydrazine derivative in the active hydrogen-containing compound (B) to the epoxy group in the polyalkylene glycol-modified epoxy resin (C1) and the epoxy group-containing resin (A) falls between 0.01 and 10, more preferably between 0.1 and 8, even more preferably between 0.2 and 4, in view of the corrosion resistance of the film and the dispersibility in water of the resin.

Two or more different types of the modified epoxy resins that are obtained through reaction of the above-mentioned components (A) (B) and (C1) or the aqueous epoxy resin dispersions that are prepared by dispersing the resins may be used herein as combined.

Next described is a case of using a primary amine compound and/or a secondary amine compound (C2) for the hydrophilic organic component (C).

Specific examples of the primary or secondary amine compound are primary amine compounds such as monoethylamine, mono-n- or iso-propylamine, mono-n- or iso-butylamine, monoethanolamine, neopentanolamine, 2-aminopropanol, 3-aminopropanol, 2-hydroxy-2'-(aminopropoxy)ethyl ether; and secondary amines such as diethylamine, dibutylamine, methylethylamine, diethanolamine, di-n- or iso-propanolamine, N-methylethanolamine, N-ethylethanolamine. One or more of these primary amine compounds and secondary amine compounds may be used either singly or as combined. Of those, especially preferred is diethanolamine in view of the easiness in controlling its reaction and of its dispersibility in water.

In case where the primary amine compound and/or the secondary amine compound (C2) is used for the hydrophilic organic component (C), the modified epoxy resin for the aqueous epoxy resin dispersion (a1) may be prepared by reacting the epoxy group-containing resin (A), the primary amine compound and/or the secondary amine compound (C2), and the active hydrogen-containing compound (B) a part or all of which is an active hydrogen-containing hydrazine derivative, and it is desirable that the reaction is effected generally at 10 to 300° C., but preferably at 50 to 150° C., for about 1 to 8 hours or so.

For the epoxy group-containing resin (A) and he active hydrogen-containing compound (B) a part or all of which is an active hydrogen-containing hydrazine derivative, referred to are the same as those mentioned hereinabove. The reaction may be effected in an organic solvent, for which referred to are the same as those mentioned hereinabove for the reaction of (A), (B) and (C1).

The blend ratio of the epoxy group-containing resin (A) and the primary amine compound and/or the secondary amine compound (B) is preferably so controlled that the primary amine compound and/or the secondary amine compound (B) is from 20 to 80 mol %, more preferably from 30 to 70 mol %, even more preferably from 40 to 60 mol % relative to the epoxy group in the epoxy group-containing resin (A), and it is advantageous that the remaining epoxy group after the reaction is reacted with its corresponding amount of the active hydrogen-containing hydrazine derivative, in view of the corrosion resistance of the film and of the dispersibility in water of the resin. Accordingly, the amount of the active hydrogen-containing hydrazine derivative to be blended is preferably from 20 to 80 mol %, more preferably from 30 to 70 mol %, even more preferably from 40 to 60 mol % relative to the epoxy group in the epoxy group-containing resin (A).

For dispersing the modified epoxy resin that has been obtained through reaction of the components (A), (B) and (C2) in water to prepare an aqueous epoxy resin dispersion, a method is effective of neutralizing the modified epoxy resin with an ordinary neutralizing agent well known for the amino group in the resin, such as acetic acid, formic acid or phosphoric acid, followed by dispersing the resulting resin in water. The neutralization equivalence is not specifically defined, but is preferably from 0.2 to 0.8 equivalents, more preferably from 0.3 to 0.7 equivalents, even more preferably from 0.4 to 0.6 equivalents relative to the amino group in the resin, in view of the properties and the water resistance of the resulting dispersion.

Two or more different types of the modified epoxy resins that are obtained through reaction of the components (A), (B) and (C2) or the aqueous epoxy resin dispersions prepared by dispersing them in water may be used herein as combined.

As it is, the aqueous epoxy resin dispersion (a1) may form good films of high adhesiveness to metal films, but it is desirable to add a curing agent to the aqueous epoxy resin dispersion (a1) and the organic film formed is cured under heat in order that it may be a denser barrier film. The curing agent may be any of the above-mentioned polyisocyanate compounds and amino resin compounds. The blend ratio of the modified epoxy resin (D) to the curing agent (E) in the aqueous epoxy resin dispersion (a1), (D)/(E) by mass of the solid content thereof, preferably falls between 95/5 and 55/45, more preferably between 90/10 and 65/35 in view of the adhesiveness and the top coat acceptability of the film.

For further enhancing the low-temperature crosslinkability of the resin, it is desirable to add a known curing promoter catalyst such as that mentioned hereinabove to the resin. For improving the physical properties such as adhesiveness of the films in some degree, any known acrylic, alkyd or polyester resin may be added to the epoxy group-containing resin.

Next described is the silane coupling agent of the component (b).

The silane coupling agent includes, for example, vinylmethoxysilane, vinylethoxysilane, vinyltrichlorosilane, vinyltrimethoxysilane, vinyltriethoxysilane, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, N-β-(aminoethyl)-γ-aminopropylmethyldimethoxysilane, N-β-(aminoethyl)-γ-aminopropyltrimethoxysilane, N-β-(aminoethyl)-γ-aminopropyltriethoxysilane, γ-aminopropyltrimethoxysilane, γ-aminopropyltriethoxysilane, methacryloxypropylmethyldimethoxysilane, γ-methacryloxypropyltrimethoxysilane, γ-methacryloxypropylmethyldiethoxysilane, γ-methacryloxypropyltriethoxysilane, γ-mercaptopropylmethyldimethoxysilane, γ-mercaptopropyltrimethoxysilane, p-styryltrimethoxysilane, γ-acryloxypropyltrimethoxysilane, N-phenyl-γ-aminopropyltrimethoxysilane, γ-ureidopropyltriethoxysilane, γ-chloropropyltrimethoxysilane, bis(triethoxysilylpropyl)tetrasulfide, γ-isocyanatopropyltriethoxysilane, γ-triethoxysilyl-N-(1,3-dimethylbutylidene)propylamine, N-(vinylbenzylamine)-β-aminoethyl-γ-aminopropyltrimethoxysilane. One or more of these may be used herein either singly or as combined.

In the invention, the surface-treating composition contains a silane coupling agent along with a specific acid component to improve its white rust resistance, and the reason will be as described hereinabove.

Of the silane coupling agents mentioned above, especially preferred are those having, as the reactive functional group, an amino group, since the reactivity of their functional group with the water-dispersible and/or water-soluble resins (a), (a1) is high. The silane coupling agent of the type includes, for example, N-β-(aminoethyl)-γ-aminopropylmethyldimethoxysilane, N-β-(aminoethyl)-γ-aminopropyltrimethoxysilane, N-β-(aminoethyl)-γ-aminopropyltriethoxysilane, γ-aminopropyltrimethoxysilane, and γ-aminopropyltriethoxysilane. Concretely, Shin-etsu Chemical's KBM-903, KBE-903, KBM-603, KBE-602 and KBE 603 (all trade names) are usable.

The amount of the silane coupling agent (b) to be in the surface-treating composition is preferably from 1 to 300 parts by weight, more preferably from 5 to 100 parts by weight, even more preferably from 15 to 50 parts by weight relative to 100 parts by weight of the solid content of the organic resin therein. If the amount of the silane coupling agent is smaller than 1 part by weight, the corrosion resistance of the film will be poor; but if larger than 300 parts by weight, good film could not be formed, and, if so, the silane coupling agent could not exhibit its effect of increasing the adhesiveness to the plating metal and the barrier property of the water-dispersible and/or water-soluble resins (a), (a1), and the corrosion resistance of the film will lower.

Next, the phosphoric acid and/or hexafluoro-metal acid of the component (c) acts on the surface of an inert plating metal to activate the metal surface. The phosphoric acid and the hexafluoro-metal acid may be used either singly or as combined.

The type of the hexafluoro-metal acid is not specifically defined. Preferably, the acid contains at least one element selected from Ti, Si and Zr, and includes, for example, fluorotitanic acid, fluorozirconic acid and hydrosilicofluoric acid. One or more of these may be used herein.

The amount of the phosphoric acid and/or hexafluoro-metal acid (c) to be in the surface-treating composition is preferably from 0.1 to 80 parts by weight, more preferably from 1 to 60 parts by weight, even more preferably from 5 to 50 parts by weight in total, relative to 100 parts by weight of the solid content of the organic resin therein. If the amount of the phosphoric acid and/or hexafluoro-metal acid (c) in the composition is smaller than 0.1 parts by weight, the corrosion resistance of the film will be poor; but if larger than 80 parts by weight, the outward appearance of the film will be uneven.

In case where the aqueous epoxy resin dispersion (a1) that contains, as the additional reactive component, the above-mentioned specific hydrophilic organic component (C) is used in the invention, it is desirable that the surface-treating composition contains an aqueous urethane resin dispersion (d) along with the aqueous epoxy resin dispersion (a1), the silane coupling agent (b) and the phosphoric acid and/or hexafluoro-metal acid (c).

The aqueous urethane resin dispersion (d) is an urethane emulsion of a product obtained through reaction of a polyisocyanate compound with a polyhydroxy compound such as polyether-diol or polyester-diol.

The urethane emulsion may be readily obtained by reacting a polyisocyanate compound with a polyhydroxy compound in the presence or absence of a hydrophilic organic solvent not having an active hydrogen that is reactive with an isocyanate group in the molecule, in such a controlled manner that the isocyanate group in the polyisocyanate compound is excessive over the hydroxyl group in the polyhydroxy compound. If desired, the reaction product (polymer) may be mixed with an amine and water for amine extension reaction, and thereafter it is mixed with a nonionic or ionic emulsifier along with water for emulsification and dispersion, and optionally the organic solvent, if used, is evaporated away.

In case where a polyhydroxy compound having a nonionic, anionic or cationic hydrophilic group is used for constructing the urethane resin skeleton, the urethane emulsion does not require an emulsifier in preparing it.

The polyisocyanate compound includes organic diisocyanates, for example, aliphatic diisocyanates such as hexamethylene diisocyanate, trimethylhexamethylene diisocyanate; cycloaliphatic diisocyanates such as hydrogenated xylylene diisocyanate, isophorone diisocyanate; aromatic diisocyanates such as tolylene diisocyanate, 4,4'-diphenylmethane diisocyanate; cyclized polymers of the organic diisocyanates, as well as isocyanurates and biurets of the organic diisocyanates. One or more of these may be used herein.

For the aqueous urethane dispersion (d), especially preferred are nonionic or cationic polyurethane emulsions in view of the blend stability thereof with the aqueous epoxy resin dispersion (a1).

Containing the aqueous urethane dispersion (d), the surface-treating composition may form a film of significantly improved white rust resistance. The reason will be because the film-forming ability of the surface-treating composition that contains a suitable amount of such an aqueous urethane dispersion may be improved, and, as a result, the ability of the film to prevent penetration of corrosive factors therethrough may be improved and, in addition, the antirust component of the film may be prevented from flowing away.

The blend ratio of the aqueous epoxy resin dispersion (a1) to the aqueous urethane resin dispersion (d) in the surface-treating composition, (a1)/(d) preferably falls between 95/5 and 5/95, more preferably between 75/25 and 25/75 in terms of the solid content ratio by mass. If the blend ratio of the aqueous urethane resin dispersion (b) to the aqueous epoxy resin dispersion (a) is smaller than the defined range as above, the urethane resin-derived film-forming ability is unsatisfactory, and if so, the ability of the film to repel corrosive factors will be unsatisfactory and the white rust resistance of the film will be therefore low. On the other hand, if the blend ratio of the aqueous urethane resin dispersion (b) to the aqueous epoxy resin dispersion (a) is larger than the defined range as above, the ratio of the active hydrogen-containing compound that comprises an active hydrogen-containing hydrazine derivative in the surface-treating composition lowers. In this case, therefore, the white rust resistance of the film will also lower.

In addition to the above-mentioned specific water-dispersible resin (modified epoxy resin, urethane resin), the surface-treating composition may additionally contain one or more other water-dispersible and/or water-soluble resins of, for example, acrylic resins, polyester resins, epoxy resins, ethylene resins, alkyd resins, phenolic resins and olefin resins, of which, however, the additional resin content must be at most about 25% by mass of the overall solid resin content.

Preferably, the surface-treating composition for use in the invention additionally contains a water-soluble inorganic component for further improving the corrosion resistance of the film formed of the composition. For the water-soluble inorganic component, the cation is preferably one or more selected from Mg, Ca, Y, Ti, Zr, Nb, Zn, Mn, Co, Ni, Al, In, Ce and La, and the anion is preferably one or more selected from nitrate, sulfate, acetate, carbonate, phosphate and chloride. Concretely, the inorganic component includes Mg nitrate, Co nitrate, Ti sulfate, Ni sulfate, Zn acetate, Ce acetate, and Mn carbonate. One or more of these may be used herein.

The reason why the white rust resistance of the film that contains such a water-soluble inorganic component is improved especially when the film is degreased with alkali will be because the inorganic-rich layer (reaction layer <2> mentioned above) in the pseudo-two-layered film may be more densified and will be therefore prevented from being broken in alkali treatment.

For attaining better white rust resistance, the cation of the water-soluble inorganic component is especially preferably any of Al, Mn, Zr, Co or Mg. Concretely, it is desirable that a water-soluble inorganic component which contains one or more elements selected from these cations is used in the surface-treating composition.

The amount of the water-soluble inorganic component to be in the surface-treating composition is preferably from 0.1 to 60 parts by mass, more preferably from 0.5 to 40 parts by mass, even more preferably from 1 to 30 parts by mass in terms of the solid content thereof relative to 100 parts by mass of the solid content of the organic resin therein. If the amount of the water-soluble inorganic component is smaller than 0.1 parts by mass, the corrosion resistance of the film will be unsatisfactory; but if larger than 60 parts by mass, the reactivity of the treating liquid will increase too much and the outward appearance of the film will be uneven.

In case where the water-soluble organic component to be added to the composition is a water-soluble phosphate, one or more of metal salts of orthophosphoric acid, pyrophosphoric acid, polyphosphoric acid and metaphosphoric acid may be used for it. If desired, one or more salts of organic phosphoric acids (e.g., phytic acid, phytic acid salts, phosphonic acid, phosphonic acid salts, and their metal salts) may be added to the composition. Of those, preferred are primary phosphates in view of the stability of the surface-treating composition.

The morphology of the phosphate in the film is not also specifically defined, and the salt may be crystalline or amorphous. The ionicity and the solubility of the phosphate in the film are not also specifically defined. The reason why the water-soluble phosphate added may improve the corrosion resistance of the film will be because the water-soluble phosphate may form a hardly-soluble compound in the film formed.

The surface-treating composition may optionally contain a chromium-free antirust additive for further improving the corrosion resistance of the film formed of the composition. Containing such a chromium-free antirust additive, the surface-treating composition may form a film of better corrosion resistance (self-repairing ability).

The chromium-free antirust additive is preferably at least one selected from the following groups (e1) to (e5):
(e1) silicon oxide,
(e2) calcium or calcium compounds,
(e3) hardly-soluble phosphoric acid compounds,
(e4) molybdic acid compounds, (e5) one or more, S atom-containing organic compounds selected from triazoles, thiols, thiadiazoles, thiazoles and thiurams.

The details and the anticorrosive mechanism of these chromium-free antirust additives (e1) to (e5) are mentioned below.

For the component (e1), usable is fine particulate silica that includes colloidal silica and fumed silica. In view of the corrosion resistance, desirable is calcium ion-exchanged silica with calcium bonded to its surface.

For the colloidal silica, for example, usable are Nissan Chemical's Snowtex O, 20, 30, 40, C and S (all trade names) For the fumed silica, usable are Nippon Aerosil's AEROSIL R971, R812, R811, R974, R202, R805, 130, 200, 300 and 300CF (all trade manes). For the calcium ion-exchanged silica, usable are W. R. Grace & Company's SHIELDEX C303, SHIELDEX AC3; SHIELDEX AC5 (all trade names), and Fuji Silysia Chemical's SHIELDEX, SHIELDEX SY710 (both trade names). These silicas contribute to forming dense and stable zinc corrosion products, and the corrosion products spread on the metal surface to retard the promotion of metal surface corrosion.

The components (e2) and (e3) exhibits excellent corrosion resistance (self-repairing ability) owing to their deposition capability.

The calcium compound of the component (e2) may be any of calcium oxides, calcium hydroxides and calcium salts, and one or more of these may be used herein. The calcium salts are not specifically defined in point of their type, and they may be any of simple salts that have calcium alone as the cation, such as calcium silicate, calcium carbonate, calcium phosphate.; and double salts that have calcium and another cation except calcium, such as calcium zinc phosphate, calcium magnesium phosphate. Regarding the mechanism of the component (e2), its calcium that is baser than the plating metal, zinc or aluminium predominantly dissolves out in corrosive environments, and this form a dense and hardly-soluble product with $OH^-$ that has been formed in the cathode reaction and seals up the defects to prevent corrosive reaction. In case where the component is added to the composition along with silica mentioned above, calcium ions adhere to the metal surface and electrically neutralize the surface charges to deposit. As a result, a dense and hardly-soluble protective film is formed and it prevents corrosive reaction.

For the hardly-soluble phosphoric acid compound (e3), usable are hardly-soluble phosphates. The hardly-soluble phosphates include salts of all types such as simple salts and double salts. The metal cation to form them is not specifically defined, and may be any and every one. For example, the salts include zinc phosphate, magnesium phosphate, calcium phosphate, and aluminium phosphate. The skeleton and the degree of condensation of the phosphate ion are not also specifically defined. The salts may be any of normal salts, dihydrogen salts, monohydrogen salts or phosphite. The normal salts include orthophosphates and other all condensed phosphates such as polyphosphates. Regarding the mechanism of the hardly-soluble phosphorus compounds, the plating metal, zinc or aluminium having been released through corrosion reacts in a mode of complexation with the phosphate ion that has been dissociated from the compounds through hydrolysis, to thereby form a dense and hardly-soluble protective film, and the film blocks the corrosion start points to prevent corrosive reaction.

For the molybdic acid compound (e4), for example, usable are molybdates. The molybdates are not specifically defined in point of their skeleton and degree of condensation, and include, for example, orthomolybdates, paramolybdates and metamolybdates. They include all salts such as simple salts and double salts. Examples of the double salts are phosphate molybdates. Owing to their passivation effect, the molybdic acid compounds exhibit their self-repairing activity. Specifically, in corrosive environments, they form dense oxide along with dissolved oxygen on the film surface to thereby block the corrosive start points to prevent corrosive reaction.

The organic compound (e5) includes, for example, triazoles such as 1,2,4-triazole, 3-amino-1,2,4-triazole, 3-mercapto-1,2,4-triazole, 5-amino-3-mercapto-1,2,4-triazole, 1H-benzotriazole; thiols such as 1,3,5-triazine-3,4,6-trithiol, 2-mercaptobenzimidazole; thiadiazoles such as 5-amino-2-mercapto-1,3,4-thiadiazole, 2,5-dimercapto-1,3,4-thiadiazole; thiazoles such as 2-N,N-diethylthiobenzothiazole, 2-mercaptobenzothiazole; thiurams such as tetraethylthiuram disulfide. Owing to their adsorbing effect, the organic compounds exhibit their self-repairing activity. Specifically, zinc or aluminium that has been released through corrosion adsorbs the sulfur-containing polar group of the organic compound to form an inactive film, and this blocks the corrosion start points to prevent corrosive reaction.

Preferably, the amount of the chromium-free antirust additive to be in the surface-treating composition is from 0.1 to 50 parts by mass, more preferably from 0.5 to 30 parts by mass, even more preferably from 1 to 20 parts by mass in terms of its solid content relative to 100 parts by mass of the solid content of the organic resin therein. If the amount of the chromium-free antirust additive is smaller than 0.1 parts by mass, the corrosion resistance of the metal film after degreasing with alkali will be poor; but if larger than 50 parts by mass, it is unfavorable since not only the coatability and workability of the plated steel sheets but also the corrosion resistance thereof will lower.

Two or more different types of the above-mentioned antirust additives (e1) to (e5) maybe added to the composition. Such their combination use is preferred since the anticorrosive effects intrinsic to the individual components are synergistically combined to produce higher-level corrosion resistance. In particular, when calcium ion-exchanged silica is used for the component (e1), it is preferably combined with at least one of the components (e3), (e4) and (e5), more preferably all of the components (e3) to (e5) to attain excellent corrosion resistance.

If desired, the surface-treating composition may contain a solid lubricant for improving the workability (scratch resistance) and continuous grindability of the film. The solid lubricant includes the following:

(1) Polyolefin wax, paraffin wax; for example, polyethylene wax, synthetic paraffin, natural paraffin, microwax, chlorohydrocarbon.

(2) Fluororesin particles; for example, polyfluoroethylene resin (poly-tetrafluoroethylene resin, etc.), polyvinyl fluoride resin, polyvinylidene fluoride resin.

Apart from these also employable herein are fatty acid amide compounds (e.g., stearamide, palmitamide, methylenebisstearamide, ethylenebisstearamide, oleamide, esylamide, alkylenebis-fatty acid amide), fatty acid ester waxes, which are esters of polyol compounds and fatty acids, silicone wax, fluorine-containing wax, lanolin wax, montan wax, microcrystalline wax, carnauba wax, metal soaps (e.g., calcium stearate, zinc stearate, calcium laurate, calcium palmitate) metal sulfides (e.g., molybdenum disulfide, tungsten disulfide), graphite, fluorographite, boron nitride, polyalkylene glycols, alkali metal sulfates, etc.

Of the above-mentioned solid lubricants, especially preferred are fluororesin compounds (in particular, polytetrafluoroethylene resin particles). For the polyethylene wax, usable are Hoechst's Ceridust 9615A, 3715, 3620 and 3910 (all trade names), Sanyo Kasei's Sunwax 131-P and 161-P (both trade names), and Mitsui Petrochemical's Chemipearl W-100, W-200, W-500, W-800 and W-950 (all trade names).

For the fluororesin particles, especially preferred are tetrafluoroethylene particles, for which concretely preferred are Daikin Industry's Rublon L-2 and 1-5 (both trade names), Mitsui-DuPont's MP 1100 and 1200 (both trade names), Asahi ICI Fluoropolymers' Fluon Dispersion AD1, AD2, Fluon L140J, L150J and L155J (all trade names).

Of those, a combination of polyolefin wax and tetrafluoroethylene may give more excellent lubrication.

The amount of the solid lubricant to be in the surface-treating composition is preferably from 1 to 50 parts by mass, more preferably from 3 to 30 parts by mass relative to 100 parts by mass of the solid content of the organic resin therein. If the amount of the solid lubricant is smaller than 1 part by mass, the lubrication will be poor; but is larger than 80 parts by mass, the coatability of the metal film will worsen.

The surface treatment film (and the surface-treating composition) may contain, as a corrosion inhibitor, one or more of any other oxide particles (e.g., aluminium oxide, zirconium oxide, titanium oxide, cerium oxide, antimony oxide), phosphoromolybdates (e.g., aluminium phosphoromolybdate), organic phosphoric acids and their salts (e.g., phytic acid, phytic acid salts, phosphonic acid, phosphonic acid salts, and their metal salts, alkaline metal salts, alkaline earth metal salts), and organic inhibitors (e.g., hydrazine and its derivatives, thiol compounds, thiocarbamates).

Further if desired, the surface treatment film (and the surface-treating composition) may contain one or more of organic color pigments (e.g., condensed polycyclic organic pigments, phthalocyanine organic pigments), color dyes (e.g., water-soluble azo-metal dyes), inorganic pigments (e.g., titanium oxide), electroconductive pigments (e.g., metal powder such as zinc, aluminium or nickel, iron phosphide antimony-doped tin oxide), coupling agents (e.g., titanium coupling agents), and melamine-cyanuric acid adducts.

The surface treatment film formed of the surface-treating composition that comprises the components mentioned above may have a dry thickness of from 0.02 to 5 μm, preferably from 0.05 to 5 μm, more preferably from 0.3 to 3 μm, even more preferably from 0.5 to 2 μm. If its dry thickness is smaller than 0.02 μm, the corrosion resistance of the film will be poor; but if larger than 5 μm, the electroconductivity and the workability thereof will worsen.

A second organic resin film may be formed on the surface treatment film. It is desirable that the thickness of the second organic resin film is from 0.02 μm to smaller than 5 μm, more preferably from 0.05 μm to smaller than 5 μm, the thickness of the first film, the surface treatment film is from 0.02 μm. to smaller than 5 μm, more preferably from 0.05 μm to smaller than 5 μm, and the total thickness of the two films is not over 5 μm.

The film structure of the surface treatment film is described concretely.

Regarding its film structure, the surface treatment film to be formed on the surface of the zinc-plated or aluminium-plated steel sheet in the invention comprises an amorphous compound layer that contains P, Zn and/or Al, and O, and an overlying organic resin matrix layer that comprises, as the matrix, a hydrazine derivative-modified, epoxy group-containing resin or a combination of the modified epoxy group-containing resin and an urethane resin. Preferably, the film, (amorphous compound layer and/or organic resin matrix layer) contains self-constructed compounds that contains P, Zn and/or Al, and O, more preferably a self-constructed compounds that contains P, Zn and/or Al, Si and O. The surface treatment film contains no Cr.

For making good corrosion resistance (white rust resistance) to the undercoated steel plates such as zinc-plated steel sheets have by forming a chromium-free film thereon, the following are effective, as so mentioned hereinabove:

<1> A high-performance barrier layer capable of being a barrier against diffusion of corrosive factors is formed of an organic resin to inhibit the cathode reaction.
<2> A dense inert layer (reaction layer) is formed on the metal layer through chemical reaction of the surface-treating composition and the metal layer, and the inert layer inactivates the surface of the plate layer to inhibit the anode reaction.

More preferably, the following is further effective.
<3> The film contains a self-repairing substance that reacts with the defective part (or broken part) of the inert layer to repair it and traps the metal ions such as zinc ions dissolving out of the part to make them hardly soluble (or that is, the film is self-repairing).

Of the surface treatment film which the surface-treated steel sheet of the invention has, the upper organic resin matrix layer acts as a high-performance barrier layer (having the activity <1> as above), and the lower amorphous compound layer acts to inactivate the metal layer (having the activity <2> as above), and more preferably, the self-constructed compounds in the film is self-repairing (having the activity <3> as above) With such composite activities, the surface treatment film makes the surface-treated steel sheet have high-level corrosion resistance.

The amorphous compound layer is a thick layer or film of the amorphous compound that is formed through chemical reaction of the surface-treating composition and the metal layer, and this is formed of a compound that contains Zn and/or Al derived from Zn and/or Al of the plating component. In case where the plated steel sheet is a zinc-plated steel sheet, the composition of the amorphous compound is characterized in that it contains the same molar amount of Zn and P, more concretely the molar ratio of Zn to P, [Zn]/[P] in the compound falls between 0.9 and 1.4. The compound will be a secondary phosphate (e.g., $ZnHPO_4 \cdot 2H_2O$).

The reason why the amorphous compound layer formed ensures excellent white rust resistance will be, as so mentioned hereinabove, because the amorphous compound layer may inactivate the metal layer, and even when corrosive factors may penetrate through the overlying barrier layer (organic resin matrix layer) to reach the surface of the metal film, the anode reaction that participates in white rust formation may be thereby prevented.

The thickness of the amorphous compound layer is preferably at least 10 nm in view of the corrosion resistance.

For positively forming the amorphous compound layer, it is desirable that the steel sheet is, after coated with surface-treating composition, heated in an induction heating system (induction heater). This is because the induction heating system accelerates the reaction between the metal film and the surface-treating composition that are heated from the side of the steel sheet, and is therefore advantageous for the formation of the amorphous compound layer.

The surface treatment film generally contains a silane compound that is derived from the silane coupling agent in the surface-treating composition. As the case may be, the silane compound in the film may have the composition of the silane coupling agent itself.

Preferably, the surface treatment film contains specific self-constructed compounds in order that it may have better white rust resistance. The self-constructed compounds is an amorphous compound that contains P, Zn and/or Al, and O. More preferably, the self-constructed compounds additionally contain Si for ensuring more improved white rust resistance. Zn and Al in the self-constructed compounds are derived from the plating component Zn and Al, and Si is from the silane coupling agent in the surface-treating composition.

The self-constructed compounds may be a reaction product (compound) of the metal that is released from the metal film and essentially an acid component that is in the surface-treating composition, and it may be formed (deposited) in the film by adding a suitable amount of an acid component (phosphoric acid, etc.) in the surface-treating composition. Of those mentioned above, the self-constructed compounds that contains Si is one that has taken therein the silane coupling agent component of the surface-treating composition, and it may also be formed (deposited) in the film by suitably controlling the amount of the silane coupling agent to be in the surface-treating composition (the amount is made relatively large).

Though not wholly clarified, the reason why the white rust resistance of the surface treatment film that contains the self-constructed compounds is better will be because the acid component such as phosphate ions and others released from the self-constructed compounds may bond to the metal ions such as zinc ions released from the metal film during the process of corrosion to form an insoluble compound and the compound may form a stable precipitate protective film to prevent corrosion (the surface treatment film may exhibit a self-repairing property).

Also though not wholly clarified, the reason why the self-constructed compounds containing Si ensures better white rust resistance will be because Si therein may increase the solubility of the self-constructed compounds in corrosive environments and because Si in the self-constructed compounds may be taken in the amorphous compound layer and the reaction product with metal ions such as zinc ions released from the metal film during corrosion may be more stabilized.

In case where the plated steel sheet is a zinc-plated steel sheet, the self-constructed compounds in the surface treatment film generally contain the same molar amount of Zn and P. More concretely, the molar ratio of Zn to P in the compound, [Zn]/[P] falls between 0.9 and 1.4, and the compound will be a secondary phosphate (e.g., $ZnHPO_4.2H_2O$).

On the other hand, in case where self-constructed compounds in which the molar ratio of Zn to P, [Zn]/[P] is smaller than 1.0 is deposited in the surface treatment film, it further improves the white rust resistance of the film as compared with the case where the self-constructed compounds deposited the film contains the same molar amount of Zn and P. The self-constructed compounds in which the molar ration [Zn]/[P] is smaller than 1.0 will be a compound consisting essentially of a water-soluble primary phosphate (e.g., $Zn(H_2PO_4)_2.H_2O$). Though not wholly clarified, the reason why the self-constructed compounds of the type ensures further better white rust resistance will be because it may react with the metal ions such as zinc ions to be released from the defective part of the amorphous compound layer, thereby forming a hardly-soluble secondary phosphate (e.g., zinc secondary phosphate) to exhibit a high-level function as a self-repairing substance.

As so mentioned hereinabove, the thickness of the surface treatment film may be from 0.02 to 5 μm, preferably from 0.05 to 5 μm, more preferably from 0.3 to 3 μm, even more preferably from 0.5 to 2 μm. Also as so mentioned hereinabove, the surface treatment film may contain a chromium-free antirust additive and a solid lubricant.

The surface-treating composition to form the surface treatment film must form an aqueous solvent system in order that it may form the compound layer (amorphous compound layer) and the self-constructed compounds mentioned above. Therefore, the organic resin to be in the composition is also a water-dispersible resin and/or a water-soluble resin.

Next described are the details of the method of measuring the film composition of the surface treatment film.

A method of using a transmission electronic microscope and an energy dispersive X-ray spectrometer is widely used to determine the local composition of a cross section of a film. In fact, however, its data often vary depending on the method of preparing the cross-sectional sample, the condition for data measurement, the method of data processing and the method for correcting and calculating the data. This is because <1> it is substantially impossible to prepare every standard sample for elementary analysis suitable for unknown samples that may be observed with a transmission electronic microscope, and therefore it is inevitable to employ a quantification method that is based on theoretical calculation not using standard samples, and various calculation models for the method must be prepared, and <2> a method of quantitative calculation of the relative content of heavy elements over Na to light elements lower than Na is not globally established. In addition to the situations, the method of handling the characteristic X rays from the site except the subject to be analyzed, that is caused by the shape of the cross-sectional sample and the support for the cross-sectional sample, significantly influences the quantification data.

Accordingly, in the invention, a method mentioned below is used for analyzing the film composition. For preparing the cross-sectional samples for inspection with transmission electronic microscopes, used is a micro sampling function fitted to a focused ion beam processor, Hitachi's Focused Ion Beam, FIB 2000A. Before the FIB processing, the surface of the surface-treated steel sheet sample from which the cross-sectional sample is prepared is coated with a protective film of C having a thickness of about 200 nm through flash evaporation and further with another protective film of Au having a thickness of about 100 nm through sputtering, for protecting it from damage by ion beam irradiation. The surface of the steel sheet sample from which the cross-sectional sample is cut out and which has been set in the FIB processor is coated with a protective film of C having a thickness of about 500 nm by the use of a chemical vapor deposition (CVD) function of the FIB processor, and the cross-sectional sample is cut out of it. The cross-sectional sample thus cut out with a microsampling function is fixed on a linear part of a semicircular special mesh of Mo by the use of a CVD function, and then finished to a thickness suitable to transmission electronic microscopy.

For analyzing the composition of the thus-prepared cross-sectional sample, used are a transmission electron microscope, Philips' CM20FEG, and an energy dispersive X-ray spectrometer, EDAX's Phoenix equipped with a detector, Super-UTW Model and fitted to the microscope. The accelerating voltage is 200 kV both in the microscopic image observation and the data analysis.

The composition of the amorphous compound layer and that of the self-constructed compounds are obtained through background removal and peak separation from the spectral data obtained in the determined position followed by data correction and calculation. In this stage, if the background processing is automatically carried out, the net intensity (energy intensity) in the light element range could not be suitably calculated. Therefore, the energy sites giving no peak are designated by manual operation, and the data are processed in a manual background system of connecting them. In the peak removal, the characteristic X-rays for Mo and Au that are caused by the Mo mesh for the sample support and the Au protective layer, and also Ga that is caused by FIB processing are also taken into consideration. The data calculation is all based on the K-series characteristic X-rays for the elements in the chemical treatment film. The corrective calculation is effected through thin film approximation, for which a Zaluzec's model is used for the corrective factor ($K_{AB}$ factor).

The molar ratio of Zn to P in the amorphous compound layer and the self-constructed compounds in the surface treatment film may be in terms of the ratio of the atomic concentration of Zn to P obtained in the manner as above.

Next described is a preferred method for producing the surface-treated steel sheet of the invention.

For forming the above-mentioned surface treatment film on the surface of a zinc-plated or aluminium-plated steel sheet, a surface-treating composition (processing solution) having the composition mentioned above is applied to the surface of the plated steel sheet so that the dry film thickness could fall within the range as above, and, not washed with water, it is dried under heat.

Preferably, the surface-treating composition (processing solution) is controlled to have a pH of from 0.5 to 6, more preferably from 2 to 4. If the pH of the surface-treating composition is lower than 0.5, the processing solution is too reactive and therefore causes outward appearance unevenness; but if higher than 6, the processing solution is poorly reactive, and the bonding of the film to the plating metal is unsatisfactory, and the corrosion resistance of the metal film lowers.

For applying the surface-treating composition to the plated steel sheet, employable is any method of coating, dipping or spraying. For applying it, usable is any of roll coater (3-roll coater, 2-roll coater), squeeze coater, die coater, etc. After coating, dipping or spraying by the use of a squeeze coater or the like, the coated amount may be controlled, the appearance may be unified and the film thickness may be unified according to an air-knife method or a roll-squeezing method.

After the plated steel sheet is thus coated with the surface-treating composition, it is dried under heat, not washed with water. For drying it under heat, usable are driers, hot air furnaces, high-frequency induction heating furnaces, IR furnaces, etc. In the drying under heat, the ultimate temperature of the sheet preferably falls between 30 and 300° C., more preferably between 50 and 300° C., even more preferably between 60 and 250° C. If the drying temperature under heat is lower than 30° C., much water will remain in the film and the corrosion resistance of the film will be low. However, if the temperature is higher than 300° C., it is uneconomical and, in addition, defects will be formed in the film and the corrosion resistance of the film will be low.

In case where a second organic resin film is formed on the thus-formed surface treatment film, the treating composition for the second film is applied to the surface of the surface treatment film so that its layer may have the defined thickness as above, and then this is dried under heat. For the method of applying the treating composition and drying it under heat, referred to are the same as those mentioned hereinabove for forming the surface treatment film.

Accordingly, the production method of the invention and preferred embodiments thereof are as follows:

[1] A method for producing a surface-treated steel sheet of good white rust resistance, which comprises applying a surface-treating composition that contains:

(a) a water-dispersible resin and/or a water-soluble resin obtained through reaction of an epoxy group-containing resin (A) with an active hydrogen-containing compound (B) a part or all of which is an active hydrogen-containing hydrazine derivative, (b) a silane coupling agent, and (c) a phosphoric acid and/or a hexafluoro-metal acid, and has a controlled pH of from 0.5 to 6, onto the surface of a zinc-plated or aluminium-plated steel sheet, and not washing it with water, drying it under heat at an ultimate sheet temperature of from 50° C. to 300° C. to thereby form thereon a surface treatment film having a thickness of from 0.02 to 5 µm.

[2] A method for producing a surface-treated steel sheet of good white rust resistance, which comprises applying a surface-treating composition that contains:

(a1) an aqueous epoxy resin dispersion of a modified epoxy resin dispersed in water, in which the modified epoxy resin is prepared by reacting an epoxy group-containing resin (A), an active hydrogen-containing compound (B) a part or all of which is an active hydrogen-containing hydrazine derivative, and a hydrophilic organic component (C), (b) a silane coupling agent, and (c) a phosphoric acid and/or a hexafluoro-metal acid, and has a controlled pH of from 0.5 to 6, onto the surface of a zinc-plated or aluminium-plated steel sheet, and not washing it with water, drying it under heat at an ultimate sheet temperature of from 50° C. to 300° C. to thereby form thereon a surface treatment film having a thickness of from 0.02 to 5 µm.

[3] A method for producing a surface-treated steel sheet of good white rust resistance, which comprises applying a surface-treating composition that contains:

(a1) an aqueous epoxy resin dispersion of a modified epoxy resin dispersed in water, in which the modified epoxy resin is prepared by reacting an epoxy group-containing resin (A), an active hydrogen-containing compound (B) a part or all of which is an active hydrogen-containing hydrazine derivative, and a hydrophilic organic component (C), (b) a silane coupling agent, (c) a phosphoric acid and/or a hexafluoro-metal acid, and (d) an aqueous dispersion of an urethane resin, and has a controlled pH of from 0.5 to 6, onto the surface of a zinc-plated or aluminium-plated steel sheet, and not washing it with water, drying it under heat at an ultimate sheet temperature of from 50° C. to 300° C. to thereby form thereon a surface treatment film having a thickness of from 0.02 to 5 µm.

[4] The method of above [2] or [3] for producing a surface-treated steel sheet of good white rust resistance, wherein the hydrophilic organic component (C) is a polyalkylene glycol-modified epoxy resin prepared by reacting a polyalkylene glycol having a number-average molecular weight of from 400 to 20000, a bisphenol-type epoxy resin, an active hydrogen-containing compound, and a polyisocyanate compound.

[5] The method of above [2] or [3] for producing a surface-treated steel sheet of good white rust resistance, wherein the hydrophilic organic component [C] is a primary amine compound and/or a secondary amine compound.

[6] The method of any of above [1] to [5] for producing a surface-treated steel sheet of good white rust resistance, wherein the surface-treating composition contains from 1 to 300 parts by mass of a silane coupling agent relative to 100 parts by mass of the solid content of the organic resin and contains from 0.1 to 80 parts by mass of a phosphoric acid and/or a hexafluoro-metal acid relative to 100 parts by mass of the solid content of the organic resin.

[7] The method of any of above [1] to [6] for producing a surface-treated steel sheet of good white rust resistance, wherein the surface-treating composition further contains from 0.1 to 60 parts by mass, in terms of the solid content thereof and relative to 100 parts by mass of the solid content of the organic resin, of a water-soluble inorganic component.

[8] The method of above [7] for producing a surface-treated steel sheet of good white rust resistance, wherein the cation of the water-soluble inorganic component is one or more selected from Mg, Ca, Y, Ti, Zr, Nb, Zn, Mn, Co, Ni, Al, In, Ce and La and the anion thereof is one or more selected from nitrate, sulfate, acetate, carbonate, phosphate and chloride.

[9] The method of any of above [1] to [8] for producing a surface-treated steel sheet of good white rust resistance, wherein the surface-treating composition further contains from 0.1 to 50 parts by mass, in terms of the solid content thereof and relative to 100 parts by mass of the solid content of the organic resin, of a chromium-free antirust additive.

[10] The method of above [9] for producing a surface-treated steel sheet of good white rust resistance, wherein the surface-treating composition contains at least one chromium-free antirust additive selected from the following (e1) to (e5):
(e1) silicon oxide,
(e2) calcium and/or calcium compounds,
(e3) hardly-soluble phosphoric acid compounds,
(e4) molybdic acid compounds,
(e5) one or more, S atom-containing organic compounds selected from triazoles, thiols, thiadiazoles, thiazoles and thiurams.

[11] The method of any of above [1] to [10] for producing a surface-treated steel sheet of good white rust resistance, wherein the surface-treating composition further contains from 1 to 50 parts by mass, in terms of its solid content and relative to 100 parts by mass of the solid content of the organic resin, of a solid lubricant.

[12] The method of any of above [1] to [11] for producing a surface-treated steel sheet of good white rust resistance, wherein the surface-treating composition contains at least one silane coupling agent with a reactive functional amino group.

[13] The method of any of above [1] to [12] for producing a surface-treated steel sheet of good white rust resistance, wherein the surface-treating composition contains at least one hexafluoro-metal acid with at least one or more elements selected from Ti, Si and Zr.

[14] The method of any of above [9] to [13] for producing a surface-treated steel sheet of good white rust resistance, wherein the surface-treating composition contains calcium ion-exchanged silica as the chromium-free antirust additive.

[15] The method of any of above [1] to [14] for producing a surface-treated steel sheet of good white rust resistance, wherein the epoxy group-containing resin (A) is a bisphenol A-type epoxy resin having a number-average molecular weight of from 1500 to 10000 and an epoxy equivalent of from 150 to 5000.

[16] The method of any of above [1] to [15] for producing a surface-treated steel sheet of good white rust resistance, wherein the aqueous epoxy resin dispersion further contains a curing agent that has a group capable of crosslinking with a hydroxyl group.

[17] The method of any of above [1] to [16] for producing a surface-treated steel sheet of good white rust resistance, wherein the surface treatment film is formed to have a thickness of from 0.02 µm to smaller than 5 µm, and an organic resin film having a thickness of from 0.02 µm to smaller than 5 µm is formed on the surface treatment film so that the total thickness of the two films may be at most 5 µm.

The surface treatment film may be formed on one or both surfaces of a plated steel sheet, and the combination of the film morphology on the two surfaces of the plated steel sheet may be any desired one, including, for example, single-layered film (surface treatment film)/non-treated; two-layered film (surface treatment film+organic resin film)/non-treated; single-layered film (surface treatment film)/two-layered film (surface treatment film+organic resin film); two-layered film (surface treatment film+organic resin film) two-layered film (surface treatment film+organic resin film), etc.

EXAMPLES

Example 1

A water-dispersible resin as in Table 2 was used for the resin composition for surface-treating compositions. A silane coupling agent (Table 3), a phosphoric acid or hexafluoro-metal acid (Table 4), a water-soluble inorganic component (Table 5), a chromium-free antirust additive (Table 6) and a solid lubricant (Table 7) were suitably added to it, and stirred for a predetermined period of time with a disperser for paint (sand grinder) to prepare surface-treating compositions.

Plated steel sheets as in Table 1 were processed herein. These are plated steel sheets for electric and electronic appliances for household use, construction materials and automobile parts, and their base is a cold-rolled steel sheet. The thickness of each steel sheet was defined in accordance with the object of evaluation. The surface of the plated steel sheet was degreased with alkali, washed with water, dried, and then coated with the above-mentioned, surface-treating composition by the use of a roll coater, and then dried under heat at a predetermined temperature. The thickness of the film was controlled by varying the solid content (heating residue) of the surface-treating composition or the coating condition (rolling reduction, revolving speed, etc.).

The film composition and the quality (film appearance, white rust resistance, electroconductivity, paint adhesiveness) of the thus-obtained surface-treated steel sheets were evaluated, and the results are given in Table 8 to Table 19. The quality evaluation was effected as follows:

(1) Film Appearance:
Each sample is visually checked for the uniformity of the film appearance (presence or absence of unevenness.). The evaluation criteria are as follows:
○: Uniform appearance with no unevenness
Δ: Some unevenness seen.
X: Unevenness seen remarkably.

(2) White Rust Resistance:
Each sample is tested according to a salt spray test (JIS-Z-2371), and evaluated based on the white rust area after 120 hours. The evaluation criteria are as follows:

⊚: White rust area, smaller than 5%.
○: White rust area, from 5% to smaller than 10%.
○—: White rust.area, from 10% to smaller than 25%.
Δ: White rust area, from 2.5% to smaller than 50%.
X: White rust area, 50% or more.

(3) Electroconductivity:

According to JIS C 2550, the layer insulation resistance of each sample is measured. The evaluation criteria are as follows:
○: Smaller than 3 Ω·cm²/sheet.
Δ: From 3, to 5 Ω·cm²/sheet.
X: More than 5 Ω·cm²/sheet.

(4) Paint Adhesiveness:

Each sample is coated with a melamine paint and baked (coating layer thickness 30 μm), then this is dipped in boiling water for 2 hours, and immediately cut to have cross cuts (10×10 cuts at intervals of 1 mm). An adhesive tape is stuck to it and peeled to measure the area of the peeled paint. The evaluation criteria area as follows:
⊚: No peel.
○: Peeled area, smaller than 5%.
Δ: Peeled area, from 5% to smaller than 20%.
X: Peeled area, 20% or more.

TABLE 1

| No. | Plated Steel Sheet | Deposit Amount (g/m²) |
| --- | --- | --- |
| 1 | Electrogalvanized steel sheet | 20 |
| 2 | Hot-dip zinc-plated steel sheet | 60 |
| 3 | Alloying hot-dip zinc-plated steel sheet (Fe: 10 mass %) | 60 |
| 4 | Zn—Ni alloy-plated steel sheet (Ni: 12 mass %) | 20 |
| 5 | Zn—Co alloy-plated steel sheet (Co: 0.5 mass %) | 20 |
| 6 | Zn—Cr alloy-plated steel sheet (Cr: 12 mass %) | 20 |
| 7 | Hot-dip Zn—Al alloy-plated steel sheet (al: 55 mass %) | 90 |
| 8 | Hot-dip Zn-5% Al-0.5% Mg alloy-plated steel sheet | 90 |
| 9 | Zn—SiO₂ dispersion-electroplated steel sheet | 20 |
| 10 | Hot-dip aluminium-plated steel sheet (Al—Si alloy, Si: 6 mass %) | 60 |
| 11 | Al—Mn alloy-electroplated steel sheet (Mn: 30 mass %) | 40 |
| 12 | Aluminium-electroplated steel sheet | 40 |
| 13 | Hot-dip Zn—Mg alloy-plated steel sheet (Mg: 0.5 mass %) | 150 |
| 14 | Zn—Al—Mg alloy-plated steel sheet (Al: 6 mass %, Mg: 3 mass %) | 120 |

TABLE 2

| No. | Water-Dispersible Resin |
| --- | --- |
| 1 | Water-dispersible resin of a reaction product obtained by reacting an epoxy resin with an active hydrogen-containing hydrazine resin, dispersed in water |
| 2 | Epoxy resin |

TABLE 3

| No. | Silane Coupling Agent | Commercial Product |
| --- | --- | --- |
| 1 | γ-aminopropyltriethoxysilane | Shin-etsu Chemical's KBE-903 |
| 2 | γ-aminopropyltrimethoxysilane | Shin-etsu Chemical's KBM-903 |
| 3 | N-β-(aminoethyl)-γ-aminopropylmethyldimethoxysilane | Shin-etsu Chemical's KBM-602 |

TABLE 3-continued

| No. | Silane Coupling Agent | Commercial Product |
| --- | --- | --- |
| 4 | N-β-(aminoethyl)-γ-aminopropyltrimethoxysilane | Shin-etsu Chemical's KBM-603 |
| 5 | N-β-(aminoethyl)-γ-aminopropyltriethoxysilane | Shin-etsu Chemical's KBE-603 |
| 6 | γ-glycidoxypropyltrimethoxysilane | Shin-etsu Chemical's KBM-403 |
| 7 | γ-glycidoxypropylmethyldiethoxysilane | Shin-etsu Chemical's KBE-402 |
| 8 | γ-glycidoxypropyltriethoxysilane | Shin-etsu Chemical's KBE-403 |

TABLE 4

| No. | Phosphoric Acid, Hexafluoro-Metal Acid |
| --- | --- |
| 1 | Phosphoric acid |
| 2 | Hexafluorosilicic acid: $H_2SiF_6$ |
| 3 | Hexafluorotitanic acid: $H_2TiF_6$ |
| 4 | Hexafluorozirconic acid: $H_2ZrF_6$ |

TABLE 5

| No. | Water-Soluble Inorganic Component |
| --- | --- |
| 1 | Al phosphate |
| 2 | Mn phosphate |
| 3 | Mg phosphate |
| 4 | Ni phosphate |
| 5 | Co nitrate |
| 6 | Al sulfate |
| 7 | An acetate |
| 8 | Mn carbonate |
| 9 | Mg nitrate |
| 10 | Ti sulfate |
| 11 | Zr nitrate |
| 12 | Ni sulfate |
| 13 | Ce acetate |
| 14 | Zr chloride |
| 15 | La acetate |

TABLE 6

| No. | Chromium-Free Antirust Additive |
| --- | --- |
| 1 | Calcium ion-exchanged silica |
| 2 | Colloidal silica |
| 3 | Fumed silica |
| 4 | Aluminium dihydrogen tripolyphosphate |
| 5 | Aluminium phosphomolybdate |
| 6 | Tetraethylthiuram disulfide |

TABLE 7

| No. | Solid Lubricant | Commercial Product |
| --- | --- | --- |
| 1 | Polyethylene wax | Nippon Seiro's LUVAX 1151 |
| 2 | Polyethylene wax | Ceridust's 3620 |

In Table 8 to Table 19, *1 to *8 mean the following:
*1: No. (plated steel sheet) in Table 1.
*2: No. (water-dispersible resin) in Table 2.
*3: No. (silane coupling agent) in table 3.
*4: No. (phosphoric acid or hexafluoro-metal acid) in Table 4.
*5: No. (water-soluble in organic component) in Table 5.
*6: No. (chromium-free antirust additive) in Table 6.
*7: No. (solid lubricant) in Table 7.
*8: part by mass.

TABLE 8

| Grouping | No. | Plated Steel Sheet *1 | Water-Dispersible Resin Type *2 | Water-Dispersible Resin Amount *8 | Silane Coupling Agent Type *3 | Silane Coupling Agent Amount *8 | Phosphoric acid or Hexafluoro-Metal Acid Type *4 | Phosphoric acid or Hexafluoro-Metal Acid Amount *8 | Water-Soluble Inorganic Component Type *5 | Water-Soluble Inorganic Component Amount *8 | Chromium-Free Antirust Additive Type *6 | Chromium-Free Antirust Additive Amount *8 | Lubricant Type *7 | Lubricant Amount *8 |
|---|---|---|---|---|---|---|---|---|---|---|---|---|---|---|
| Comparative Example | 1 | 1 | — | 0 | 1 | 25 | 1 | 40 | — | 0 | — | 0 | — | 0 |
| Comparative Example | 2 | 1 | 1 | 100 | — | 0 | 1 | 40 | — | 0 | — | 0 | — | 0 |
| Inventive Example | 3 | 1 | 1 | 100 | 1 | 5 | 1 | 40 | — | 0 | — | 0 | — | 0 |
| Inventive Example | 4 | 1 | 1 | 100 | 1 | 15 | 1 | 40 | — | 0 | — | 0 | — | 0 |
| Inventive Example | 5 | 1 | 1 | 100 | 1 | 50 | 1 | 40 | — | 0 | — | 0 | — | 0 |
| Inventive Example | 6 | 1 | 1 | 100 | 1 | 100 | 1 | 40 | — | 0 | — | 0 | — | 0 |
| Comparative Example | 7 | 1 | 1 | 100 | 1 | 500 | 1 | 40 | — | 0 | — | 0 | — | 0 |
| Comparative Example | 8 | 1 | 1 | 100 | 1 | 25 | — | 0 | — | 0 | — | 0 | — | 0 |
| Inventive Example | 9 | 1 | 1 | 100 | 1 | 25 | 1 | 1 | — | 0 | — | 0 | — | 0 |
| Inventive Example | 10 | 1 | 1 | 100 | 1 | 25 | 1 | 5 | — | 0 | — | 0 | — | 0 |
| Inventive Example | 11 | 1 | 1 | 100 | 1 | 25 | 1 | 20 | — | 0 | — | 0 | — | 0 |
| Inventive Example | 12 | 1 | 1 | 100 | 1 | 25 | 1 | 40 | — | 0 | — | 0 | — | 0 |
| Comparative Example | 13 | 1 | 1 | 100 | 1 | 25 | 1 | 100 | — | 0 | — | 0 | — | 0 |
| Inventive Example | 14 | 1 | 1 | 100 | 1 | 25 | 1 | 40 | 1 | 0.5 | — | 0 | — | 0 |
| Inventive Example | 15 | 1 | 1 | 100 | 1 | 25 | 1 | 40 | 1 | 5 | — | 0 | — | 0 |
| Inventive Example | 16 | 1 | 1 | 100 | 1 | 25 | 1 | 40 | 1 | 10 | — | 0 | — | 0 |
| Inventive Example | 17 | 1 | 1 | 100 | 1 | 25 | 1 | 40 | 1 | 30 | — | 0 | — | 0 |
| Inventive Example | 18 | 1 | 1 | 100 | 1 | 25 | 1 | 40 | 1 | 50 | — | 0 | — | 0 |
| Comparative Example | 19 | 1 | 1 | 100 | 1 | 25 | 1 | 40 | 1 | 80 | — | 0 | — | 0 |
| Inventive Example | 20 | 1 | 1 | 100 | 1 | 25 | 1 | 40 | — | 0 | 1 | 0.5 | — | 0 |
| Inventive Example | 21 | 1 | 1 | 100 | 1 | 25 | 1 | 40 | — | 0 | 1 | 10 | — | 0 |

TABLE 9

| Grouping | No. | Film Thickness (μm) | Baking Temperature (° C.) | Film Appearance | White Rust Resistance | Electro-conductivity | Paint Adhesiveness |
|---|---|---|---|---|---|---|---|
| Comparative Example | 1 | 1.0 | 140 | Δ | X | ○ | ⊙ |
| Comparative Example | 2 | 1.0 | 140 | ○ | X | ○ | Δ |
| Inventive Example | 3 | 1.0 | 140 | ○ | ○ | ○ | ⊙ |
| Inventive Example | 4 | 1.0 | 140 | ○ | ⊙ | ○ | ⊙ |
| Inventive Example | 5 | 1.0 | 140 | ○ | ⊙ | ○ | ⊙ |
| Inventive Example | 6 | 1.0 | 140 | ○ | ○ | ○ | ⊙ |
| Comparative Example | 7 | 1.0 | 140 | ○ | X | ○ | ⊙ |
| Comparative Example | 8 | 1.0 | 140 | ○ | Δ | ○ | ⊙ |
| Inventive Example | 9 | 1.0 | 140 | ○ | ○ | ○ | ⊙ |
| Inventive Example | 10 | 1.0 | 140 | ○ | ⊙ | ○ | ⊙ |
| Inventive Example | 11 | 1.0 | 140 | ○ | ⊙ | ○ | ⊙ |
| Inventive Example | 12 | 1.0 | 140 | ○ | ⊙ | ○ | ⊙ |
| Comparative Example | 13 | 1.0 | 140 | X | Δ | ○ | ⊙ |
| Inventive Example | 14 | 1.0 | 140 | ○ | ⊙ | ○ | ⊙ |
| Inventive Example | 15 | 1.0 | 140 | ○ | ⊙ | ○ | ⊙ |
| Inventive Example | 16 | 1.0 | 140 | ○ | ⊙ | ○ | ⊙ |
| Inventive Example | 17 | 1.0 | 140 | ○ | ⊙ | ○ | ⊙ |
| Inventive Example | 18 | 1.0 | 140 | ○ | ○ | ○ | ⊙ |
| Comparative Example | 19 | 1.0 | 140 | X | Δ | ○ | ⊙ |
| Inventive Example | 20 | 1.0 | 140 | ○ | ⊙ | ○ | ⊙ |
| Inventive Example | 21 | 1.0 | 140 | ○ | ⊙ | ○ | ⊙ |

TABLE 10

| Grouping | No. | Plated Steel Sheet *1 | Water-Dispersible Resin Type *2 | Water-Dispersible Resin Amount *8 | Silane Coupling Agent Type *3 | Silane Coupling Agent Amount *8 | Phosphoric acid or Hexafluoro-Metal Acid Type *4 | Phosphoric acid or Hexafluoro-Metal Acid Amount *8 | Water-Soluble Inorganic Component Type *5 | Water-Soluble Inorganic Component Amount *8 | Chromium-Free Antirust Additive Type *6 | Chromium-Free Antirust Additive Amount *8 | Lubricant Type *7 | Lubricant Amount *8 |
|---|---|---|---|---|---|---|---|---|---|---|---|---|---|---|
| Inventive Example | 22 | 1 | 1 | 100 | 1 | 25 | 1 | 40 | — | 0 | 1 | 30 | — | 0 |
| Comparative Example | 23 | 1 | 1 | 100 | 1 | 25 | 1 | 40 | — | 0 | 1 | 70 | — | 0 |
| Inventive Example | 24 | 1 | 1 | 100 | 1 | 25 | 1 | 40 | 1 | 5 | 1 | 0.5 | — | 0 |
| Inventive Example | 25 | 1 | 1 | 100 | 1 | 25 | 1 | 40 | 1 | 5 | 1 | 10 | — | 0 |
| Inventive Example | 26 | 1 | 1 | 100 | 1 | 25 | 1 | 40 | 1 | 10 | 1 | 10 | — | 0 |
| Inventive Example | 27 | 1 | 1 | 100 | 1 | 25 | 1 | 40 | 1 | 10 | 1 | 30 | — | 0 |
| Inventive Example | 28 | 1 | 1 | 100 | 1 | 25 | 1 | 40 | 1 | 50 | 1 | 0.5 | — | 0 |

TABLE 10-continued

| Grouping | No. | Plated Steel Sheet *1 | Water-Dispersible Resin Type *2 | Amount *8 | Silane Coupling Agent Type *3 | Amount *8 | Phosphoric acid or Hexafluoro-Metal Acid Type *4 | Amount *8 | Water-Soluble Inorganic Component Type *5 | Amount *8 | Chromium-Free Antirust Additive Type *6 | Amount *8 | Lubricant Type *7 | Amount *8 |
|---|---|---|---|---|---|---|---|---|---|---|---|---|---|---|
| Comparative Example | 29 | 1 | 1 | 100 | 1 | 25 | 1 | 40 | 1 | 100 | 1 | 50 | — | 0 |
| Inventive Example | 30 | 1 | 1 | 100 | 1 | 25 | 1 | 40 | 1 | 5 | 1 | 10 | 1 | 10 |
| Inventive Example | 31 | 1 | 1 | 100 | 1 | 25 | 1 | 40 | 1 | 5 | 1 | 10 | 1 | 20 |
| Inventive Example | 32 | 1 | 1 | 100 | 1 | 25 | 1 | 40 | 1 | 5 | 1 | 10 | 1 | 40 |
| Comparative Example | 33 | 1 | 1 | 100 | 1 | 25 | 1 | 40 | 1 | 5 | 1 | 10 | 1 | 60 |
| Comparative Example | 34 | 1 | 1 | 100 | 1 | 25 | 1 | 40 | 1 | 5 | 1 | 10 | — | 0 |
| Inventive Example | 35 | 1 | 1 | 100 | 1 | 25 | 1 | 40 | 1 | 5 | 1 | 10 | — | 0 |
| Inventive Example | 36 | 1 | 1 | 100 | 1 | 25 | 1 | 40 | 1 | 5 | 1 | 10 | — | 0 |
| Inventive Example | 37 | 1 | 1 | 100 | 1 | 25 | 1 | 40 | 1 | 5 | 1 | 10 | — | 0 |
| Inventive Example | 38 | 1 | 1 | 100 | 1 | 25 | 1 | 40 | 1 | 5 | 1 | 10 | — | 0 |
| Comparative Example | 39 | 1 | 1 | 100 | 1 | 25 | 1 | 40 | 1 | 5 | 1 | 10 | — | 0 |
| Comparative Example | 40 | 1 | 1 | 100 | 1 | 25 | 1 | 40 | 1 | 5 | 1 | 10 | — | 0 |
| Inventive Example | 41 | 1 | 1 | 100 | 1 | 25 | 1 | 40 | 1 | 5 | 1 | 10 | — | 0 |
| Inventive Example | 42 | 1 | 1 | 100 | 1 | 25 | 1 | 40 | 1 | 5 | 1 | 10 | — | 0 |

TABLE 11

| Grouping | No. | Film Thickness (μm) | Baking Temperature (° C.) | Film Appearance | White Rust Resistance | Electro-conductivity | Paint Adhesiveness |
|---|---|---|---|---|---|---|---|
| Inventive Example | 22 | 1.0 | 140 | ○ | ○ | ○ | ◉ |
| Comparative Example | 23 | 1.0 | 140 | ○ | Δ | ○ | ◉ |
| Inventive Example | 24 | 1.0 | 140 | ○ | ◉ | ○ | ◉ |
| Inventive Example | 25 | 1.0 | 140 | ○ | ◉ | ○ | ◉ |
| Inventive Example | 26 | 1.0 | 140 | ○ | ◉ | ○ | ◉ |
| Inventive Example | 27 | 1.0 | 140 | ○ | ○ | ○ | ◉ |
| Inventive Example | 28 | 1.0 | 140 | ○ | ○ | ○ | ◉ |
| Comparative Example | 29 | 1.0 | 140 | X | X | ○ | ◉ |
| Inventive Example | 30 | 1.0 | 140 | ○ | ◉ | ○ | ◉ |
| Inventive Example | 31 | 1.0 | 140 | ○ | ◉ | ○ | ◉ |
| Inventive Example | 32 | 1.0 | 140 | ○ | ○ | ○ | ◉ |
| Comparative Example | 33 | 1.0 | 140 | ○ | X | ○ | ◉ |
| Comparative Example | 34 | 0.01 | 140 | ○ | X | ○ | ◉ |
| Inventive Example | 35 | 0.1 | 140 | ○ | ○ | ○ | ◉ |
| Inventive Example | 36 | 0.5 | 140 | ○ | ◉ | ○ | ◉ |
| Inventive Example | 37 | 1.0 | 140 | ○ | ◉ | ○ | ◉ |
| Inventive Example | 38 | 5.0 | 140 | ○ | ◉ | Δ | ◉ |
| Comparative Example | 39 | 7.0 | 140 | ○ | ◉ | X | ◉ |
| Comparative Example | 40 | 1.0 | 25 | ○ | X | ○ | ○ |
| Inventive Example | 41 | 1.0 | 50 | ○ | ○ | ○ | ◉ |
| Inventive Example | 42 | 1.0 | 100 | ○ | ◉ | ○ | ◉ |

TABLE 12

| Grouping | No. | Plated Steel Sheet *1 | Water-Dispersible Resin Type *2 | Amount *8 | Silane Coupling Agent Type *3 | Amount *8 | Phosphoric acid or Hexafluoro-Metal Acid Type *4 | Amount *8 | Water-Soluble Inorganic Component Type *5 | Amount *8 | Chromium-Free Antirust Additive Type *6 | Amount *8 | Lubricant Type *7 | Amount *8 |
|---|---|---|---|---|---|---|---|---|---|---|---|---|---|---|
| Inventive Example | 43 | 1 | 1 | 100 | 1 | 25 | 1 | 40 | 1 | 5 | 1 | 10 | — | 0 |
| Inventive Example | 44 | 1 | 1 | 100 | 1 | 25 | 1 | 40 | 1 | 5 | 1 | 10 | — | 0 |
| Inventive Example | 45 | 1 | 1 | 100 | 1 | 25 | 1 | 40 | 1 | 5 | 1 | 10 | — | 0 |
| Comparative Example | 46 | 1 | 1 | 100 | 1 | 25 | 1 | 40 | 1 | 5 | 1 | 10 | — | 0 |
| Inventive Example | 47 | 2 | 1 | 100 | 1 | 25 | 1 | 40 | 1 | 5 | 1 | 10 | — | 0 |
| Inventive Example | 48 | 3 | 1 | 100 | 1 | 25 | 1 | 40 | 1 | 5 | 1 | 10 | — | 0 |
| Inventive Example | 49 | 4 | 1 | 100 | 1 | 25 | 1 | 40 | 1 | 5 | 1 | 10 | — | 0 |
| Inventive Example | 50 | 5 | 1 | 100 | 1 | 25 | 1 | 40 | 1 | 5 | 1 | 10 | — | 0 |
| Inventive Example | 51 | 6 | 1 | 100 | 1 | 25 | 1 | 40 | 1 | 5 | 1 | 10 | — | 0 |
| Inventive Example | 52 | 7 | 1 | 100 | 1 | 25 | 1 | 40 | 1 | 5 | 1 | 10 | — | 0 |
| Inventive Example | 53 | 8 | 1 | 100 | 1 | 25 | 1 | 40 | 1 | 5 | 1 | 10 | — | 0 |
| Inventive Example | 54 | 9 | 1 | 100 | 1 | 25 | 1 | 40 | 1 | 5 | 1 | 10 | — | 0 |
| Inventive Example | 55 | 10 | 1 | 100 | 1 | 25 | 1 | 40 | 1 | 5 | 1 | 10 | — | 0 |
| Inventive Example | 56 | 11 | 1 | 100 | 1 | 25 | 1 | 40 | 1 | 5 | 1 | 10 | — | 0 |

TABLE 12-continued

| Grouping | No. | Plated Steel Sheet *1 | Water-Dispersible Resin Type *2 | Water-Dispersible Resin Amount *8 | Silane Coupling Agent Type *3 | Silane Coupling Agent Amount *8 | Phosphoric acid or Hexafluoro-Metal Acid Type *4 | Phosphoric acid or Hexafluoro-Metal Acid Amount *8 | Water-Soluble Inorganic Component Type *5 | Water-Soluble Inorganic Component Amount *8 | Chromium-Free Antirust Additive Type *6 | Chromium-Free Antirust Additive Amount *8 | Lubricant Type *7 | Lubricant Amount *8 |
|---|---|---|---|---|---|---|---|---|---|---|---|---|---|---|
| Inventive Example | 57 | 12 | 1 | 100 | 1 | 25 | 1 | 40 | 1 | 5 | 1 | 10 | — | 0 |
| Inventive Example | 58 | 13 | 1 | 100 | 1 | 25 | 1 | 40 | 1 | 5 | 1 | 10 | — | 0 |
| Comparative Example | 59 | 1 | 2 | 100 | 1 | 25 | 1 | 40 | 1 | 5 | 1 | 10 | — | 0 |
| Inventive Example | 60 | 1 | 1 | 100 | 2 | 25 | 1 | 40 | 1 | 5 | 1 | 10 | — | 0 |
| Inventive Example | 61 | 1 | 1 | 100 | 3 | 25 | 1 | 40 | 1 | 5 | 1 | 10 | — | 0 |
| Inventive Example | 62 | 1 | 1 | 100 | 4 | 25 | 1 | 40 | 1 | 5 | 1 | 10 | — | 0 |
| Inventive Example | 63 | 1 | 1 | 100 | 5 | 25 | 1 | 40 | 1 | 5 | 1 | 10 | — | 0 |

TABLE 13

| Grouping | No. | Film Thickness (μm) | Baking Temperature (° C.) | Film Appearance | White Rust Resistance | Electro-conductivity | Paint Adhesiveness |
|---|---|---|---|---|---|---|---|
| Inventive Example | 43 | 1.0 | 200 | ◯ | ◎ | ◯ | ◎ |
| Inventive Example | 44 | 1.0 | 250 | ◯ | ◎ | ◯ | ◎ |
| Inventive Example | 45 | 1.0 | 300 | ◯ | ◯ | ◯ | ◎ |
| Comparative Example | 46 | 1.0 | 350 | ◯ | Δ | ◯ | ◎ |
| Inventive Example | 47 | 1.0 | 140 | ◯ | ◎ | ◯ | ◎ |
| Inventive Example | 48 | 1.0 | 140 | ◯ | ◎ | ◯ | ◎ |
| Inventive Example | 49 | 1.0 | 140 | ◯ | ◎ | ◯ | ◎ |
| Inventive Example | 50 | 1.0 | 140 | ◯ | ◎ | ◯ | ◎ |
| Inventive Example | 51 | 1.0 | 140 | ◯ | ◎ | ◯ | ◎ |
| Inventive Example | 52 | 1.0 | 140 | ◯ | ◎ | ◯ | ◎ |
| Inventive Example | 53 | 1.0 | 140 | ◯ | ◎ | ◯ | ◎ |
| Inventive Example | 54 | 1.0 | 140 | ◯ | ◎ | ◯ | ◎ |
| Inventive Example | 55 | 1.0 | 140 | ◯ | ◎ | ◯ | ◎ |
| Inventive Example | 56 | 1.0 | 140 | ◯ | ◎ | ◯ | ◎ |
| Inventive Example | 57 | 1.0 | 140 | ◯ | ◎ | ◯ | ◎ |
| Inventive Example | 58 | 1.0 | 140 | ◯ | ◎ | ◯ | ◎ |
| Comparative Example | 59 | 1.0 | 140 | ◯ | Δ | ◯ | ◎ |
| Inventive Example | 60 | 1.0 | 140 | ◯ | ◎ | ◯ | ◎ |
| Inventive Example | 61 | 1.0 | 140 | ◯ | ◎ | ◯ | ◎ |
| Inventive Example | 62 | 1.0 | 140 | ◯ | ◎ | ◯ | ◎ |
| Inventive Example | 63 | 1.0 | 140 | ◯ | ◎ | ◯ | ◎ |

TABLE 14

| Grouping | No. | Plated Steel Sheet *1 | Water-Dispersible Resin Type *2 | Water-Dispersible Resin Amount *8 | Silane Coupling Agent Type *3 | Silane Coupling Agent Amount *8 | Phosphoric acid or Hexafluoro-Metal Acid Type *4 | Phosphoric acid or Hexafluoro-Metal Acid Amount *8 | Water-Soluble Inorganic Component Type *5 | Water-Soluble Inorganic Component Amount *8 | Chromium-Free Antirust Additive Type *6 | Chromium-Free Antirust Additive Amount *8 | Lubricant Type *7 | Lubricant Amount *8 |
|---|---|---|---|---|---|---|---|---|---|---|---|---|---|---|
| Inventive Example | 64 | 1 | 1 | 100 | 6 | 25 | 1 | 40 | 1 | 5 | 1 | 10 | — | 0 |
| Inventive Example | 65 | 1 | 1 | 100 | 7 | 25 | 1 | 40 | 1 | 5 | 1 | 10 | — | 0 |
| Inventive Example | 66 | 1 | 1 | 100 | 8 | 25 | 1 | 40 | 1 | 5 | 1 | 10 | — | 0 |
| Inventive Example | 67 | 1 | 1 | 100 | 1 | 25 | 2 | 40 | 1 | 5 | 1 | 10 | — | 0 |
| Inventive Example | 68 | 1 | 1 | 100 | 1 | 25 | 3 | 40 | 1 | 5 | 1 | 10 | — | 0 |
| Inventive Example | 69 | 1 | 1 | 100 | 1 | 25 | 4 | 40 | 1 | 5 | 1 | 10 | — | 0 |
| Inventive Example | 70 | 1 | 1 | 100 | 1 | 25 | 1 | 40 | 2 | 5 | 1 | 10 | — | 0 |
| Inventive Example | 71 | 1 | 1 | 100 | 1 | 25 | 1 | 40 | 3 | 5 | 1 | 10 | — | 0 |
| Inventive Example | 72 | 1 | 1 | 100 | 1 | 25 | 1 | 40 | 4 | 5 | 1 | 10 | — | 0 |
| Inventive Example | 73 | 1 | 1 | 100 | 1 | 25 | 1 | 40 | 1 | 5 | 2 | 10 | — | 0 |
| Inventive Example | 74 | 1 | 1 | 100 | 1 | 25 | 1 | 40 | 1 | 5 | 3 | 10 | — | 0 |
| Inventive Example | 75 | 1 | 1 | 100 | 1 | 25 | 1 | 40 | 1 | 5 | 4 | 10 | — | 0 |
| Inventive Example | 76 | 1 | 1 | 100 | 1 | 25 | 1 | 40 | 1 | 5 | 5 | 10 | — | 0 |
| Inventive Example | 77 | 1 | 1 | 100 | 1 | 25 | 1 | 40 | 1 | 5 | 6 | 10 | — | 0 |
| Inventive Example | 78 | 1 | 1 | 100 | 1 | 25 | 1 | 40 | 1 | 5 | 1 | 10 | 2 | 10 |
| Inventive Example | 79 | 1 | 1 | 100 | 1 | 25 | 1 | 40 | 1 | 5 | 1 | 10 | — | 0 |
| Inventive Example | 80 | 1 | 1 | 100 | 1 | 25 | 1 | 20 | 5 | 5 | — | 0 | — | 0 |
| Inventive Example | 81 | 1 | 1 | 100 | 1 | 25 | 1 | 20 | 6 | 5 | — | 0 | — | 0 |
| Inventive Example | 82 | 1 | 1 | 100 | 1 | 25 | 1 | 20 | 7 | 5 | — | 0 | — | 0 |

TABLE 14-continued

| Grouping | No. | Plated Steel Sheet *1 | Water-Dispersible Resin Type *2 | Water-Dispersible Resin Amount *8 | Silane Coupling Agent Type *3 | Silane Coupling Agent Amount *8 | Phosphoric acid or Hexafluoro-Metal Acid Type *4 | Phosphoric acid or Hexafluoro-Metal Acid Amount *8 | Water-Soluble Inorganic Component Type *5 | Water-Soluble Inorganic Component Amount *8 | Chromium-Free Antirust Additive Type *6 | Chromium-Free Antirust Additive Amount *8 | Lubricant Type *7 | Lubricant Amount *8 |
|---|---|---|---|---|---|---|---|---|---|---|---|---|---|---|
| Inventive Example | 83 | 1 | 1 | 100 | 1 | 25 | 1 | 20 | 8 | 5 | — | 0 | — | 0 |
| Inventive Example | 84 | 1 | 1 | 100 | 1 | 25 | 1 | 20 | 9 | 5 | — | 0 | — | 0 |

TABLE 15

| Grouping | No. | Film Thickness (μm) | Baking Temperature (° C.) | Properties Film Appearance | Properties White Rust Resistance | Properties Electro-conductivity | Properties Paint Adhesiveness |
|---|---|---|---|---|---|---|---|
| Inventive Example | 64 | 1.0 | 140 | ○ | ○ | ○ | ⊚ |
| Inventive Example | 65 | 1.0 | 140 | ○ | ○ | ○ | ⊚ |
| Inventive Example | 66 | 1.0 | 140 | ○ | ○ | ○ | ⊚ |
| Inventive Example | 67 | 1.0 | 140 | ○ | ○ | ○ | ⊚ |
| Inventive Example | 68 | 1.0 | 140 | ○ | ⊚ | ○ | ⊚ |
| Inventive Example | 69 | 1.0 | 140 | ○ | ○ | ○ | ⊚ |
| Inventive Example | 70 | 1.0 | 140 | ○ | ⊚ | ○ | ⊚ |
| Inventive Example | 71 | 1.0 | 140 | ○ | ○ | ○ | ⊚ |
| Inventive Example | 72 | 1.0 | 140 | ○ | ⊚ | ○ | ⊚ |
| Inventive Example | 73 | 1.0 | 140 | ○ | ○— | ○ | ⊚ |
| Inventive Example | 74 | 1.0 | 140 | ○ | ○ | ○ | ⊚ |
| Inventive Example | 75 | 1.0 | 140 | ○ | ⊚ | ○ | ⊚ |
| Inventive Example | 76 | 1.0 | 140 | ○ | ⊚ | ○ | ⊚ |
| Inventive Example | 77 | 1.0 | 140 | ○ | ⊚ | ○ | ⊚ |
| Inventive Example | 78 | 1.0 | 140 | ○ | ⊚ | ○ | ⊚ |
| Inventive Example | 79 | upper layer/lower layer = 0.5/0.5 * | 140 | ○ | ⊚ | ○ | ⊚ |
| Inventive Example | 80 | 1.0 | 140 | ○ | ⊚ | ○ | ⊚ |
| Inventive Example | 81 | 1.0 | 140 | ○ | ⊚ | ○ | ⊚ |
| Inventive Example | 82 | 1.0 | 140 | ○ | ⊚ | ○ | ⊚ |
| Inventive Example | 83 | 1.0 | 140 | ○ | ⊚ | ○ | ⊚ |
| Inventive Example | 84 | 1.0 | 140 | ○ | ⊚ | ○ | ⊚ |

* upper layer: organic resin film

TABLE 16

| Grouping | No. | Plated Steel Sheet *1 | Water-Dispersible Resin Type *2 | Water-Dispersible Resin Amount *8 | Silane Coupling Agent Type *3 | Silane Coupling Agent Amount *8 | Phosphoric acid or Hexafluoro-Metal Acid Type *4 | Phosphoric acid or Hexafluoro-Metal Acid Amount *8 | Water-Soluble Inorganic Component Type *5 | Water-Soluble Inorganic Component Amount *8 | Chromium-Free Antirust Additive Type *6 | Chromium-Free Antirust Additive Amount *8 | Lubricant Type *7 | Lubricant Amount *8 |
|---|---|---|---|---|---|---|---|---|---|---|---|---|---|---|
| Inventive Example | 85 | 1 | 1 | 100 | 1 | 25 | 1 | 20 | 10 | 5 | — | 0 | — | 0 |
| Inventive Example | 86 | 1 | 1 | 100 | 1 | 25 | 1 | 20 | 11 | 5 | — | 0 | — | 0 |
| Inventive Example | 87 | 1 | 1 | 100 | 1 | 25 | 1 | 20 | 12 | 5 | — | 0 | — | 0 |
| Inventive Example | 88 | 1 | 1 | 100 | 1 | 25 | 1 | 20 | 13 | 5 | — | 0 | — | 0 |
| Inventive Example | 89 | 1 | 1 | 100 | 1 | 25 | 1 | 20 | 14 | 5 | — | 0 | — | 0 |
| Inventive Example | 90 | 1 | 1 | 100 | 1 | 25 | 1 | 20 | 15 | 5 | — | 0 | — | 0 |
| Inventive Example | 91 | 1 | 1 | 100 | 1 | 25 | 1 | 20 | 5 | 0.5 | — | 0 | — | 0 |
| Inventive Example | 92 | 1 | 1 | 100 | 1 | 25 | 1 | 20 | 5 | 5 | — | 0 | — | 0 |
| Inventive Example | 93 | 1 | 1 | 100 | 1 | 25 | 1 | 20 | 5 | 10 | — | 0 | — | 0 |
| Inventive Example | 94 | 1 | 1 | 100 | 1 | 25 | 1 | 20 | 5 | 30 | — | 0 | — | 0 |
| Inventive Example | 95 | 1 | 1 | 100 | 1 | 25 | 1 | 20 | 5 | 50 | — | 0 | — | 0 |
| Comparative Example | 96 | 1 | 1 | 100 | 1 | 25 | 1 | 20 | 5 | 80 | — | 0 | — | 0 |
| Inventive Example | 97 | 1 | 1 | 100 | 1 | 25 | 1 | 20 | 5 | 5 | 1 | 0.5 | — | 0 |
| Inventive Example | 98 | 1 | 1 | 100 | 1 | 25 | 1 | 20 | 5 | 5 | 1 | 10 | — | 0 |
| Inventive Example | 99 | 1 | 1 | 100 | 1 | 25 | 1 | 20 | 5 | 10 | 1 | 10 | — | 0 |
| Inventive Example | 100 | 1 | 1 | 100 | 1 | 25 | 1 | 20 | 5 | 10 | 1 | 30 | — | 0 |
| Inventive Example | 101 | 1 | 1 | 100 | 1 | 25 | 1 | 20 | 5 | 50 | 1 | 0.5 | — | 0 |
| Inventive Example | 102 | 1 | 1 | 100 | 1 | 25 | 1 | 20 | 5 | 50 | 1 | 30 | — | 0 |
| Comparative Example | 103 | 1 | 1 | 100 | 1 | 25 | 1 | 20 | 5 | 100 | 1 | 50 | — | 0 |
| Inventive Example | 104 | 1 | 1 | 100 | 1 | 25 | 1 | 20 | 5 | 5 | 1 | 10 | 1 | 10 |
| Inventive Example | 105 | 1 | 1 | 100 | 1 | 25 | 1 | 20 | 5 | 5 | 1 | 10 | 1 | 20 |

TABLE 17

| Grouping | No. | Film Thickness (μm) | Baking Temperature (° C.) | Film Appearance | White Rust Resistance | Electro-conductivity | Paint Adhesiveness |
|---|---|---|---|---|---|---|---|
| Inventive Example | 85 | 1.0 | 140 | ○ | ⊙ | ○ | ⊙ |
| Inventive Example | 86 | 1.0 | 140 | ○ | ⊙ | ○ | ⊙ |
| Inventive Example | 87 | 1.0 | 140 | ○ | ⊙ | ○ | ⊙ |
| Inventive Example | 88 | 1.0 | 140 | ○ | ⊙ | ○ | ⊙ |
| Inventive Example | 89 | 1.0 | 140 | ○ | ⊙ | ○ | ⊙ |
| Inventive Example | 90 | 1.0 | 140 | ○ | ⊙ | ○ | ⊙ |
| Inventive Example | 91 | 1.0 | 140 | ○ | ⊙ | ○ | ⊙ |
| Inventive Example | 92 | 1.0 | 140 | ○ | ⊙ | ○ | ⊙ |
| Inventive Example | 93 | 1.0 | 140 | ○ | ⊙ | ○ | ⊙ |
| Inventive Example | 94 | 1.0 | 140 | ○ | ⊙ | ○ | ⊙ |
| Inventive Example | 95 | 1.0 | 140 | ○ | ○ | ○ | ⊙ |
| Comparative Example | 96 | 1.0 | 140 | X | Δ | ○ | ⊙ |
| Inventive Example | 97 | 1.0 | 140 | ○ | ⊙ | ○ | ⊙ |
| Inventive Example | 98 | 1.0 | 140 | ○ | ⊙ | ○ | ⊙ |
| Inventive Example | 99 | 1.0 | 140 | ○ | ⊙ | ○ | ⊙ |
| Inventive Example | 100 | 1.0 | 140 | ○ | ○ | ○ | ⊙ |
| Inventive Example | 101 | 1.0 | 140 | ○ | ○ | ○ | ⊙ |
| Inventive Example | 102 | 1.0 | 140 | ○ | ○ | ○ | ⊙ |
| Comparative Example | 103 | 1.0 | 140 | X | X | ○ | ⊙ |
| Inventive Example | 104 | 1.0 | 140 | ○ | ⊙ | ○ | ⊙ |
| Inventive Example | 105 | 1.0 | 140 | ○ | ⊙ | ○ | ⊙ |

TABLE 18

| Grouping | No. | Plated Steel Sheet *1 | Water-Dispersible Resin Type *2 | Water-Dispersible Resin Amount *8 | Silane Coupling Agent Type *3 | Silane Coupling Agent Amount *8 | Phosphoric acid or Hexafluoro-Metal Acid Type *4 | Phosphoric acid or Hexafluoro-Metal Acid Amount *8 | Water-Soluble Inorganic Component Type *5 | Water-Soluble Inorganic Component Amount *8 | Chromium-Free Antirust Additive Type *6 | Chromium-Free Antirust Additive Amount *8 | Lubricant Type *7 | Lubricant Amount *8 |
|---|---|---|---|---|---|---|---|---|---|---|---|---|---|---|
| Inventive Example | 106 | 1 | 1 | 100 | 1 | 25 | 1 | 20 | 5 | 5 | 1 | 10 | 1 | 40 |
| Comparative Example | 107 | 1 | 1 | 100 | 1 | 25 | 1 | 20 | 5 | 5 | 1 | 10 | 1 | 60 |
| Comparative Example | 108 | 1 | 1 | 100 | 1 | 25 | 1 | 40 | 5 | 5 | — | 0 | — | 0 |
| Inventive Example | 109 | 1 | 1 | 100 | 1 | 25 | 1 | 40 | 5 | 5 | — | 0 | — | 0 |
| Inventive Example | 110 | 1 | 1 | 100 | 1 | 25 | 1 | 40 | 5 | 5 | — | 0 | — | 0 |
| Inventive Example | 111 | 1 | 1 | 100 | 1 | 25 | 1 | 40 | 5 | 5 | — | 0 | — | 0 |
| Inventive Example | 112 | 1 | 1 | 100 | 1 | 25 | 1 | 40 | 5 | 5 | — | 0 | — | 0 |
| Comparative Example | 113 | 1 | 1 | 100 | 1 | 25 | 1 | 40 | 5 | 5 | — | 0 | — | 0 |
| Comparative Example | 114 | 1 | 1 | 100 | 1 | 25 | 1 | 40 | 5 | 5 | — | 0 | — | 0 |
| Inventive Example | 115 | 1 | 1 | 100 | 1 | 25 | 1 | 40 | 5 | 5 | — | 0 | — | 0 |
| Inventive Example | 116 | 1 | 1 | 100 | 1 | 25 | 1 | 40 | 5 | 5 | — | 0 | — | 0 |
| Inventive Example | 117 | 1 | 1 | 100 | 1 | 25 | 1 | 40 | 5 | 5 | — | 0 | — | 0 |
| Inventive Example | 118 | 1 | 1 | 100 | 1 | 25 | 1 | 40 | 5 | 5 | — | 0 | — | 0 |
| Inventive Example | 119 | 1 | 1 | 100 | 1 | 25 | 1 | 40 | 5 | 5 | — | 0 | — | 0 |
| Comparative Example | 120 | 1 | 1 | 100 | 1 | 25 | 1 | 40 | 5 | 5 | — | 0 | — | 0 |
| Comparative Example | 121 | 1 | 2 | 100 | 1 | 25 | 1 | 40 | 5 | 5 | — | 0 | — | 0 |

TABLE 19

| Grouping | No. | Film Thickness (μm) | Baking Temperature (° C.) | Film Appearance | White Rust Resistance | Electro-conductivity | Paint Adhesiveness |
|---|---|---|---|---|---|---|---|
| Inventive Example | 106 | 1.0 | 140 | ○ | Δ | ○ | ⊙ |
| Comparative Example | 107 | 1.0 | 140 | ○ | X | ○ | ⊙ |
| Comparative Example | 108 | 0.01 | 140 | ○ | X | ○ | ⊙ |
| Inventive Example | 109 | 0.1 | 140 | ○ | ⊙ | ○ | ⊙ |
| Inventive Example | 110 | 0.5 | 140 | ○ | ⊙ | ○ | ⊙ |
| Inventive Example | 111 | 1.0 | 140 | ○ | ⊙ | ○ | ⊙ |
| Inventive Example | 112 | 5.0 | 140 | ○ | ⊙ | Δ | ⊙ |
| Comparative Example | 113 | 7.0 | 140 | ○ | ⊙ | X | ⊙ |
| Comparative Example | 114 | 1.0 | 25 | ○ | X | ○ | ○ |
| Inventive Example | 115 | 1.0 | 50 | ○ | ⊙ | ○ | ⊙ |
| Inventive Example | 116 | 1.0 | 100 | ○ | ⊙ | ○ | ⊙ |
| Inventive Example | 117 | 1.0 | 200 | ○ | ⊙ | ○ | ⊙ |
| Inventive Example | 118 | 1.0 | 250 | ○ | ⊙ | ○ | ⊙ |
| Inventive Example | 119 | 1.0 | 300 | ○ | ○ | ○ | ⊙ |

TABLE 19-continued

| Grouping | No. | Film Thickness (μm) | Baking Temperature (° C.) | Properties | | | |
|---|---|---|---|---|---|---|---|
| | | | | Film Appearance | White Rust Resistance | Electro-conductivity | Paint Adhesiveness |
| Comparative Example | 120 | 1.0 | 350 | ○ | Δ | ○ | ⊚ |
| Comparative Example | 121 | 1.0 | 140 | ○ | X | ○ | ⊚ |

Example 2

An aqueous epoxy resin dispersion as in Table 20 was used for the resin composition for surface-treating compositions. A silane coupling agent (Table 3), a phosphoric acid or hexafluoro-metal acid (Table 4), a water-soluble inorganic component (Table 21), a chromium-free antirust additive (Table 6) and a solid lubricant (Table 7) were suitably added to it, then controlled to have a pH of from 0.5 to 6 with any of aqueous ammonia, nitric acid, acetic acid, sulfuric acid, phosphoric acid, hexafluoro-metal acid or the like added thereto, and stirred for a predetermined period of time with a disperser for paint (sand grinder) to prepare surface-treating compositions.

Plated steel sheets as in Table 1 were processed herein. These are plated steel sheets for electric and electronic appliances for household use, construction materials and automobile parts, and their base is a cold-rolled steel sheet. The thickness of each steel sheet was defined in accordance with the object of evaluation. The surface of the plated steel sheet was degreased with alkali, washed with water, dried, and then coated with the above-mentioned, surface-treating composition by the use of a roll coater, and then dried under heat at a predetermined temperature. The thickness of the film was controlled by varying the solid content (heating residue) of the surface-treating composition or the coating condition (rolling reduction, revolving speed, etc.).

The film composition and the quality (film appearance, white rust resistance, electroconductivity, paint adhesiveness) of the thus-obtained surface-treated steel sheets were evaluated, and the results are given in Table 22 to Table 33. The quality evaluation was effected in the same manner as in [Example 1], but the white rust resistance was evaluated on the basis of the white rust surface after 168 hours.

Methods of producing the aqueous epoxy resin dispersions shown in Table 20 are described below.

Production of Polyalkylene Glycol-Modified Epoxy Resin

Production Example 1

1688 g of polyethylene glycol having a number-average molecular weight of 4000 and 539 g of methyl ethyl ketone were put into a four-neck flask of glass equipped with a thermometer, a stirrer and a condenser tube, and mixed with stirring at 60° C. After the resulting mixture became uniform and transparent, 171 g of tolylene diisocyanate was added thereto and reacted for 2 hours, and then 1121 g of Epikote 834X90 (epoxy resin, by Shell Japan, epoxy equivalent 250), 66 g of diethylene glycol ethyl ether and 1.1 g of 1% dibutyl tin dilaurate solution were added thereto and further reacted for 2 hours. Next, this was heated up to 80° C. and reacted for 3 hours, and it was confirmed that its isocyanate value was at most 0.6. Next, this was heated up to 90° C., and methyl ethyl ketone was removed through distillation under reduced pressure until the solid content of the residue became 81.7%. After the removal, this was diluted with 659 g of propylene glycol monomethyl ether and 270 g of deionized water to be a polyalkylene glycol-modified epoxy resin solution A1 having a solid content of 76%.

Production of Aqueous Epoxy Resin Dispersion

Production Example 2

2029 g of EP1004 (epoxy resin, by Yuka Shell-Epoxy, epoxy equivalent 1000) and 697 g of propylene glycol monobutyl ether were put into a four-neck flask, and heated up to 110° C. to completely dissolve the epoxy resin within 1 hour. 1180 g of the polyalkylene glycol-modified epoxy resin solution A1 obtained in Production Example 1 and 311.7 g of 3-amino-1,2,4-triazole (molecular weight 84) were added to it and reacted at 100° C. for 5 hours, and then 719.6 f of propylene glycol monobutyl ether was added thereto to give a resin solution D1.

257.6 g of the resin solution D1 was mixed with 50 g of MF-K60X (isocyanate curing agent, by Asahi Chemical Industry) and 0.3 g of Scat 24 (curing catalyst) and well stirred, and 692.1 g of water was dropwise added thereto little by little, and mixed, with stirring to give an aqueous epoxy resin dispersion E1.

Production Example 3 (Aqueous Epoxy Resin Dispersion with No Hydrazine Derivative)

2029 g of EP1004 (epoxy resin, by Yuka Shell-Epoxy, epoxy equivalent 1000) and 697 g of propylene glycol monobutyl ether were put into a four-neck flask, and heated up to 110° C. to completely dissolve the epoxy resin within 1 hour. 1180 g of the polyalkylene glycol-modified epoxy resin solution A1 obtained in Production Example 1 and 527.0 g of propylene glycol monobutyl ether were added to it to prepare a resin solution D2.

257.6 g of the resin solution D2 was mixed with 50 g of MF-K60X (isocyanate curing agent, by Asahi Chemical Industry) and 0.3 g of Scat 24 (curing catalyst) and well stirred, and 692.1 g of water was dropwise added thereto little by little, and mixed with stirring to give an aqueous epoxy resin dispersion E2.

TABLE 20

| No. | Aqueous Epoxy Resin Dispersion |
|---|---|
| 1 | E1 described in the text of the specification (Production Example 2) |
| 2 | A1 described in the text of the specification (Production Example 1) |
| 3 | D2 described in the text of the specification (Production Example 3) |

TABLE 20-continued

| No. | Aqueous Epoxy Resin Dispersion |
|---|---|
| 4 | E2 described in the text of the specification (Production Example 3) |

TABLE 21

| No. | Water-Soluble Inorganic Component |
|---|---|
| 1 | Al phosphate |
| 2 | Mn phosphate |
| 3 | Mg phosphate |
| 4 | Ni phosphate |
| 5 | Co nitrate |
| 6 | Al sulfate |
| 7 | Zn acetate |
| 8 | Mn carbonate |
| 9 | Mg nitrate |
| 10 | Ti sulfate |
| 11 | Zr nitrate |

TABLE 21-continued

| No. | Water-Soluble Inorganic Component |
|---|---|
| 12 | Ni sulfate |
| 13 | Ce acetate |
| 14 | Zr chloride |
| 15 | La acetate |

In Table 22 to Table 33, *1 to *8 mean the following:

*1: No. (plated steel sheet) in Table 1.

*2: No. (water-dispersible resin) in Table 20.

*3: No. (silane coupling agent) in table 3.

*4: No. (phosphoric acid or hexafluoro-metal acid) in Table 4.

*5: No. (water-soluble inorganic component) in Table 21.

*6: No. (chromium-free antirust additive) in Table 6.

*7: No. (solid lubricant) in Table 7.

*8: part by mass.

TABLE 22

| Grouping | Plated Steel Sheet No. *1 | Water-Dispersible Resin Type *2 | Water-Dispersible Resin Amount *8 | Silane Coupling Agent Type *3 | Silane Coupling Agent Amount *8 | Phosphoric acid or Hexafluoro-Metal Acid Type *4 | Phosphoric acid or Hexafluoro-Metal Acid Amount *8 | Water-Soluble Inorganic Component Type *5 | Water-Soluble Inorganic Component Amount *8 | Chromium-Free Antirust Additive Type *6 | Chromium-Free Antirust Additive Amount *8 | Lubricant Type *7 | Lubricant Amount *8 |
|---|---|---|---|---|---|---|---|---|---|---|---|---|---|
| Comparative Example | 1 | 1 | — | 0 | 1 | 25 | 1 | 40 | — | 0 | — | 0 | — | 0 |
| Comparative Example | 2 | 1 | 1 | 100 | — | 0 | 1 | 40 | — | 0 | — | 0 | — | 0 |
| Inventive Example | 3 | 1 | 1 | 100 | 1 | 5 | 1 | 40 | — | 0 | — | 0 | — | 0 |
| Inventive Example | 4 | 1 | 1 | 100 | 1 | 15 | 1 | 40 | — | 0 | — | 0 | — | 0 |
| Inventive Example | 5 | 1 | 1 | 100 | 1 | 50 | 1 | 40 | — | 0 | — | 0 | — | 0 |
| Inventive Example | 6 | 1 | 1 | 100 | 1 | 100 | 1 | 40 | — | 0 | — | 0 | — | 0 |
| Comparative Example | 7 | 1 | 1 | 100 | 1 | 500 | 1 | 40 | — | 0 | — | 0 | — | 0 |
| Comparative Example | 8 | 1 | 1 | 100 | 1 | 25 | — | 0 | — | 0 | — | 0 | — | 0 |
| Inventive Example | 9 | 1 | 1 | 100 | 1 | 25 | 1 | 1 | — | 0 | — | 0 | — | 0 |
| Inventive Example | 10 | 1 | 1 | 100 | 1 | 25 | 1 | 5 | — | 0 | — | 0 | — | 0 |
| Inventive Example | 11 | 1 | 1 | 100 | 1 | 25 | 1 | 20 | — | 0 | — | 0 | — | 0 |
| Inventive Example | 12 | 1 | 1 | 100 | 1 | 25 | 1 | 40 | — | 0 | — | 0 | — | 0 |
| Comparative Example | 13 | 1 | 1 | 100 | 1 | 25 | 1 | 100 | — | 0 | — | 0 | — | 0 |
| Inventive Example | 14 | 1 | 1 | 100 | 1 | 25 | 1 | 40 | 1 | 0.5 | — | 0 | — | 0 |
| Inventive Example | 15 | 1 | 1 | 100 | 1 | 25 | 1 | 40 | 1 | 5 | — | 0 | — | 0 |
| Inventive Example | 16 | 1 | 1 | 100 | 1 | 25 | 1 | 40 | 1 | 10 | — | 0 | — | 0 |
| Inventive Example | 17 | 1 | 1 | 100 | 1 | 25 | 1 | 40 | 1 | 30 | — | 0 | — | 0 |
| Inventive Example | 18 | 1 | 1 | 100 | 1 | 25 | 1 | 40 | 1 | 50 | — | 0 | — | 0 |
| Comparative Example | 19 | 1 | 1 | 100 | 1 | 25 | 1 | 40 | 1 | 80 | — | 0 | — | 0 |
| Inventive Example | 20 | 1 | 1 | 100 | 1 | 25 | 1 | 40 | — | 0 | 1 | 0.5 | — | 0 |
| Inventive Example | 21 | 1 | 1 | 100 | 1 | 25 | 1 | 40 | — | 0 | 1 | 10 | — | 0 |
| Inventive Example | 22 | 1 | 1 | 100 | 1 | 25 | 1 | 40 | — | 0 | 1 | 30 | — | 0 |

TABLE 23

| Grouping | No. | Film Thickness (μm) | Baking Temperature (° C.) | Film Appearance | White Rust Resistance | Electro-conductivity | Paint Adhesiveness |
|---|---|---|---|---|---|---|---|
| Comparative Example | 1 | 1.0 | 140 | Δ | X | ○ | ◎ |
| Comparative Example | 2 | 1.0 | 140 | ○ | X | ○ | Δ |
| Inventive Example | 3 | 1.0 | 140 | ○ | ○ | ○ | ◎ |
| Inventive Example | 4 | 1.0 | 140 | ○ | ◎ | ○ | ◎ |
| Inventive Example | 5 | 1.0 | 140 | ○ | ◎ | ○ | ◎ |
| Inventive Example | 6 | 1.0 | 140 | ○ | ○ | ○ | ◎ |
| Comparative Example | 7 | 1.0 | 140 | ○ | Δ | ○ | ◎ |
| Comparative Example | 8 | 1.0 | 140 | ○ | Δ | ○ | ◎ |
| Inventive Example | 9 | 1.0 | 140 | ○ | ○ | ○ | ◎ |
| Inventive Example | 10 | 1.0 | 140 | ○ | ◎ | ○ | ◎ |
| Inventive Example | 11 | 1.0 | 140 | ○ | ◎ | ○ | ◎ |

TABLE 23-continued

| Grouping | No. | Film Thickness (μm) | Baking Temperature (° C.) | Film Appearance | White Rust Resistance | Electro-conductivity | Paint Adhesiveness |
|---|---|---|---|---|---|---|---|
| Inventive Example | 12 | 1.0 | 140 | ○ | ⊙ | ○ | ⊙ |
| Comparative Example | 13 | 1.0 | 140 | X | Δ | ○ | ⊙ |
| Inventive Example | 14 | 1.0 | 140 | ○ | ⊙ | ○ | ⊙ |
| Inventive Example | 15 | 1.0 | 140 | ○ | ⊙ | ○ | ⊙ |
| Inventive Example | 16 | 1.0 | 140 | ○ | ⊙ | ○ | ⊙ |
| Inventive Example | 17 | 1.0 | 140 | ○ | ⊙ | ○ | ⊙ |
| Inventive Example | 18 | 1.0 | 140 | ○ | ○ | ○ | ⊙ |
| Comparative Example | 19 | 1.0 | 140 | Δ | Δ | ○ | ⊙ |
| Inventive Example | 20 | 1.0 | 140 | ○ | ⊙ | ○ | ⊙ |
| Inventive Example | 21 | 1.0 | 140 | ○ | ⊙ | ○ | ⊙ |
| Inventive Example | 22 | 1.0 | 140 | ○ | ○ | ○ | ⊙ |

TABLE 24

| Grouping | No. | Plated Steel Sheet *1 | Water-Dispersible Resin Type *2 | Water-Dispersible Resin Amount *8 | Silane Coupling Agent Type *3 | Silane Coupling Agent Amount *8 | Phosphoric acid or Hexafluoro-Metal Acid Type *4 | Phosphoric acid or Hexafluoro-Metal Acid Amount *8 | Water-Soluble Inorganic Component Type *5 | Water-Soluble Inorganic Component Amount *8 | Chromium-Free Antirust Additive Type *6 | Chromium-Free Antirust Additive Amount *8 | Lubricant Type *7 | Lubricant Amount *8 |
|---|---|---|---|---|---|---|---|---|---|---|---|---|---|---|
| Comparative Example | 23 | 1 | 1 | 100 | 1 | 25 | 1 | 40 | — | 0 | 1 | 70 | — | 0 |
| Inventive Example | 24 | 1 | 1 | 100 | 1 | 25 | 1 | 40 | 1 | 5 | 1 | 0.5 | — | 0 |
| Inventive Example | 25 | 1 | 1 | 100 | 1 | 25 | 1 | 40 | 1 | 5 | 1 | 10 | — | 0 |
| Inventive Example | 26 | 1 | 1 | 100 | 1 | 25 | 1 | 40 | 1 | 10 | 1 | 10 | — | 0 |
| Inventive Example | 27 | 1 | 1 | 100 | 1 | 25 | 1 | 40 | 1 | 10 | 1 | 30 | — | 0 |
| Inventive Example | 28 | 1 | 1 | 100 | 1 | 25 | 1 | 40 | 1 | 50 | 1 | 0.5 | — | 0 |
| Inventive Example | 29 | 1 | 1 | 100 | 1 | 25 | 1 | 40 | 1 | 5 | 1 | 10 | 1 | 10 |
| Inventive Example | 30 | 1 | 1 | 100 | 1 | 25 | 1 | 40 | 1 | 5 | 1 | 10 | 1 | 20 |
| Inventive Example | 31 | 1 | 1 | 100 | 1 | 25 | 1 | 40 | 1 | 5 | 1 | 10 | 1 | 50 |
| Comparative Example | 32 | 1 | 1 | 100 | 1 | 25 | 1 | 40 | 1 | 5 | 1 | 10 | 1 | 60 |
| Comparative Example | 33 | 1 | 1 | 100 | 1 | 25 | 1 | 40 | 1 | 5 | 1 | 10 | — | 0 |
| Inventive Example | 34 | 1 | 1 | 100 | 1 | 25 | 1 | 40 | 1 | 5 | 1 | 10 | — | 0 |
| Inventive Example | 35 | 1 | 1 | 100 | 1 | 25 | 1 | 40 | 1 | 5 | 1 | 10 | — | 0 |
| Inventive Example | 36 | 1 | 1 | 100 | 1 | 25 | 1 | 40 | 1 | 5 | 1 | 10 | — | 0 |
| Inventive Example | 37 | 1 | 1 | 100 | 1 | 25 | 1 | 40 | 1 | 5 | 1 | 10 | — | 0 |
| Inventive Example | 38 | 1 | 1 | 100 | 1 | 25 | 1 | 40 | 1 | 5 | 1 | 10 | — | 0 |
| Comparative Example | 39 | 1 | 1 | 100 | 1 | 25 | 1 | 40 | 1 | 5 | 1 | 10 | — | 0 |
| Comparative Example | 40 | 1 | 1 | 100 | 1 | 25 | 1 | 40 | 1 | 5 | 1 | 10 | — | 0 |
| Inventive Example | 41 | 1 | 1 | 100 | 1 | 25 | 1 | 40 | 1 | 5 | 1 | 10 | — | 0 |
| Inventive Example | 42 | 1 | 1 | 100 | 1 | 25 | 1 | 40 | 1 | 5 | 1 | 10 | — | 0 |
| Inventive Example | 43 | 1 | 1 | 100 | 1 | 25 | 1 | 40 | 1 | 5 | 1 | 10 | — | 0 |
| Inventive Example | 44 | 1 | 1 | 100 | 1 | 25 | 1 | 40 | 1 | 5 | 1 | 10 | — | 0 |

TABLE 25

| Grouping | No. | Film Thickness (μm) | Baking Temperature (° C.) | Film Appearance | White Rust Resistance | Electro-conductivity | Paint Adhesiveness |
|---|---|---|---|---|---|---|---|
| Comparative Example | 23 | 1.0 | 140 | ○ | Δ | ○ | ⊙ |
| Inventive Example | 24 | 1.0 | 140 | ○ | ⊙ | ○ | ⊙ |
| Inventive Example | 25 | 1.0 | 140 | ○ | ⊙ | ○ | ⊙ |
| Inventive Example | 26 | 1.0 | 140 | ○ | ⊙ | ○ | ⊙ |
| Inventive Example | 27 | 1.0 | 140 | ○ | ○ | ○ | ⊙ |
| Inventive Example | 28 | 1.0 | 140 | ○ | ○ | ○ | ⊙ |
| Inventive Example | 29 | 1.0 | 140 | ○ | ⊙ | ○ | ⊙ |
| Inventive Example | 30 | 1.0 | 140 | ○ | ⊙ | ○ | ⊙ |
| Inventive Example | 31 | 1.0 | 140 | ○ | Δ | ○ | ⊙ |
| Comparative Example | 32 | 1.0 | 140 | ○ | Δ | ○ | ⊙ |
| Comparative Example | 33 | 0.005 | 140 | ○ | X | ○ | ⊙ |
| Inventive Example | 34 | 0.02 | 140 | ○ | ○ | ○ | ⊙ |
| Inventive Example | 35 | 0.1 | 140 | ○ | ⊙ | ○ | ⊙ |
| Inventive Example | 36 | 0.5 | 140 | ○ | ⊙ | ○ | ⊙ |
| Inventive Example | 37 | 1.0 | 140 | ○ | ⊙ | ○ | ⊙ |
| Inventive Example | 38 | 5.0 | 140 | ○ | ⊙ | Δ | ⊙ |
| Comparative Example | 39 | 7.0 | 140 | ○ | ⊙ | X | ⊙ |
| Comparative Example | 40 | 1.0 | 25 | ○ | X | ○ | ○ |

TABLE 25-continued

| Grouping | No. | Film Thickness (μm) | Baking Temperature (° C.) | Film Appearance | White Rust Resistance | Electro-conductivity | Paint Adhesiveness |
|---|---|---|---|---|---|---|---|
| Inventive Example | 41 | 1.0 | 50 | ○ | ○ | ○ | ◎ |
| Inventive Example | 42 | 1.0 | 100 | ○ | ◎ | ○ | ◎ |
| Inventive Example | 43 | 1.0 | 200 | ○ | ◎ | ○ | ◎ |
| Inventive Example | 44 | 1.0 | 250 | ○ | ◎ | ○ | ◎ |

TABLE 26

| Grouping | No. | Plated Steel Sheet *1 | Water-Dispersible Resin | | Silane Coupling Agent | | Phosphoric acid or Hexafluoro-Metal Acid | | Water-Soluble Inorganic Component | | Chromium-Free Antirust Additive | | Lubricant | |
|---|---|---|---|---|---|---|---|---|---|---|---|---|---|---|
| | | | Type *2 | Amount *8 | Type *3 | Amount *8 | Type *4 | Amount *8 | Type *5 | Amount *8 | Type *6 | Amount *8 | Type *7 | Amount *8 |
| Inventive Example | 45 | 1 | 1 | 100 | 1 | 25 | 1 | 40 | 1 | 5 | 1 | 10 | — | 0 |
| Comparative Example | 46 | 1 | 1 | 100 | 1 | 25 | 1 | 40 | 1 | 5 | 1 | 10 | — | 0 |
| Inventive Example | 47 | 2 | 1 | 100 | 1 | 25 | 1 | 40 | 1 | 5 | 1 | 10 | — | 0 |
| Inventive Example | 48 | 3 | 1 | 100 | 1 | 25 | 1 | 40 | 1 | 5 | 1 | 10 | — | 0 |
| Inventive Example | 49 | 4 | 1 | 100 | 1 | 25 | 1 | 40 | 1 | 5 | 1 | 10 | — | 0 |
| Inventive Example | 50 | 5 | 1 | 100 | 1 | 25 | 1 | 40 | 1 | 5 | 1 | 10 | — | 0 |
| Inventive Example | 51 | 6 | 1 | 100 | 1 | 25 | 1 | 40 | 1 | 5 | 1 | 10 | — | 0 |
| Inventive Example | 52 | 7 | 1 | 100 | 1 | 25 | 1 | 40 | 1 | 5 | 1 | 10 | — | 0 |
| Inventive Example | 53 | 8 | 1 | 100 | 1 | 25 | 1 | 40 | 1 | 5 | 1 | 10 | — | 0 |
| Inventive Example | 54 | 9 | 1 | 100 | 1 | 25 | 1 | 40 | 1 | 5 | 1 | 10 | — | 0 |
| Inventive Example | 55 | 10 | 1 | 100 | 1 | 25 | 1 | 40 | 1 | 5 | 1 | 10 | — | 0 |
| Inventive Example | 56 | 11 | 1 | 100 | 1 | 25 | 1 | 40 | 1 | 5 | 1 | 10 | — | 0 |
| Inventive Example | 57 | 12 | 1 | 100 | 1 | 25 | 1 | 40 | 1 | 5 | 1 | 10 | — | 0 |
| Inventive Example | 58 | 13 | 1 | 100 | 1 | 25 | 1 | 40 | 1 | 5 | 1 | 10 | — | 0 |
| Inventive Example | 59 | 14 | 1 | 100 | 1 | 25 | 1 | 40 | 1 | 5 | 1 | 10 | — | 0 |
| Comparative Example | 60 | 1 | 2 | 100 | 1 | 25 | 1 | 40 | 1 | 5 | 1 | 10 | — | 0 |
| Comparative Example | 61 | 1 | 3 | 100 | 1 | 25 | 1 | 40 | 1 | 5 | 1 | 10 | — | 0 |
| Comparative Example | 62 | 1 | 4 | 100 | 1 | 25 | 1 | 40 | 1 | 5 | 1 | 10 | — | 0 |
| Inventive Example | 63 | 1 | 1 | 100 | 2 | 25 | 1 | 40 | 1 | 5 | 1 | 10 | — | 0 |
| Inventive Example | 64 | 1 | 1 | 100 | 3 | 25 | 1 | 40 | 1 | 5 | 1 | 10 | — | 0 |
| Inventive Example | 65 | 1 | 1 | 100 | 4 | 25 | 1 | 40 | 1 | 5 | 1 | 10 | — | 0 |
| Inventive Example | 66 | 1 | 1 | 100 | 5 | 25 | 1 | 40 | 1 | 5 | 1 | 10 | — | 0 |

TABLE 27

| Grouping | No. | Film Thickness (μm) | Baking Temperature (° C.) | Film Appearance | White Rust Resistance | Electro-conductivity | Paint Adhesiveness |
|---|---|---|---|---|---|---|---|
| Inventive Example | 45 | 1.0 | 300 | ○ | ○ | ○ | ◎ |
| Comparative Example | 46 | 1.0 | 350 | ○ | Δ | ○ | ◎ |
| Inventive Example | 47 | 1.0 | 140 | ○ | ◎ | ○ | ◎ |
| Inventive Example | 48 | 1.0 | 140 | ○ | ◎ | ○ | ◎ |
| Inventive Example | 49 | 1.0 | 140 | ○ | ◎ | ○ | ◎ |
| Inventive Example | 50 | 1.0 | 140 | ○ | ◎ | ○ | ◎ |
| Inventive Example | 51 | 1.0 | 140 | ○ | ◎ | ○ | ◎ |
| Inventive Example | 52 | 1.0 | 140 | ○ | ◎ | ○ | ◎ |
| Inventive Example | 53 | 1.0 | 140 | ○ | ◎ | ○ | ◎ |
| Inventive Example | 54 | 1.0 | 140 | ○ | ◎ | ○ | ◎ |
| Inventive Example | 55 | 1.0 | 140 | ○ | ◎ | ○ | ◎ |
| Inventive Example | 56 | 1.0 | 140 | ○ | ◎ | ○ | ◎ |
| Inventive Example | 57 | 1.0 | 140 | ○ | ◎ | ○ | ◎ |
| Inventive Example | 58 | 1.0 | 140 | ○ | ◎ | ○ | ◎ |
| Inventive Example | 59 | 1.0 | 140 | ○ | ◎ | ○ | ◎ |
| Comparative Example | 60 | 1.0 | 140 | ○ | X | ○ | ◎ |
| Comparative Example | 61 | 1.0 | 140 | ○ | X | ○ | ◎ |
| Comparative Example | 62 | 1.0 | 140 | ○ | Δ | ○ | ◎ |
| Inventive Example | 63 | 1.0 | 140 | ○ | ◎ | ○ | ◎ |
| Inventive Example | 64 | 1.0 | 140 | ○ | ◎ | ○ | ◎ |
| Inventive Example | 65 | 1.0 | 140 | ○ | ◎ | ○ | ◎ |
| Inventive Example | 66 | 1.0 | 140 | ○ | ◎ | ○ | ◎ |

TABLE 28

| Grouping | No. | Plated Steel Sheet *1 | Water-Dispersible Resin Type *2 | Water-Dispersible Resin Amount *8 | Silane Coupling Agent Type *3 | Silane Coupling Agent Amount *8 | Phosphoric acid or Hexafluoro-Metal Acid Type *4 | Phosphoric acid or Hexafluoro-Metal Acid Amount *8 | Water-Soluble Inorganic Component Type *5 | Water-Soluble Inorganic Component Amount *8 | Chromium-Free Antirust Additive Type *6 | Chromium-Free Antirust Additive Amount *8 | Lubricant Type *7 | Lubricant Amount *8 |
|---|---|---|---|---|---|---|---|---|---|---|---|---|---|---|
| Inventive Example | 67 | 1 | 1 | 100 | 6 | 25 | 1 | 40 | 1 | 5 | 1 | 10 | — | 0 |
| Inventive Example | 68 | 1 | 1 | 100 | 7 | 25 | 1 | 40 | 1 | 5 | 1 | 10 | — | 0 |
| Inventive Example | 69 | 1 | 1 | 100 | 8 | 25 | 1 | 40 | 1 | 5 | 1 | 10 | — | 0 |
| Inventive Example | 70 | 1 | 1 | 100 | 1 | 25 | 2 | 40 | 1 | 5 | 1 | 10 | — | 0 |
| Inventive Example | 71 | 1 | 1 | 100 | 1 | 25 | 3 | 40 | 1 | 5 | 1 | 10 | — | 0 |
| Inventive Example | 72 | 1 | 1 | 100 | 1 | 25 | 4 | 40 | 1 | 5 | 1 | 10 | — | 0 |
| Inventive Example | 73 | 1 | 1 | 100 | 1 | 25 | 1 | 40 | 2 | 5 | 1 | 10 | — | 0 |
| Inventive Example | 74 | 1 | 1 | 100 | 1 | 25 | 1 | 40 | 3 | 5 | 1 | 10 | — | 0 |
| Inventive Example | 75 | 1 | 1 | 100 | 1 | 25 | 1 | 40 | 4 | 5 | 1 | 10 | — | 0 |
| Inventive Example | 76 | 1 | 1 | 100 | 1 | 25 | 1 | 40 | 1 | 5 | 2 | 10 | — | 0 |
| Inventive Example | 77 | 1 | 1 | 100 | 1 | 25 | 1 | 40 | 1 | 5 | 3 | 10 | — | 0 |
| Inventive Example | 78 | 1 | 1 | 100 | 1 | 25 | 1 | 40 | 1 | 5 | 4 | 10 | — | 0 |
| Inventive Example | 79 | 1 | 1 | 100 | 1 | 25 | 1 | 40 | 1 | 5 | 5 | 10 | — | 0 |
| Inventive Example | 80 | 1 | 1 | 100 | 1 | 25 | 1 | 40 | 1 | 5 | 6 | 10 | — | 0 |
| Inventive Example | 81 | 1 | 1 | 100 | 1 | 25 | 1 | 40 | 1 | 5 | 1 | 10 | 2 | 10 |
| Inventive Example | 82 | 1 | 1 | 100 | 1 | 25 | 1 | 40 | 1 | 5 | 1 | 10 | — | 0 |
| Inventive Example | 83 | 1 | 1 | 100 | 1 | 25 | 1 | 20 | 5 | 5 | — | 0 | — | 0 |
| Inventive Example | 84 | 1 | 1 | 100 | 1 | 25 | 1 | 20 | 6 | 5 | — | 0 | — | 0 |
| Inventive Example | 85 | 1 | 1 | 100 | 1 | 25 | 1 | 20 | 7 | 5 | — | 0 | — | 0 |
| Inventive Example | 86 | 1 | 1 | 100 | 1 | 25 | 1 | 20 | 8 | 5 | — | 0 | — | 0 |
| Inventive Example | 87 | 1 | 1 | 100 | 1 | 25 | 1 | 20 | 9 | 5 | — | 0 | — | 0 |
| Inventive Example | 88 | 1 | 1 | 100 | 1 | 25 | 1 | 20 | 10 | 5 | — | 0 | — | 0 |

TABLE 29

| Grouping | No. | Film Thickness (μm) | Baking Temperature (°C.) | Film Appearance | White Rust Resistance | Electro-conductivity | Paint Adhesiveness |
|---|---|---|---|---|---|---|---|
| Inventive Example | 67 | 1.0 | 140 | ○ | ○ | ○ | ⊙ |
| Inventive Example | 68 | 1.0 | 140 | ○ | ○ | ○ | ⊙ |
| Inventive Example | 69 | 1.0 | 140 | ○ | ○ | ○ | ⊙ |
| Inventive Example | 70 | 1.0 | 140 | ○ | ○ | ○ | ⊙ |
| Inventive Example | 71 | 1.0 | 140 | ○ | ⊙ | ○ | ⊙ |
| Inventive Example | 72 | 1.0 | 140 | ○ | ○ | ○ | ⊙ |
| Inventive Example | 73 | 1.0 | 140 | ○ | ⊙ | ○ | ⊙ |
| Inventive Example | 74 | 1.0 | 140 | ○ | ○ | ○ | ⊙ |
| Inventive Example | 75 | 1.0 | 140 | ○ | ⊙ | ○ | ⊙ |
| Inventive Example | 76 | 1.0 | 140 | ○ | ○— | ○ | ⊙ |
| Inventive Example | 77 | 1.0 | 140 | ○ | ○ | ○ | ⊙ |
| Inventive Example | 78 | 1.0 | 140 | ○ | ⊙ | ○ | ⊙ |
| Inventive Example | 79 | 1.0 | 140 | ○ | ⊙ | ○ | ⊙ |
| Inventive Example | 80 | 1.0 | 140 | ○ | ⊙ | ○ | ⊙ |
| Inventive Example | 81 | 1.0 | 140 | ○ | ⊙ | ○ | ⊙ |
| Inventive Example | 82 | upper layer/lower layer = 0.5/0.5 * | 140 | ○ | ⊙ | ○ | ⊙ |
| Inventive Example | 83 | 1.0 | 140 | ○ | ⊙ | ○ | ⊙ |
| Inventive Example | 84 | 1.0 | 140 | ○ | ⊙ | ○ | ⊙ |
| Inventive Example | 85 | 1.0 | 140 | ○ | ⊙ | ○ | ⊙ |
| Inventive Example | 86 | 1.0 | 140 | ○ | ⊙ | ○ | ⊙ |
| Inventive Example | 87 | 1.0 | 140 | ○ | ⊙ | ○ | ⊙ |
| Inventive Example | 88 | 1.0 | 140 | ○ | ⊙ | ○ | ⊙ |

* upper layer: organic resin film

TABLE 30

| Grouping | No. | Plated Steel Sheet *1 | Water-Dispersible Resin Type *2 | Water-Dispersible Resin Amount *8 | Silane Coupling Agent Type *3 | Silane Coupling Agent Amount *8 | Phosphoric acid or Hexafluoro-Metal Acid Type *4 | Phosphoric acid or Hexafluoro-Metal Acid Amount *8 | Water-Soluble Inorganic Component Type *5 | Water-Soluble Inorganic Component Amount *8 | Chromium-Free Antirust Additive Type *6 | Chromium-Free Antirust Additive Amount *8 | Lubricant Type *7 | Lubricant Amount *8 |
|---|---|---|---|---|---|---|---|---|---|---|---|---|---|---|
| Inventive Example | 89 | 1 | 1 | 100 | 1 | 25 | 1 | 20 | 11 | 5 | — | 0 | — | 0 |
| Inventive Example | 90 | 1 | 1 | 100 | 1 | 25 | 1 | 20 | 12 | 5 | — | 0 | — | 0 |

TABLE 30-continued

| Grouping | No. | Plated Steel Sheet *1 | Water-Dispersible Resin Type *2 | Amount *8 | Silane Coupling Agent Type *3 | Amount *8 | Phosphoric acid or Hexafluoro-Metal Acid Type *4 | Amount *8 | Water-Soluble Inorganic Component Type *5 | Amount *8 | Chromium-Free Antirust Additive Type *6 | Amount *8 | Lubricant Type *7 | Amount *8 |
|---|---|---|---|---|---|---|---|---|---|---|---|---|---|---|
| Inventive Example | 91 | 1 | 1 | 100 | 1 | 25 | 1 | 20 | 13 | 5 | — | 0 | — | 0 |
| Inventive Example | 92 | 1 | 1 | 100 | 1 | 25 | 1 | 20 | 14 | 5 | — | 0 | — | 0 |
| Inventive Example | 93 | 1 | 1 | 100 | 1 | 25 | 1 | 20 | 15 | 5 | — | 0 | — | 0 |
| Inventive Example | 94 | 1 | 1 | 100 | 1 | 25 | 1 | 20 | 5 | 0.5 | — | 0 | — | 0 |
| Inventive Example | 95 | 1 | 1 | 100 | 1 | 25 | 1 | 20 | 5 | 5 | — | 0 | — | 0 |
| Inventive Example | 96 | 1 | 1 | 100 | 1 | 25 | 1 | 20 | 5 | 10 | — | 0 | — | 0 |
| Inventive Example | 97 | 1 | 1 | 100 | 1 | 25 | 1 | 20 | 5 | 30 | — | 0 | — | 0 |
| Inventive Example | 98 | 1 | 1 | 100 | 1 | 25 | 1 | 20 | 5 | 50 | — | 0 | — | 0 |
| Comparative Example | 99 | 1 | 1 | 100 | 1 | 25 | 1 | 20 | 5 | 80 | — | 0 | — | 0 |
| Inventive Example | 100 | 1 | 1 | 100 | 1 | 25 | 1 | 20 | 5 | 5 | 1 | 0.5 | — | 0 |
| Inventive Example | 101 | 1 | 1 | 100 | 1 | 25 | 1 | 20 | 5 | 5 | 1 | 10 | — | 0 |
| Inventive Example | 102 | 1 | 1 | 100 | 1 | 25 | 1 | 20 | 5 | 10 | 1 | 10 | — | 0 |
| Inventive Example | 103 | 1 | 1 | 100 | 1 | 25 | 1 | 20 | 5 | 10 | 1 | 30 | — | 0 |
| Inventive Example | 104 | 1 | 1 | 100 | 1 | 25 | 1 | 20 | 5 | 50 | 1 | 0.5 | — | 0 |
| Inventive Example | 105 | 1 | 1 | 100 | 1 | 25 | 1 | 20 | 5 | 50 | 1 | 30 | — | 0 |
| Comparative Example | 106 | 1 | 1 | 100 | 1 | 25 | 1 | 20 | 5 | 100 | 1 | 50 | — | 0 |
| Inventive Example | 107 | 1 | 1 | 100 | 1 | 25 | 1 | 20 | 5 | 5 | 1 | 10 | 1 | 10 |
| Inventive Example | 108 | 1 | 1 | 100 | 1 | 25 | 1 | 20 | 5 | 5 | 1 | 10 | 1 | 20 |
| Inventive Example | 109 | 1 | 1 | 100 | 1 | 25 | 1 | 20 | 5 | 5 | 1 | 10 | 1 | 50 |
| Comparative Example | 110 | 1 | 1 | 100 | 1 | 25 | 1 | 20 | 5 | 5 | 1 | 10 | 1 | 60 |

TABLE 31

| Grouping | No. | Film Thickness (μm) | Baking Temperature (° C.) | Properties Film Appearance | White Rust Resistance | Electro-conductivity | Paint Adhesiveness |
|---|---|---|---|---|---|---|---|
| Inventive Example | 89 | 1.0 | 140 | ◯ | ◎ | ◯ | ◎ |
| Inventive Example | 90 | 1.0 | 140 | ◯ | ◎ | ◯ | ◎ |
| Inventive Example | 91 | 1.0 | 140 | ◯ | ◎ | ◯ | ◎ |
| Inventive Example | 92 | 1.0 | 140 | ◯ | ◎ | ◯ | ◎ |
| Inventive Example | 93 | 1.0 | 140 | ◯ | ◎ | ◯ | ◎ |
| Inventive Example | 94 | 1.0 | 140 | ◯ | ◎ | ◯ | ◎ |
| Inventive Example | 95 | 1.0 | 140 | ◯ | ◎ | ◯ | ◎ |
| Inventive Example | 96 | 1.0 | 140 | ◯ | ◎ | ◯ | ◎ |
| Inventive Example | 97 | 1.0 | 140 | ◯ | ◎ | ◯ | ◎ |
| Inventive Example | 98 | 1.0 | 140 | ◯ | ◯ | ◯ | ◎ |
| Comparative Example | 99 | 1.0 | 140 | X | Δ | ◯ | ◎ |
| Inventive Example | 100 | 1.0 | 140 | ◯ | ◎ | ◯ | ◎ |
| Inventive Example | 101 | 1.0 | 140 | ◯ | ◎ | ◯ | ◎ |
| Inventive Example | 102 | 1.0 | 140 | ◯ | ◎ | ◯ | ◎ |
| Inventive Example | 103 | 1.0 | 140 | ◯ | ◯ | ◯ | ◎ |
| Inventive Example | 104 | 1.0 | 140 | ◯ | ◯ | ◯ | ◎ |
| Inventive Example | 105 | 1.0 | 140 | ◯ | ◯ | ◯ | ◎ |
| Comparative Example | 106 | 1.0 | 140 | X | X | ◯ | ◎ |
| Inventive Example | 107 | 1.0 | 140 | ◯ | ◎ | ◯ | ◎ |
| Inventive Example | 108 | 1.0 | 140 | ◯ | ◎ | ◯ | ◎ |
| Inventive Example | 109 | 1.0 | 140 | ◯ | Δ | ◯ | ◎ |
| Comparative Example | 110 | 1.0 | 140 | ◯ | X | ◯ | ◎ |

TABLE 32

| Grouping | No. | Plated Steel Sheet *1 | Water-Dispersible Resin Type *2 | Amount *8 | Silane Coupling Agent Type *3 | Amount *8 | Phosphoric acid or Hexafluoro-Metal Acid Type *4 | Amount *8 | Water-Soluble Inorganic Component Type *5 | Amount *8 | Chromium-Free Antirust Additive Type *6 | Amount *8 | Lubricant Type *7 | Amount *8 |
|---|---|---|---|---|---|---|---|---|---|---|---|---|---|---|
| Comparative Example | 111 | 1 | 1 | 100 | 1 | 25 | 1 | 40 | 5 | 5 | — | 0 | — | 0 |
| Inventive Example | 112 | 1 | 1 | 100 | 1 | 25 | 1 | 40 | 5 | 5 | — | 0 | — | 0 |
| Inventive Example | 113 | 1 | 1 | 100 | 1 | 25 | 1 | 40 | 5 | 5 | — | 0 | — | 0 |
| Inventive Example | 114 | 1 | 1 | 100 | 1 | 25 | 1 | 40 | 5 | 5 | — | 0 | — | 0 |
| Inventive Example | 115 | 1 | 1 | 100 | 1 | 25 | 1 | 40 | 5 | 5 | — | 0 | — | 0 |
| Comparative Example | 116 | 1 | 1 | 100 | 1 | 25 | 1 | 40 | 5 | 5 | — | 0 | — | 0 |

TABLE 32-continued

| Grouping | No. | Plated Steel Sheet *1 | Water-Dispersible Resin Type *2 | Water-Dispersible Resin Amount *8 | Silane Coupling Agent Type *3 | Silane Coupling Agent Amount *8 | Phosphoric acid or Hexafluoro-Metal Acid Type *4 | Phosphoric acid or Hexafluoro-Metal Acid Amount *8 | Water-Soluble Inorganic Component Type *5 | Water-Soluble Inorganic Component Amount *8 | Chromium-Free Antirust Additive Type *6 | Chromium-Free Antirust Additive Amount *8 | Lubricant Type *7 | Lubricant Amount *8 |
|---|---|---|---|---|---|---|---|---|---|---|---|---|---|---|
| Comparative Example | 117 | 1 | 1 | 100 | 1 | 25 | 1 | 40 | 5 | 5 | — | 0 | — | 0 |
| Inventive Example | 118 | 1 | 1 | 100 | 1 | 25 | 1 | 40 | 5 | 5 | — | 0 | — | 0 |
| Inventive Example | 119 | 1 | 1 | 100 | 1 | 25 | 1 | 40 | 5 | 5 | — | 0 | — | 0 |
| Inventive Example | 120 | 1 | 1 | 100 | 1 | 25 | 1 | 40 | 5 | 5 | — | 0 | — | 0 |
| Inventive Example | 121 | 1 | 1 | 100 | 1 | 25 | 1 | 40 | 5 | 5 | — | 0 | — | 0 |
| Inventive Example | 122 | 1 | 1 | 100 | 1 | 25 | 1 | 40 | 5 | 5 | — | 0 | — | 0 |
| Comparative Example | 123 | 1 | 1 | 100 | 1 | 25 | 1 | 40 | 5 | 5 | — | 0 | — | 0 |
| Comparative Example | 124 | 1 | 2 | 100 | 1 | 25 | 1 | 40 | 5 | 5 | — | 0 | — | 0 |
| Comparative Example | 125 | 1 | 3 | 100 | 1 | 25 | 1 | 40 | 5 | 5 | — | 0 | — | 0 |
| Comparative Example | 126 | 1 | 4 | 100 | 1 | 25 | 1 | 40 | 5 | 5 | — | 0 | — | 0 |

TABLE 33

| Grouping | No. | Film Thickness (μm) | Baking Temperature (° C.) | Film Appearance | White Rust Resistance | Electro-conductivity | Paint Adhesiveness |
|---|---|---|---|---|---|---|---|
| Comparative Example | 111 | 0.01 | 140 | ○ | X | ○ | ⊙ |
| Inventive Example | 112 | 0.1 | 140 | ○ | ⊙ | ○ | ⊙ |
| Inventive Example | 113 | 0.5 | 140 | ○ | ⊙ | ○ | ⊙ |
| Inventive Example | 114 | 1.0 | 140 | ○ | ⊙ | ○ | ⊙ |
| Inventive Example | 115 | 5.0 | 140 | ○ | ⊙ | Δ | ⊙ |
| Comparative Example | 116 | 7.0 | 140 | ○ | ⊙ | X | ⊙ |
| Comparative Example | 117 | 1.0 | 25 | ○ | X | ○ | ○ |
| Inventive Example | 118 | 1.0 | 50 | ○ | ○ | ○ | ⊙ |
| Inventive Example | 119 | 1.0 | 100 | ○ | ⊙ | ○ | ⊙ |
| Inventive Example | 120 | 1.0 | 200 | ○ | ⊙ | ○ | ⊙ |
| Inventive Example | 121 | 1.0 | 250 | ○ | ⊙ | ○ | ⊙ |
| Inventive Example | 122 | 1.0 | 300 | ○ | ○ | ○ | ⊙ |
| Comparative Example | 123 | 1.0 | 350 | ○ | Δ | ○ | ⊙ |
| Comparative Example | 124 | 1.0 | 140 | ○ | X | ○ | ⊙ |
| Comparative Example | 125 | 1.0 | 140 | ○ | X | ○ | ⊙ |
| Comparative Example | 126 | 1.0 | 140 | ○ | Δ | ○ | ⊙ |

Example 3

An aqueous epoxy resin dispersion as in Table 34 was used for the resin composition for surface-treating compositions. An aqueous urethane resin dispersion (Table 35), a silane coupling agent (Table 3), a phosphoric acid or hexafluoro-metal acid (Table 4), a water-soluble inorganic component (Table 36), a chromium-free antirust additive (Table 37) and a solid lubricant (Table 38) were suitably added to it, then controlled to have a pH of from 0.5 to 6 with any of aqueous ammonia, nitric acid, acetic acid, sulfuric acid, phosphoric acid, hexafluoro-metal acid or the like added thereto, and stirred for a predetermined period of time with a disperser for paint (sand grinder) to prepare surface-treating compositions.

Methods of producing the aqueous epoxy resin dispersions shown in Table 34 are described below.

Production Example 1

787.4 g of Epikote 1007 (epoxy resin, by Shell Japan, epoxy equivalent 2000) and 425 g of propylene glycol monobutyl ether were put into a four-neck flask of glass equipped with a thermometer, a stirrer and a condenser tube, and mixed with stirring at 110° C. After the resulting mixture became uniform and transparent, this was cooled to 100° C., and 20.7 g of diethanolamine was added thereto and reacted for 1 hour. The epoxyamine value of the resulting mixture was measured to confirm that it reached the theoretical value, and 16.5 g of 3-amino-1,2,4-triazole (molecular weight 84) was added to it and reacted for 5 hours. Next, 250 g of propylene glycol monobutyl ether was added thereto to obtain a modified epoxy resin. 23.3 g of phosphoric acid was added to the modified epoxy resin, and water was dropwise added thereto and mixed to give an aqueous epoxy resin dispersion F1 having a solid content of 20%.

Production Example 2

546 g of Epikote 1004 (epoxy resin, by Shell Japan, epoxy equivalent 925) and 311 g of propylene glycol monobutyl ether were put into a four-neck flask of glass equipped with a thermometer, a stirrer and a condenser tube, and mixed with stirring at 110° C. After the resulting mixture became uniform and transparent, this was cooled to 100° C., and 31.5 g of diethanolamine was added thereto and reacted for 1 hour. The epoxyamine value of the resulting mixture was measured to confirm that it reached the theoretical value, and 25.2 g of 3-amino-1,2,4-triazole (molecular weight 84) was added to it and reacted for 5 hours. Next, 182.6 g of propylene glycol monobutyl ether was added thereto to obtain a modified epoxy resin. 35.3 g of phosphoric acid was added to the modified epoxy resin, and water was dropwise added thereto and mixed to give an aqueous epoxy resin dispersion F2 having a solid content of 20%.

Production Example 3

A modified epoxy resin was produced in the same manner as in Production Example 1, for which, however, the amount of diethanolamine was varied to 12.4 g and that of 3-amino-1,2,4-triazole to 23.1 g. Water was mixed with the modified epoxy resin to give an aqueous epoxy resin dispersion F3 having a solid content of 20%.

Production Example 4 (Comparative Example)

186.6 g of Epikote 1001 (epoxy resin, by Japan Epoxy Resin, epoxy-equivalent 475, number-average molecular weight about 900) and 115.2 g of propylene glycol monobutyl ether were put into a four-neck flask of glass equipped with a thermometer, a stirrer and a condenser tube, heated up to 110° C., and mixed with stirring. After the resulting mixture became uniform and transparent, this was cooled to 100° C., and 25.5 g of diethanolamine was added thereto and kept at 100° C. for 1 hour. Next, 68.0 g of propylene glycol monobutyl ether was added to it to give a modified epoxy resin. 23.3 g of phosphoric acid was added to the modified epoxy resin, and this was stirred with water added thereto to give an aqueous epoxy resin dispersion F4 having a solid content of 20%.

Production Example 5 (Comparative Example)

A modified epoxy resin was produced in the same manner as in Production Example 1, for which, however, 14.7 g of N-methyl-ethanolamine was used in place of 16.5 g of 3-amino-1,2,4-triazole. Water was mixed with the modified epoxy resin to give an aqueous epoxy resin dispersion F5 having a solid content of 20%.

Plated steel sheets as in Table 1 were processed herein. These are plated steel sheets for electric and electronic appliances for household use, construction materials and automobile parts, and their base is a cold-rolled steel sheet. The thickness of each steel sheet was defined in accordance with the object of evaluation. The surface of the plated steel sheet was degreased with alkali, washed with water, dried, and then coated with the above-mentioned, surface-treating composition by the use of a roll coater. Then, not washed with water, this was dried under heat at a predetermined temperature. The thickness of the film was controlled by varying the solid content (heating residue) of the surface-treating composition or the coating condition (rolling reduction, revolving speed, etc.).

The film composition and the quality (film appearance, white rust resistance, electroconductivity, paint adhesiveness) of the thus-obtained surface-treated steel sheets were evaluated, and the results are given in Table 39 to Table 50. The quality evaluation for the film appearance, the white rust resistance, the electroconductivity and the paint adhesiveness of each sample was effected in the same manner as in [Example 1], but the white rust resistance was evaluated on the basis of the white rust surface after 168 hours and after 192 hours. In addition, the white rust resistance after degreasing with alkali was evaluated as follows:

(5) Whit Rust Resistance after Degreasing with Alkali:

After degreased with alkali, each sample is tested according to a salt spray test (JIS-Z-2371), and evaluated based on the white rust area after 72 hours. The evaluation criteria are as follows:

⊚: White rust area, smaller than 5%.
◯: White rust area, from 5% to smaller than 10%.
◯—: White rust area, from 10% to smaller than 25%.
Δ: White rust area, from 25% to smaller than 50%.
X: White rust area, 50% or more.

TABLE 34

| No. | Aqueous Epoxy Resin Dispersion |
|---|---|
| 1 | F1 described in the text of the specification (Production Example 1) |
| 2 | F2 described in the text of the specification (Production Example 2) |
| 3 | F3 described in the text of the specification (Production Example 3) |
| 4 | F4 described in the text of the specification (Production Example 4) |
| 5 | F5 described in the text of the specification (Production Example 5) |

TABLE 35

| No. | Aqueous Urethane Resin Dispersion (commercial name) | Ionicity |
|---|---|---|
| 1 | Sanyo Kasei's Yucoat UX-2505 | nonionic |
| 2 | Daiichi Kogyo Seiyaku's Superflex E2500 | nonionic |
| 3 | Asahi Denka Kogyo's Adekabontiter UX206 | nonionic |
| 4 | Mitsui Takeda Chemical's Takelac W-635 | nonionic |
| 5 | Daiichi Kogyo Seiyaku's Superflex 600 | cationic |
| 6 | Sanyo Kasei's Permarine UC-20 | cationic |

TABLE 36

| No. | Water-Soluble Inorganic Component |
|---|---|
| 1 | Co nitrate |
| 2 | Al sulfate |
| 3 | Zn acetate |
| 4 | Mn carbonate |
| 5 | Mg nitrate |
| 6 | Ti sulfate |
| 7 | Zr nitrate |
| 8 | Ni sulfate |
| 9 | Mn phosphate |
| 10 | Ce acetate |
| 11 | Zr chloride |
| 12 | La acetate |
| 13 | Al phosphate |

TABLE 37

| No. | Chromium-Free Antirust Additive |
|---|---|
| 1 | Calcium ion-exchanged silica |
| 2 | Colloidal silica |
| 3 | Fumed silica |
| 4 | Aluminium dihydrogen tripolyphosphate |
| 5 | Tetraethylthiuram disulfide |

TABLE 38

| No. | Lubricant |
|---|---|
| 1 | Polyethylene wax |
| 2 | Montan wax |

In Table 39 to Table 50, *1 to *9 mean the following:
*1: No. (plated steel sheet) in Table 1.
*2: No. (aqueous epoxy resin dispersion) in Table 34.

*3: No. (aqueous urethane resin dispersion) in Table 35.
*4: No. (silane coupling agent) in table 3.
*5: No. (phosphoric acid or hexafluoro-metal acid) in Table 4.
*6: No. (water-soluble inorganic component) in Table 36.
*7: No. (chromium-free antirust additive) in Table 37.
*8: No. (solid lubricant) in Table 38.
*9: part by mass.

TABLE 39

| Grouping | No. | Plated Steel Sheet *1 | Water-Dispersible Resin Type *2 | Water-Dispersible Resin Amount *9 | Aqueous Urethane Resin Dispersion Type *3 | Aqueous Urethane Resin Dispersion Amount *9 | Silane Coupling Agent Type *4 | Silane Coupling Agent Amount *9 | Phosphoric acid or Hexafluoro-Metal Acid Type *5 | Phosphoric acid or Hexafluoro-Metal Acid Amount *9 | Water-Soluble Inorganic Component Type *6 | Water-Soluble Inorganic Component Amount *9 | Chromium-Free Antirust Additive Type *7 | Chromium-Free Antirust Additive Amount *9 |
|---|---|---|---|---|---|---|---|---|---|---|---|---|---|---|
| Comparative Example | 1 | 1 | — | 0 | — | 0 | 1 | 25 | 1 | 20 | — | 0 | — | 0 |
| Comparative Example | 2 | 1 | 1 | 50 | 1 | 50 | — | 0 | 1 | 20 | — | 0 | — | 0 |
| Inventive Example | 3 | 1 | 1 | 50 | 1 | 50 | 1 | 5 | 1 | 20 | — | 0 | — | 0 |
| Inventive Example | 4 | 1 | 1 | 50 | 1 | 50 | 1 | 15 | 1 | 20 | — | 0 | — | 0 |
| Inventive Example | 5 | 1 | 1 | 50 | 1 | 50 | 1 | 50 | 1 | 20 | — | 0 | — | 0 |
| Inventive Example | 6 | 1 | 1 | 50 | 1 | 50 | 1 | 100 | 1 | 20 | — | 0 | — | 0 |
| Comparative Example | 7 | 1 | 1 | 50 | 1 | 50 | 1 | 500 | 1 | 20 | — | 0 | — | 0 |
| Comparative Example | 8 | 1 | 1 | 50 | 1 | 50 | 1 | 25 | — | 0 | — | 0 | — | 0 |
| Inventive Example | 9 | 1 | 1 | 50 | 1 | 50 | 1 | 25 | 1 | 1 | — | 0 | — | 0 |
| Inventive Example | 10 | 1 | 1 | 50 | 1 | 50 | 1 | 25 | 1 | 5 | — | 0 | — | 0 |
| Inventive Example | 11 | 1 | 1 | 50 | 1 | 50 | 1 | 25 | 1 | 20 | — | 0 | — | 0 |
| Inventive Example | 12 | 1 | 1 | 50 | 1 | 50 | 1 | 25 | 1 | 40 | — | 0 | — | 0 |
| Comparative Example | 13 | 1 | 1 | 50 | 1 | 50 | 1 | 25 | 1 | 100 | — | 0 | — | 0 |
| Inventive Example | 14 | 1 | 1 | 90 | 1 | 10 | 1 | 25 | 1 | 20 | — | 0 | — | 0 |
| Inventive Example | 15 | 1 | 1 | 70 | 1 | 30 | 1 | 25 | 1 | 20 | — | 0 | — | 0 |
| Inventive Example | 16 | 1 | 1 | 30 | 1 | 70 | 1 | 25 | 1 | 20 | — | 0 | — | 0 |
| Inventive Example | 17 | 1 | 1 | 10 | 1 | 90 | 1 | 25 | 1 | 20 | — | 0 | — | 0 |
| Comparative Example | 18 | 1 | — | 0 | 1 | 100 | 1 | 25 | 1 | 20 | — | 0 | — | 0 |
| Inventive Example | 19 | 1 | 1 | 50 | 1 | 50 | 1 | 25 | 1 | 20 | 1 | 0.5 | — | 0 |

TABLE 40

| Grouping | No. | Lubricant Type *8 | Lubricant Amount *9 | Film Thickness (μm) | Baking Temperature (° C.) | Film Appearance | White Rust Resistance (after 168 hours) | White Rust Resistance (after 192 hours) | White Rust Resistance after degreasing with alkali | Electro-conductivity | Paint Adhesiveness |
|---|---|---|---|---|---|---|---|---|---|---|---|
| Comparative Example | 1 | — | 0 | 1.0 | 140 | Δ | X | X | X | ○ | ⊙ |
| Comparative Example | 2 | — | 0 | 1.0 | 140 | ○ | Δ | Δ | X | ○ | Δ |
| Inventive Example | 3 | — | 0 | 1.0 | 140 | ○ | ○ | ○ | ○ | ○ | ⊙ |
| Inventive Example | 4 | — | 0 | 1.0 | 140 | ○ | ⊙ | ⊙ | ○ | ○ | ⊙ |
| Inventive Example | 5 | — | 0 | 1.0 | 140 | ○ | ⊙ | ⊙ | ○ | ○ | ⊙ |
| Inventive Example | 6 | — | 0 | 1.0 | 140 | ○ | ○ | ○ | ○ | ○ | ⊙ |
| Comparative Example | 7 | — | 0 | 1.0 | 140 | ○ | X | X | X | ○ | ⊙ |
| Comparative Example | 8 | — | 0 | 1.0 | 140 | ○ | Δ | Δ | X | ○ | ⊙ |
| Inventive Example | 9 | — | 0 | 1.0 | 140 | ○ | ○ | ○ | ○ | ○ | ⊙ |
| Inventive Example | 10 | — | 0 | 1.0 | 140 | ○ | ⊙ | ⊙ | ○ | ○ | ⊙ |
| Inventive Example | 11 | — | 0 | 1.0 | 140 | ○ | ⊙ | ⊙ | ○ | ○ | ⊙ |
| Inventive Example | 12 | — | 0 | 1.0 | 140 | ○ | ⊙ | ⊙ | ○ | ○ | ⊙ |
| Comparative Example | 13 | — | 0 | 1.0 | 140 | X | Δ | Δ | Δ | ○ | ⊙ |
| Inventive Example | 14 | — | 0 | 1.0 | 140 | ○ | ○ | ○ | ○ | ○ | ⊙ |
| Inventive Example | 15 | — | 0 | 1.0 | 140 | ○ | ⊙ | ⊙ | ⊙ | ○ | ⊙ |
| Inventive Example | 16 | — | 0 | 1.0 | 140 | ○ | ○ | ○ | ○ | ○ | ⊙ |
| Inventive Example | 17 | — | 0 | 1.0 | 140 | ○ | ○ | ○ | ○ | ○ | ⊙ |
| Comparative Example | 18 | — | 0 | 1.0 | 140 | ○ | X | X | X | ○ | ⊙ |
| Inventive Example | 19 | — | 0 | 1.0 | 140 | ○ | ⊙ | ⊙ | ○ | ○ | ⊙ |

TABLE 41

| Grouping | No. | Plated Steel Sheet *1 | Water-Dispersible Resin Type *2 | Water-Dispersible Resin Amount *9 | Aqueous Urethane Resin Dispersion Type *3 | Aqueous Urethane Resin Dispersion Amount *9 | Silane Coupling Agent Type *4 | Silane Coupling Agent Amount *9 | Phosphoric acid or Hexafluoro-Metal Acid Type *5 | Phosphoric acid or Hexafluoro-Metal Acid Amount *9 | Water-Soluble Inorganic Component Type *6 | Water-Soluble Inorganic Component Amount *9 | Chromium-Free Antirust Additive Type *7 | Chromium-Free Antirust Additive Amount *9 |
|---|---|---|---|---|---|---|---|---|---|---|---|---|---|---|
| Inventive Example | 20 | 1 | 1 | 50 | 1 | 50 | 1 | 25 | 1 | 20 | 1 | 5 | — | 0 |
| Inventive Example | 21 | 1 | 1 | 50 | 1 | 50 | 1 | 25 | 1 | 20 | 1 | 10 | — | 0 |
| Inventive Example | 22 | 1 | 1 | 50 | 1 | 50 | 1 | 25 | 1 | 20 | 1 | 30 | — | 0 |
| Inventive Example | 23 | 1 | 1 | 50 | 1 | 50 | 1 | 25 | 1 | 20 | 1 | 50 | — | 0 |
| Comparative Example | 24 | 1 | 1 | 50 | 1 | 50 | 1 | 25 | 1 | 20 | 1 | 80 | — | 0 |
| Inventive Example | 25 | 1 | 1 | 50 | 1 | 50 | 1 | 25 | 1 | 20 | — | 0 | 1 | 1 |
| Inventive Example | 26 | 1 | 1 | 50 | 1 | 50 | 1 | 25 | 1 | 20 | — | 0 | 1 | 10 |
| Inventive Example | 27 | 1 | 1 | 50 | 1 | 50 | 1 | 25 | 1 | 20 | — | 0 | 1 | 30 |
| Comparative Example | 28 | 1 | 1 | 50 | 1 | 50 | 1 | 25 | 1 | 20 | — | 0 | 1 | 70 |
| Inventive Example | 29 | 1 | 1 | 50 | 1 | 50 | 1 | 25 | 1 | 20 | 1 | 5 | 1 | 1 |
| Inventive Example | 30 | 1 | 1 | 50 | 1 | 50 | 1 | 25 | 1 | 20 | 1 | 5 | 1 | 10 |
| Inventive Example | 31 | 1 | 1 | 50 | 1 | 50 | 1 | 25 | 1 | 20 | 1 | 10 | 1 | 10 |
| Inventive Example | 32 | 1 | 1 | 50 | 1 | 50 | 1 | 25 | 1 | 20 | 1 | 10 | 1 | 30 |
| Inventive Example | 33 | 1 | 1 | 50 | 1 | 50 | 1 | 25 | 1 | 20 | 1 | 50 | 1 | 1 |
| Inventive Example | 34 | 1 | 1 | 50 | 1 | 50 | 1 | 25 | 1 | 20 | 1 | 50 | 1 | 30 |
| Comparative Example | 35 | 1 | 1 | 50 | 1 | 50 | 1 | 25 | 1 | 20 | 1 | 100 | 1 | 50 |
| Inventive Example | 36 | 1 | 1 | 50 | 1 | 50 | 1 | 25 | 1 | 20 | 1 | 5 | — | 0 |
| Inventive Example | 37 | 1 | 1 | 50 | 1 | 50 | 1 | 25 | 1 | 20 | 1 | 5 | — | 0 |
| Inventive Example | 38 | 1 | 1 | 50 | 1 | 50 | 1 | 25 | 1 | 20 | 1 | 5 | — | 0 |

TABLE 42

| Grouping | No. | Lubricant Type *8 | Lubricant Amount *9 | Film Thickness (μm) | Baking Temperature (°C.) | Film Appearance | White Rust Resistance (after 168 hours) | White Rust Resistance (after 192 hours) | White Rust Resistance after degreasing with alkali | Electro-conductivity | Paint Adhesiveness |
|---|---|---|---|---|---|---|---|---|---|---|---|
| Inventive Example | 20 | — | 0 | 1.0 | 140 | ○ | ⊙ | ⊙ | ⊙ | ○ | ⊙ |
| Inventive Example | 21 | — | 0 | 1.0 | 140 | ○ | ⊙ | ⊙ | ⊙ | ○ | ⊙ |
| Inventive Example | 22 | — | 0 | 1.0 | 140 | ○ | ⊙ | ⊙ | ⊙ | ○ | ⊙ |
| Inventive Example | 23 | — | 0 | 1.0 | 140 | ○ | ○ | ○ | ○ | ○ | ⊙ |
| Comparative Example | 24 | — | 0 | 1.0 | 140 | X | Δ | Δ | Δ | ○ | ⊙ |
| Inventive Example | 25 | — | 0 | 1.0 | 140 | ○ | ⊙ | ⊙ | ⊙ | ○ | ⊙ |
| Inventive Example | 26 | — | 0 | 1.0 | 140 | ○ | ⊙ | ⊙ | ⊙ | ○ | ⊙ |
| Inventive Example | 27 | — | 0 | 1.0 | 140 | ○ | ○ | ○ | ○ | ○ | ⊙ |
| Comparative Example | 28 | — | 0 | 1.0 | 140 | ○ | Δ | Δ | X | ○ | ⊙ |
| Inventive Example | 29 | — | 0 | 1.0 | 140 | ○ | ⊙ | ⊙ | ⊙ | ○ | ⊙ |
| Inventive Example | 30 | — | 0 | 1.0 | 140 | ○ | ⊙ | ⊙ | ⊙ | ○ | ⊙ |
| Inventive Example | 31 | — | 0 | 1.0 | 140 | ○ | ⊙ | ⊙ | ⊙ | ○ | ⊙ |
| Inventive Example | 32 | — | 0 | 1.0 | 140 | ○ | ○ | ○ | ○ | ○ | ⊙ |
| Inventive Example | 33 | — | 0 | 1.0 | 140 | ○ | ○ | ○ | ○— | ○ | ⊙ |
| Inventive Example | 34 | — | 0 | 1.0 | 140 | ○ | ○— | ○— | ○— | ○ | ⊙ |
| Comparative Example | 35 | — | 0 | 1.0 | 140 | X | X | X | X | ○ | ⊙ |
| Inventive Example | 36 | 1 | 0.2 | 1.0 | 140 | ○ | ⊙ | ⊙ | ⊙ | ○ | ○ |
| Inventive Example | 37 | 1 | 2 | 1.0 | 140 | ○ | ⊙ | ⊙ | ⊙ | ○ | ⊙ |
| Inventive Example | 38 | 1 | 10 | 1.0 | 140 | ○ | ⊙ | ⊙ | ⊙ | ○ | ⊙ |

TABLE 43

| Grouping | No. | Plated Steel Sheet *1 | Water-Dispersible Resin Type *2 | Water-Dispersible Resin Amount *9 | Aqueous Urethane Resin Dispersion Type *3 | Aqueous Urethane Resin Dispersion Amount *9 | Silane Coupling Agent Type *4 | Silane Coupling Agent Amount *9 | Phosphoric acid or Hexafluoro-Metal Acid Type *5 | Phosphoric acid or Hexafluoro-Metal Acid Amount *9 | Water-Soluble Inorganic Component Type *6 | Water-Soluble Inorganic Component Amount *9 | Chromium-Free Antirust Additive Type *7 | Chromium-Free Antirust Additive Amount *9 |
|---|---|---|---|---|---|---|---|---|---|---|---|---|---|---|
| Inventive Example | 39 | 1 | 1 | 50 | 1 | 50 | 1 | 25 | 1 | 20 | 1 | 5 | — | 0 |
| Inventive Example | 40 | 1 | 1 | 50 | 1 | 50 | 1 | 25 | 1 | 20 | 1 | 5 | — | 0 |
| Comparative Example | 41 | 1 | 1 | 50 | 1 | 50 | 1 | 25 | 1 | 20 | 1 | 5 | — | 0 |
| Comparative Example | 42 | 1 | 1 | 50 | 1 | 50 | 1 | 25 | 1 | 20 | 1 | 5 | — | 0 |
| Inventive Example | 43 | 1 | 1 | 50 | 1 | 50 | 1 | 25 | 1 | 20 | 1 | 5 | — | 0 |
| Inventive Example | 44 | 1 | 1 | 50 | 1 | 50 | 1 | 25 | 1 | 20 | 1 | 5 | — | 0 |
| Inventive Example | 45 | 1 | 1 | 50 | 1 | 50 | 1 | 25 | 1 | 20 | 1 | 5 | — | 0 |

TABLE 43-continued

| Grouping | No. | Plated Steel Sheet *1 | Water-Dispersible Resin Type *2 | Amount *9 | Aqueous Urethane Resin Dispersion Type *3 | Amount *9 | Silane Coupling Agent Type *4 | Amount *9 | Phosphoric acid or Hexafluoro-Metal Acid Type *5 | Amount *9 | Water-Soluble Inorganic Component Type *6 | Amount *9 | Chromium-Free Antirust Additive Type *7 | Amount *9 |
|---|---|---|---|---|---|---|---|---|---|---|---|---|---|---|
| Inventive Example | 46 | 1 | 1 | 50 | 1 | 50 | 1 | 25 | 1 | 20 | 1 | 5 | — | 0 |
| Comparative Example | 47 | 1 | 1 | 50 | 1 | 50 | 1 | 25 | 1 | 20 | 1 | 5 | — | 0 |
| Comparative Example | 48 | 1 | 1 | 50 | 1 | 50 | 1 | 25 | 1 | 20 | 1 | 5 | — | 0 |
| Inventive Example | 49 | 1 | 1 | 50 | 1 | 50 | 1 | 25 | 1 | 20 | 1 | 5 | — | 0 |
| Inventive Example | 50 | 1 | 1 | 50 | 1 | 50 | 1 | 25 | 1 | 20 | 1 | 5 | — | 0 |
| Inventive Example | 51 | 1 | 1 | 50 | 1 | 50 | 1 | 25 | 1 | 20 | 1 | 5 | — | 0 |
| Inventive Example | 52 | 1 | 1 | 50 | 1 | 50 | 1 | 25 | 1 | 20 | 1 | 5 | — | 0 |
| Inventive Example | 53 | 1 | 1 | 50 | 1 | 50 | 1 | 25 | 1 | 20 | 1 | 5 | — | 0 |
| Comparative Example | 54 | 1 | 1 | 50 | 1 | 50 | 1 | 25 | 1 | 20 | 1 | 5 | — | 0 |
| Inventive Example | 55 | 2 | 1 | 50 | 1 | 50 | 1 | 25 | 1 | 20 | 1 | 5 | 1 | 10 |
| Inventive Example | 56 | 3 | 1 | 50 | 1 | 50 | 1 | 25 | 1 | 20 | 1 | 5 | 1 | 10 |
| Inventive Example | 57 | 4 | 1 | 50 | 1 | 50 | 1 | 25 | 1 | 20 | 1 | 5 | 1 | 10 |

TABLE 44

| Grouping | No. | Lubricant Type *8 | Amount *9 | Film Thickness (μm) | Baking Temperature (° C.) | Film Appearance | White Rust Resistance (after 168 hours) | White Rust Resistance (after 192 hours) | White Rust Resistance after degreasing with alkali | Electro-conductivity | Paint Adhesiveness |
|---|---|---|---|---|---|---|---|---|---|---|---|
| Inventive Example | 39 | 1 | 20 | 1.0 | 140 | ○ | ⊚ | ⊚ | ⊚ | ○ | ○ |
| Inventive Example | 40 | 1 | 50 | 1.0 | 140 | ○ | ○ | ○ | ○ | ○ | ⊚ |
| Comparative Example | 41 | 1 | 80 | 1.0 | 140 | ○ | X | X | X | ○ | ⊚ |
| Comparative Example | 42 | — | 0 | 0.01 | 140 | ○ | X | X | X | ○ | ○ |
| Inventive Example | 43 | — | 0 | 0.1 | 140 | ○ | ⊚ | ⊚ | ⊚ | ○ | ⊚ |
| Inventive Example | 44 | — | 0 | 0.5 | 140 | ○ | ⊚ | ⊚ | ⊚ | ○ | ⊚ |
| Inventive Example | 45 | — | 0 | 1.0 | 140 | ○ | ⊚ | ⊚ | ⊚ | ○ | ⊚ |
| Inventive Example | 46 | — | 0 | 5.0 | 140 | ○ | ⊚ | ⊚ | ⊚ | Δ | ⊚ |
| Comparative Example | 47 | — | 0 | 7.0 | 140 | ○ | ⊚ | ⊚ | ⊚ | X | ⊚ |
| Comparative Example | 48 | — | 0 | 1.0 | 25 | ○ | X | X | X | ○ | ○ |
| Inventive Example | 49 | — | 0 | 1.0 | 50 | ○ | ○ | ○ | ○ | ○ | ⊚ |
| Inventive Example | 50 | — | 0 | 1.0 | 100 | ○ | ⊚ | ⊚ | ⊚ | ○ | ⊚ |
| Inventive Example | 51 | — | 0 | 1.0 | 200 | ○ | ⊚ | ⊚ | ⊚ | ○ | ⊚ |
| Inventive Example | 52 | — | 0 | 1.0 | 250 | ○ | ⊚ | ⊚ | ⊚ | ○ | ⊚ |
| Inventive Example | 53 | — | 0 | 1.0 | 300 | ○ | ○ | ○ | ○ | ○ | ⊚ |
| Comparative Example | 54 | — | 0 | 1.0 | 350 | ○ | Δ | Δ | Δ | ○ | ⊚ |
| Inventive Example | 55 | — | 0 | 1.0 | 140 | ○ | ⊚ | ⊚ | ⊚ | ○ | ⊚ |
| Inventive Example | 56 | — | 0 | 1.0 | 140 | ○ | ⊚ | ⊚ | ⊚ | ○ | ⊚ |
| Inventive Example | 57 | — | 0 | 1.0 | 140 | ○ | ⊚ | ⊚ | ⊚ | ○ | ⊚ |

TABLE 45

| Grouping | No. | Plated Steel Sheet *1 | Water-Dispersible Resin Type *2 | Amount *9 | Aqueous Urethane Resin Dispersion Type *3 | Amount *9 | Silane Coupling Agent Type *4 | Amount *9 | Phosphoric acid or Hexafluoro-Metal Acid Type *5 | Amount *9 | Water-Soluble Inorganic Component Type *6 | Amount *9 | Chromium-Free Antirust Additive Type *7 | Amount *9 |
|---|---|---|---|---|---|---|---|---|---|---|---|---|---|---|
| Inventive Example | 58 | 5 | 1 | 50 | 1 | 50 | 1 | 25 | 1 | 20 | 1 | 5 | 1 | 10 |
| Inventive Example | 59 | 6 | 1 | 50 | 1 | 50 | 1 | 25 | 1 | 20 | 1 | 5 | 1 | 10 |
| Inventive Example | 60 | 7 | 1 | 50 | 1 | 50 | 1 | 25 | 1 | 20 | 1 | 5 | 1 | 10 |
| Inventive Example | 61 | 8 | 1 | 50 | 1 | 50 | 1 | 25 | 1 | 20 | 1 | 5 | 1 | 10 |
| Inventive Example | 62 | 9 | 1 | 50 | 1 | 50 | 1 | 25 | 1 | 20 | 1 | 5 | 1 | 10 |
| Inventive Example | 63 | 10 | 1 | 50 | 1 | 50 | 1 | 25 | 1 | 20 | 1 | 5 | 1 | 10 |
| Inventive Example | 64 | 11 | 1 | 50 | 1 | 50 | 1 | 25 | 1 | 20 | 1 | 5 | 1 | 10 |
| Inventive Example | 65 | 12 | 1 | 50 | 1 | 50 | 1 | 25 | 1 | 20 | 1 | 5 | 1 | 10 |
| Inventive Example | 66 | 13 | 1 | 50 | 1 | 50 | 1 | 25 | 1 | 20 | 1 | 5 | 1 | 10 |
| Inventive Example | 67 | 14 | 1 | 50 | 1 | 50 | 1 | 25 | 1 | 20 | 1 | 5 | 1 | 10 |
| Inventive Example | 68 | 1 | 2 | 50 | 1 | 50 | 1 | 25 | 1 | 20 | 1 | 5 | 1 | 10 |
| Inventive Example | 69 | 1 | 3 | 50 | 1 | 50 | 1 | 25 | 1 | 20 | 1 | 5 | 1 | 10 |
| Comparative Example | 70 | 1 | 4 | 50 | 1 | 50 | 1 | 25 | 1 | 20 | 1 | 5 | 1 | 10 |
| Comparative Example | 71 | 1 | 5 | 50 | 1 | 50 | 1 | 25 | 1 | 20 | 1 | 5 | 1 | 10 |

TABLE 45-continued

| Grouping | No. | Plated Steel Sheet *1 | Water-Dispersible Resin Type *2 | Water-Dispersible Resin Amount *9 | Aqueous Urethane Resin Dispersion Type *3 | Aqueous Urethane Resin Dispersion Amount *9 | Silane Coupling Agent Type *4 | Silane Coupling Agent Amount *9 | Phosphoric acid or Hexafluoro-Metal Acid Type *5 | Phosphoric acid or Hexafluoro-Metal Acid Amount *9 | Water-Soluble Inorganic Component Type *6 | Water-Soluble Inorganic Component Amount *9 | Chromium-Free Antirust Additive Type *7 | Chromium-Free Antirust Additive Amount *9 |
|---|---|---|---|---|---|---|---|---|---|---|---|---|---|---|
| Inventive Example | 72 | 1 | 1 | 50 | 1 | 50 | 2 | 25 | 1 | 20 | 1 | 5 | 1 | 10 |
| Inventive Example | 73 | 1 | 1 | 50 | 1 | 50 | 3 | 25 | 1 | 20 | 1 | 5 | 1 | 10 |
| Inventive Example | 74 | 1 | 1 | 50 | 1 | 50 | 4 | 25 | 1 | 20 | 1 | 5 | 1 | 10 |
| Inventive Example | 75 | 1 | 1 | 50 | 1 | 50 | 5 | 25 | 1 | 20 | 1 | 5 | 1 | 10 |
| Inventive Example | 76 | 1 | 1 | 50 | 1 | 50 | 6 | 25 | 1 | 20 | 1 | 5 | 1 | 10 |

TABLE 46

| | | Lubricant | | Film Thickness (μm) | Baking Temperature (° C.) | Properties | | | | | |
|---|---|---|---|---|---|---|---|---|---|---|---|
| Grouping | No. | Type *8 | Amount *9 | | | Film Appearance | White Rust Resistance (after 168 hours) | White Rust Resistance (after 192 hours) | White Rust Resistance after degreasing with alkali | Electro-conductivity | Paint Adhesiveness |
| Inventive Example | 58 | — | 0 | 1.0 | 140 | ○ | ◎ | ◎ | ◎ | ○ | ◎ |
| Inventive Example | 59 | — | 0 | 1.0 | 140 | ○ | ◎ | ◎ | ◎ | ○ | ◎ |
| Inventive Example | 60 | — | 0 | 1.0 | 140 | ○ | ◎ | ◎ | ◎ | ○ | ◎ |
| Inventive Example | 61 | — | 0 | 1.0 | 140 | ○ | ◎ | ◎ | ◎ | ○ | ◎ |
| Inventive Example | 62 | — | 0 | 1.0 | 140 | ○ | ◎ | ◎ | ◎ | ○ | ◎ |
| Inventive Example | 63 | — | 0 | 1.0 | 140 | ○ | ◎ | ◎ | ◎ | ○ | ◎ |
| Inventive Example | 64 | — | 0 | 1.0 | 140 | ○ | ◎ | ◎ | ◎ | ○ | ◎ |
| Inventive Example | 65 | — | 0 | 1.0 | 140 | ○ | ◎ | ◎ | ◎ | ○ | ◎ |
| Inventive Example | 66 | — | 0 | 1.0 | 140 | ○ | ◎ | ◎ | ◎ | ○ | ◎ |
| Inventive Example | 67 | — | 0 | 1.0 | 140 | ○ | ◎ | ◎ | ◎ | ○ | ◎ |
| Inventive Example | 68 | — | 0 | 1.0 | 140 | ○ | ◎ | ◎ | ○ | ○ | ◎ |
| Inventive Example | 69 | — | 0 | 1.0 | 140 | ○ | ◎ | ◎ | ◎ | ○ | ◎ |
| Comparative Example | 70 | — | 0 | 1.0 | 140 | ○ | Δ | Δ | Δ | ○ | ◎ |
| Comparative Example | 71 | — | 0 | 1.0 | 140 | ○ | Δ | Δ | X | ○ | ◎ |
| Inventive Example | 72 | — | 0 | 1.0 | 140 | ○ | ◎ | ◎ | ◎ | ○ | ◎ |
| Inventive Example | 73 | — | 0 | 1.0 | 140 | ○ | ◎ | ◎ | ◎ | ○ | ◎ |
| Inventive Example | 74 | — | 0 | 1.0 | 140 | ○ | ◎ | ◎ | ◎ | ○ | ◎ |
| Inventive Example | 75 | — | 0 | 1.0 | 140 | ○ | ◎ | ◎ | ◎ | ○ | ◎ |
| Inventive Example | 76 | — | 0 | 1.0 | 140 | ○ | ○ | ○ | ○ | ○ | ◎ |

TABLE 47

| Grouping | No. | Plated Steel Sheet *1 | Water-Dispersible Resin Type *2 | Water-Dispersible Resin Amount *9 | Aqueous Urethane Resin Dispersion Type *3 | Aqueous Urethane Resin Dispersion Amount *9 | Silane Coupling Agent Type *4 | Silane Coupling Agent Amount *9 | Phosphoric acid or Hexafluoro-Metal Acid Type *5 | Phosphoric acid or Hexafluoro-Metal Acid Amount *9 | Water-Soluble Inorganic Component Type *6 | Water-Soluble Inorganic Component Amount *9 | Chromium-Free Antirust Additive Type *7 | Chromium-Free Antirust Additive Amount *9 |
|---|---|---|---|---|---|---|---|---|---|---|---|---|---|---|
| Inventive Example | 77 | 1 | 1 | 50 | 1 | 50 | 7 | 25 | 1 | 20 | 1 | 5 | 1 | 10 |
| Inventive Example | 78 | 1 | 1 | 50 | 1 | 50 | 8 | 25 | 1 | 20 | 1 | 5 | 1 | 10 |
| Inventive Example | 79 | 1 | 1 | 50 | 1 | 50 | 1 | 25 | 2 | 20 | 1 | 5 | 1 | 10 |
| Inventive Example | 80 | 1 | 1 | 50 | 1 | 50 | 1 | 25 | 3 | 20 | 1 | 5 | 1 | 10 |
| Inventive Example | 81 | 1 | 1 | 50 | 1 | 50 | 1 | 25 | 4 | 20 | 1 | 5 | 1 | 10 |
| Inventive Example | 82 | 1 | 1 | 50 | 2 | 50 | 1 | 25 | 1 | 20 | 1 | 5 | — | 0 |
| Inventive Example | 83 | 1 | 1 | 50 | 3 | 50 | 1 | 25 | 1 | 20 | 1 | 5 | — | 0 |
| Inventive Example | 84 | 1 | 1 | 50 | 4 | 50 | 1 | 25 | 1 | 20 | 1 | 5 | — | 0 |
| Inventive Example | 85 | 1 | 1 | 50 | 5 | 50 | 1 | 25 | 1 | 20 | 1 | 5 | — | 0 |
| Inventive Example | 86 | 1 | 1 | 50 | 6 | 50 | 1 | 25 | 1 | 20 | 1 | 5 | — | 0 |
| Inventive Example | 87 | 1 | 1 | 50 | 1 | 50 | 1 | 25 | 1 | 20 | 2 | 5 | — | 0 |
| Inventive Example | 88 | 1 | 1 | 50 | 1 | 50 | 1 | 25 | 1 | 20 | 3 | 5 | — | 0 |
| Inventive Example | 89 | 1 | 1 | 50 | 1 | 50 | 1 | 25 | 1 | 20 | 4 | 5 | — | 0 |
| Inventive Example | 90 | 1 | 1 | 50 | 1 | 50 | 1 | 25 | 1 | 20 | 5 | 5 | — | 0 |
| Inventive Example | 91 | 1 | 1 | 50 | 1 | 50 | 1 | 25 | 1 | 20 | 6 | 5 | — | 0 |
| Inventive Example | 92 | 1 | 1 | 50 | 1 | 50 | 1 | 25 | 1 | 20 | 7 | 5 | — | 0 |
| Inventive Example | 93 | 1 | 1 | 50 | 1 | 50 | 1 | 25 | 1 | 20 | 8 | 5 | — | 0 |
| Inventive Example | 94 | 1 | 1 | 50 | 1 | 50 | 1 | 25 | 1 | 20 | 9 | 5 | — | 0 |
| Inventive Example | 95 | 1 | 1 | 50 | 1 | 50 | 1 | 25 | 1 | 20 | 10 | 5 | — | 0 |

TABLE 48

| Grouping | No. | Lubricant Type *8 | Lubricant Amount *9 | Film Thickness (μm) | Baking Temperature (° C.) | Film Appearance | White Rust Resistance (after 168 hours) | White Rust Resistance (after 192 hours) | White Rust Resistance after degreasing with alkali | Electro-conductivity | Paint Adhesiveness |
|---|---|---|---|---|---|---|---|---|---|---|---|
| Inventive Example | 77 | — | 0 | 1.0 | 140 | ○ | ○ | ○ | ○ | ○ | ◎ |
| Inventive Example | 78 | — | 0 | 1.0 | 140 | ○ | ○ | ○ | ○ | ○ | ◎ |
| Inventive Example | 79 | — | 0 | 1.0 | 140 | ○ | ○ | ○ | ○ | ○ | ◎ |
| Inventive Example | 80 | — | 0 | 1.0 | 140 | ○ | ◎ | ◎ | ◎ | ○ | ◎ |
| Inventive Example | 81 | — | 0 | 1.0 | 140 | ○ | ○ | ○ | ○ | ○ | ◎ |
| Inventive Example | 82 | — | 0 | 1.0 | 140 | ○ | ◎ | ◎ | ◎ | ○ | ◎ |
| Inventive Example | 83 | — | 0 | 1.0 | 140 | ○ | ◎ | ◎ | ◎ | ○ | ◎ |
| Inventive Example | 84 | — | 0 | 1.0 | 140 | ○ | ◎ | ◎ | ◎ | ○ | ◎ |
| Inventive Example | 85 | — | 0 | 1.0 | 140 | ○ | ◎ | ◎ | ◎ | ○ | ◎ |
| Inventive Example | 86 | — | 0 | 1.0 | 140 | ○ | ◎ | ◎ | ◎ | ○ | ◎ |
| Inventive Example | 87 | — | 0 | 1.0 | 140 | ○ | ◎ | ◎ | ◎ | ○ | ◎ |
| Inventive Example | 88 | — | 0 | 1.0 | 140 | ○ | ◎ | ◎ | ◎ | ○ | ◎ |
| Inventive Example | 89 | — | 0 | 1.0 | 140 | ○ | ◎ | ◎ | ◎ | ○ | ◎ |
| Inventive Example | 90 | — | 0 | 1.0 | 140 | ○ | ◎ | ◎ | ◎ | ○ | ◎ |
| Inventive Example | 91 | — | 0 | 1.0 | 140 | ○ | ◎ | ◎ | ◎ | ○ | ◎ |
| Inventive Example | 92 | — | 0 | 1.0 | 140 | ○ | ◎ | ◎ | ◎ | ○ | ◎ |
| Inventive Example | 93 | — | 0 | 1.0 | 140 | ○ | ◎ | ◎ | ◎ | ○ | ◎ |
| Inventive Example | 94 | — | 0 | 1.0 | 140 | ○ | ◎ | ◎ | ◎ | ○ | ◎ |
| Inventive Example | 95 | — | 0 | 1.0 | 140 | ○ | ◎ | ◎ | ◎ | ○ | ◎ |

TABLE 49

| Grouping | No. | Plated Steel Sheet *1 | Water-Dispersible Resin Type *2 | Water-Dispersible Resin Amount *9 | Aqueous Urethane Resin Dispersion Type *3 | Aqueous Urethane Resin Dispersion Amount *9 | Silane Coupling Agent Type *4 | Silane Coupling Agent Amount *9 | Phosphoric acid or Hexafluoro-Metal Acid Type *5 | Phosphoric acid or Hexafluoro-Metal Acid Amount *9 | Water-Soluble Inorganic Component Type *6 | Water-Soluble Inorganic Component Amount *9 | Chromium-Free Antirust Additive Type *7 | Chromium-Free Antirust Additive Amount *9 |
|---|---|---|---|---|---|---|---|---|---|---|---|---|---|---|
| Inventive Example | 96 | 1 | 1 | 50 | 1 | 50 | 1 | 25 | 1 | 20 | 11 | 5 | — | 0 |
| Inventive Example | 97 | 1 | 1 | 50 | 1 | 50 | 1 | 25 | 1 | 20 | 12 | 5 | — | 0 |
| Inventive Example | 98 | 1 | 1 | 50 | 1 | 50 | 1 | 25 | 1 | 20 | 13 | 5 | — | 0 |
| Inventive Example | 99 | 1 | 1 | 50 | 1 | 50 | 1 | 25 | 1 | 20 | 1 | 5 | 2 | 10 |
| Inventive Example | 100 | 1 | 1 | 50 | 1 | 50 | 1 | 25 | 1 | 20 | 1 | 5 | 3 | 10 |
| Inventive Example | 101 | 1 | 1 | 50 | 1 | 50 | 1 | 25 | 1 | 20 | 1 | 5 | 4 | 10 |
| Inventive Example | 102 | 1 | 1 | 50 | 1 | 50 | 1 | 25 | 1 | 20 | 1 | 5 | 5 | 10 |
| Inventive Example | 103 | 1 | 1 | 50 | 1 | 50 | 1 | 25 | 1 | 20 | 1 | 5 | 6 | 10 |
| Inventive Example | 104 | 1 | 1 | 50 | 1 | 50 | 1 | 25 | 1 | 20 | 1 | 5 | 1 | 10 |
| Inventive Example | 105 | 1 | 1 | 100 | 1 | 15 | 1 | 25 | 1 | 20 | 1 | 5 | — | 0 |
| Inventive Example | 106 | 1 | 1 | 100 | — | 0 | 1 | 15 | 1 | 20 | — | 0 | — | 0 |
| Inventive Example | 107 | 1 | 1 | 100 | — | 0 | 1 | 25 | 1 | 20 | — | 0 | — | 0 |
| Inventive Example | 108 | 1 | 1 | 100 | — | 0 | 1 | 25 | 1 | 40 | — | 0 | — | 0 |
| Inventive Example | 109 | 1 | 1 | 100 | — | 0 | 1 | 25 | 1 | 20 | 1 | 5 | — | 0 |
| Inventive Example | 110 | 1 | 1 | 100 | — | 0 | 1 | 25 | 1 | 20 | 1 | 10 | — | 0 |
| Inventive Example | 111 | 1 | 1 | 100 | — | 0 | 1 | 25 | 1 | 20 | 1 | 5 | 1 | 10 |
| Inventive Example | 112 | 1 | 1 | 100 | — | 0 | 1 | 25 | 1 | 20 | 1 | 5 | — | 0 |

TABLE 50

| Grouping | No. | Lubricant Type *8 | Lubricant Amount *9 | Film Thickness (μm) | Baking Temperature (° C.) | Film Appearance | White Rust Resistance (after 168 hours) | White Rust Resistance (after 192 hours) | White Rust Resistance after degreasing with alkali | Electro-conductivity | Paint Adhesiveness |
|---|---|---|---|---|---|---|---|---|---|---|---|
| Inventive Example | 96 | — | 0 | 1.0 | 140 | ○ | ◎ | ◎ | ◎ | ○ | ◎ |
| Inventive Example | 97 | — | 0 | 1.0 | 140 | ○ | ◎ | ◎ | ◎ | ○ | ◎ |
| Inventive Example | 98 | — | 0 | 1.0 | 140 | ○ | ◎ | ◎ | ◎ | ○ | ◎ |
| Inventive Example | 99 | — | 0 | 1.0 | 140 | ○ | ○— | ○— | ○— | ○ | ◎ |
| Inventive Example | 100 | — | 0 | 1.0 | 140 | ○ | ○ | ○ | ○ | ○ | ◎ |
| Inventive Example | 101 | — | 0 | 1.0 | 140 | ○ | ◎ | ◎ | ◎ | ○ | ◎ |
| Inventive Example | 102 | — | 0 | 1.0 | 140 | ○ | ◎ | ◎ | ◎ | ○ | ◎ |

TABLE 50-continued

| | | Lubricant | | Film Thickness (μm) | Baking Temperature (° C.) | Properties | | | | | |
|---|---|---|---|---|---|---|---|---|---|---|---|
| | | | | | | Film Appearance | White Rust Resistance (after 168 hours) | White Rust Resistance (after 192 hours) | White Rust Resistance after degreasing with alkali | Electro-conductivity | Paint Adhesiveness |
| Grouping | No. | Type *8 | Amount *9 | | | | | | | | |
| Inventive Example | 103 | — | 0 | 1.0 | 140 | ○ | ◎ | ◎ | ◎ | ○ | ◎ |
| Inventive Example | 104 | 2 | 10 | 1.0 | 140 | ○ | ◎ | ◎ | ◎ | ○ | ◎ |
| Inventive Example | 105 | — | 0 | upper layer*/lower layer = 0.5/0.5 | 140 | ○ | ◎ | ◎ | ◎ | ○ | ◎ |
| Inventive Example | 106 | — | 0 | 1.0 | 140 | ○ | ◎ | ○ | ○ | ○ | ◎ |
| Inventive Example | 107 | — | 0 | 1.0 | 140 | ○ | ◎ | ○ | ○ | ○ | ◎ |
| Inventive Example | 108 | — | 0 | 1.0 | 140 | ○ | ◎ | ○ | ○ | ○ | ◎ |
| Inventive Example | 109 | — | 0 | 1.0 | 140 | ○ | ◎ | ○ | ◎ | ○ | ◎ |
| Inventive Example | 110 | — | 0 | 1.0 | 140 | ○ | ◎ | ○ | ◎ | ○ | ◎ |
| Inventive Example | 111 | — | 0 | 1.0 | 140 | ○ | ◎ | ○ | ◎ | ○ | ◎ |
| Inventive Example | 112 | 1 | 10 | 1.0 | 140 | ○ | ◎ | ○ | ◎ | ○ | ◎ |

*upper layer: organic resin film

Example 4

An aqueous epoxy resin dispersion as in Table 51 was used for the resin composition for surface-treating compositions. An aqueous urethane resin dispersion (Table 35), a silane coupling agent (Table 3), a phosphoric acid or hexafluoro-metal acid (Table 4), a water-soluble inorganic component (Table 36), a chromium-free antirust additive (Table 37) and a solid lubricant (Table 38) were suitably added to it, then controlled to have a pH of from 0.5 to 6 with any of aqueous ammonia, nitric acid, acetic acid, sulfuric acid, phosphoric acid, hexafluoro-metal acid or the like added thereto, and stirred for a predetermined period of time with a disperser for paint (sand grinder) to prepare surface-treating compositions.

Production Examples 1 and 2 for producing the aqueous epoxy resin dispersions shown in Table 51 are described below.

Production Example 1

1688 g of polyethylene glycol having a number-average molecular weight of 4000 and 539 of methyl ethyl ketone were put into a four-neck flask of glass equipped with a thermometer, a stirrer and a condenser tube, and mixed with stirring at 60° C. After the resulting mixture became uniform and transparent, 171 g. of tolylene diisocyanate was added thereto and reacted for 2 hours, and then 1121 g of Epikote 834X90 (epoxy resin, by Shell Japan, epoxy equivalent 250), 66 g of diethylene glycol ethyl ether and 1.1 g of 1% dibutyl tin dilaurate solution were added thereto and further reacted for 2 hours. Next, this was heated up to 80° C. and reacted for 3 hours to confirm that its isocyanate value became at most 0.6. Next, this was heated up to 90° C., and methyl ethyl ketone was removed through distillation under reduced pressure until the solid content of the residue became 81.7%. After the removal, this was diluted with 659 g of propylene glycol monomethyl ether and 270 g of deionized water to be a polyalkylene glycol-modified epoxy resin solution J1 having a solid content of 76%.

On the other hand, 2029 g of EP1004 (epoxy resin, by Yuka Shell-Epoxy, epoxy equivalent 1000) and 697 g of propylene glycol monobutyl ether were put into a four-neck flask, and heated up to 110° C. to completely dissolve the epoxy resin within 1 hour. 1180 g of the polyalkylene glycol-modified epoxy resin solution J1 and 311.7 g of 3-amino-1,2,4-triazole (molecular weight 84) were added to it and reacted at 100° C. for 5 hours, and then 719.6 f of propylene glycol monobutyl ether was added thereto to give a resin solution K1.

257.6 g of the resin solution K1 was mixed with 50 g of MF-K60X (isocyanate curing agent, by Asahi Chemical Industry) and 0.3 g of Scat 24 (curing catalyst) and well stirred, and 692.1 g of water was dropwise added thereto little by little, and mixed with stirring to give an aqueous epoxy resin dispersion G1.

Production Example 2 (Comparative Example: Aqueous Epoxy Resin Dispersion with No Hydrazine)

2029 g of EP1004 (epoxy resin, by Yuka Shell-Epoxy, epoxy equivalent 1000) and 697 g of propylene glycol monobutyl ether were put into a four-neck flask, and heated up to 110° C. to completely dissolve the epoxy resin within 1 hour. 1180 g of the polyalkylene glycol-modified epoxy resin solution J1 obtained in Production Example 1 and 527.0 g of propylene glycol monobutyl ether were added to it to prepare a resin solution K2. 257.6 g of the resin solution K2 was mixed with 50 g of MF-K60X (isocyanate curing agent, by Asahi Chemical Industry) and 0.3 g of Scat 24 (curing catalyst) and well stirred, and 692.1 g of water was dropwise added thereto little by little, and mixed with stirring to give an aqueous epoxy resin dispersion G2.

Plated steel sheets as in Table 1 were processed herein. These are plated steel sheets for electric and electronic appliances for household use, construction materials and automobile parts, and their base is a cold-rolled steel sheet. The thickness of each steel sheet was defined in accordance with the object of evaluation. The surface of the plated steel sheet was degreased with alkali, washed with water, dried, and then coated with the above-mentioned, surface-treating composition by the use of a roll coater. Then, not washed with water, this was dried under heat at a predetermined temperature. The thickness of the film was controlled by varying the solid content (heating residue) of the surface-treating composition or the coating condition (rolling reduction, revolving speed, etc.)

The film composition and the quality (film appearance, white rust resistance, white rust resistance after degreasing with alkali, electroconductivity, paint adhesiveness) of the thus-obtained surface-treated steel sheets were evaluated, and the results are given in Table 52 to Table 63. The quality evaluation for the film appearance, the white rust resistance, the electroconductivity and the paint adhesiveness of each sample was effected in the same manner as in [Example 1], but the white rust resistance was evaluated on the basis of the white rust surface after 168 hours and after 192 hours. In addition, the white rust resistance after degreasing with alkali was evaluated in the same manner as in [Example 3].

TABLE 51

| No. | Aqueous Epoxy Resin Dispersion |
|---|---|
| 1. | G1 described in the text of the specification (Production Example 1) |
| 2 | G2 described in the text of the specification (Production Example 2) |

In Table 52 to Table 63, *1 to *9 mean the following:
*1: No. (plated steel sheet) in Table 1.
*2: No. (aqueous epoxy resin dispersion) in Table 51.
*3: No. (aqueous urethane resin dispersion) in Table 35.
*4: No. (silane coupling agent) in Table 3.
*5: No. (phosphoric acid or hexafluoro-metal acid) in Table 4.
*6: No. (water-soluble inorganic component) in Table 36.
*7: No. (chromium-free antirust additive) in Table 37.
*8: No. (solid lubricant) in Table 38.
*9: part by mass.

TABLE 52

| Grouping | No. | Plated Steel Sheet *1 | Water-Dispersible Resin Type *2 | Amount *9 | Aqueous Urethane Resin Dispersion Type *3 | Amount *9 | Silane Coupling Agent Type *4 | Amount *9 | Phosphoric acid or Hexafluoro-Metal Acid Type *5 | Amount *9 | Water-Soluble Inorganic Component Type *6 | Amount *9 | Chromium-Free Antirust Additive Type *7 | Amount *9 |
|---|---|---|---|---|---|---|---|---|---|---|---|---|---|---|
| Comparative Example | 1 | 1 | — | 0 | — | 0 | 1 | 25 | 1 | 20 | — | 0 | — | 0 |
| Comparative Example | 2 | 1 | 1 | 50 | 1 | 50 | — | 0 | 1 | 20 | — | 0 | — | 0 |
| Inventive Example | 3 | 1 | 1 | 50 | 1 | 50 | 1 | 5 | 1 | 20 | — | 0 | — | 0 |
| Inventive Example | 4 | 1 | 1 | 50 | 1 | 50 | 1 | 15 | 1 | 20 | — | 0 | — | 0 |
| Inventive Example | 5 | 1 | 1 | 50 | 1 | 50 | 1 | 50 | 1 | 20 | — | 0 | — | 0 |
| Inventive Example | 6 | 1 | 1 | 50 | 1 | 50 | 1 | 100 | 1 | 20 | — | 0 | — | 0 |
| Comparative Example | 7 | 1 | 1 | 50 | 1 | 50 | 1 | 500 | 1 | 20 | — | 0 | — | 0 |
| Comparative Example | 8 | 1 | 1 | 50 | 1 | 50 | 1 | 25 | — | 0 | — | 0 | — | 0 |
| Inventive Example | 9 | 1 | 1 | 50 | 1 | 50 | 1 | 25 | 1 | 1 | — | 0 | — | 0 |
| Inventive Example | 10 | 1 | 1 | 50 | 1 | 50 | 1 | 25 | 1 | 5 | — | 0 | — | 0 |
| Inventive Example | 11 | 1 | 1 | 50 | 1 | 50 | 1 | 25 | 1 | 20 | — | 0 | — | 0 |
| Inventive Example | 12 | 1 | 1 | 50 | 1 | 50 | 1 | 25 | 1 | 40 | — | 0 | — | 0 |
| Comparative Example | 13 | 1 | 1 | 50 | 1 | 50 | 1 | 25 | 1 | 100 | — | 0 | — | 0 |
| Inventive Example | 14 | 1 | 1 | 50 | 1 | 50 | 1 | 25 | 1 | 20 | 1 | 0.5 | — | 0 |
| Inventive Example | 15 | 1 | 1 | 50 | 1 | 50 | 1 | 25 | 1 | 20 | 1 | 5 | — | 0 |
| Inventive Example | 16 | 1 | 1 | 50 | 1 | 50 | 1 | 25 | 1 | 20 | 1 | 10 | — | 0 |
| Inventive Example | 17 | 1 | 1 | 50 | 1 | 50 | 1 | 25 | 1 | 20 | 1 | 30 | — | 0 |

TABLE 53

| Grouping | No. | Lubricant Type *8 | Lubricant Amount *9 | Film Thickness (μm) | Baking Temperature (° C.) | Film Appearance | Properties White Rust Resistance (after 168 hours) | White Rust Resistance (after 192 hours) | White Rust Resistance after degreasing with alkali | Electro-conductivity | Paint Adhesiveness |
|---|---|---|---|---|---|---|---|---|---|---|---|
| Comparative Example | 1 | — | 0 | 1.0 | 140 | Δ | X | X | X | ○ | ◎ |
| Comparative Example | 2 | — | 0 | 1.0 | 140 | ○ | Δ | Δ | X | ○ | Δ |
| Inventive Example | 3 | — | 0 | 1.0 | 140 | ○ | ○ | ○ | ○ | ○ | ◎ |
| Inventive Example | 4 | — | 0 | 1.0 | 140 | ○ | ◎ | ◎ | ○ | ○ | ◎ |
| Inventive Example | 5 | — | 0 | 1.0 | 140 | ○ | ◎ | ◎ | ○ | ○ | ◎ |
| Inventive Example | 6 | — | 0 | 1.0 | 140 | ○ | ○ | ○ | ○ | ○ | ◎ |
| Comparative Example | 7 | — | 0 | 1.0 | 140 | ○ | X | X | X | ○ | ◎ |
| Comparative Example | 8 | — | 0 | 1.0 | 140 | ○ | Δ | Δ | X | ○ | ◎ |
| Inventive Example | 9 | — | 0 | 1.0 | 140 | ○ | ○ | ○ | ○ | ○ | ◎ |
| Inventive Example | 10 | — | 0 | 1.0 | 140 | ○ | ◎ | ◎ | ○ | ○ | ◎ |
| Inventive Example | 11 | — | 0 | 1.0 | 140 | ○ | ◎ | ◎ | ○ | ○ | ◎ |
| Inventive Example | 12 | — | 0 | 1.0 | 140 | ○ | ◎ | ◎ | ○ | ○ | ◎ |

TABLE 53-continued

| | | Lubricant | | Film Thickness (μm) | Baking Temperature (° C.) | Properties | | | | | |
|---|---|---|---|---|---|---|---|---|---|---|---|
| | | | | | | | | | White Rust Resistance after | | Paint |
| Grouping | No. | Type *8 | Amount *9 | | | Film Appearance | White Rust Resistance (after 168 hours) | White Rust Resistance (after 192 hours) | degreasing with alkali | Electro-conductivity | Adhesiveness |
| Comparative Example | 13 | — | 0 | 1.0 | 140 | X | Δ | Δ | Δ | ○ | ◎ |
| Inventive Example | 14 | — | 0 | 1.0 | 140 | ○ | ◎ | ◎ | ○ | ○ | ◎ |
| Inventive Example | 15 | — | 0 | 1.0 | 140 | ○ | ◎ | ◎ | ◎ | ○ | ◎ |
| Inventive Example | 16 | — | 0 | 1.0 | 140 | ○ | ◎ | ◎ | ◎ | ○ | ◎ |
| Inventive Example | 17 | — | 0 | 1.0 | 140 | ○ | ◎ | ◎ | ◎ | ○ | ◎ |

TABLE 54

| Grouping | No. | Plated Steel Sheet *1 | Water-Dispersible Resin | | Aqueous Urethane Resin Dispersion | | Silane Coupling Agent | | Phosphoric acid or Hexafluoro-Metal Acid | | Water-Soluble Inorganic Component | | Chromium-Free Antirust Additive | |
|---|---|---|---|---|---|---|---|---|---|---|---|---|---|---|
| | | | Type *2 | Amount *9 | Type *3 | Amount *9 | Type *4 | Amount *9 | Type *5 | Amount *9 | Type *6 | Amount *9 | Type *7 | Amount *9 |
| Inventive Example | 18 | 1 | 1 | 50 | 1 | 50 | 1 | 25 | 1 | 20 | 1 | 50 | — | 0 |
| Comparative Example | 19 | 1 | 1 | 50 | 1 | 50 | 1 | 25 | 1 | 20 | 1 | 80 | — | 0 |
| Inventive Example | 20 | 1 | 1 | 50 | 1 | 50 | 1 | 25 | 1 | 20 | — | 0 | 1 | 1 |
| Inventive Example | 21 | 1 | 1 | 50 | 1 | 50 | 1 | 25 | 1 | 20 | — | 0 | 1 | 10 |
| Inventive Example | 22 | 1 | 1 | 50 | 1 | 50 | 1 | 25 | 1 | 20 | — | 0 | 1 | 30 |
| Comparative Example | 23 | 1 | 1 | 50 | 1 | 50 | 1 | 25 | 1 | 20 | — | 0 | 1 | 70 |
| Inventive Example | 24 | 1 | 1 | 50 | 1 | 50 | 1 | 25 | 1 | 20 | 1 | 5 | 1 | 1 |
| Inventive Example | 25 | 1 | 1 | 50 | 1 | 50 | 1 | 25 | 1 | 20 | 1 | 5 | 1 | 10 |
| Inventive Example | 26 | 1 | 1 | 50 | 1 | 50 | 1 | 25 | 1 | 20 | 1 | 10 | 1 | 10 |
| Inventive Example | 27 | 1 | 1 | 50 | 1 | 50 | 1 | 25 | 1 | 20 | 1 | 10 | 1 | 30 |
| Inventive Example | 28 | 1 | 1 | 50 | 1 | 50 | 1 | 25 | 1 | 20 | 1 | 50 | 1 | 1 |
| Inventive Example | 29 | 1 | 1 | 50 | 1 | 50 | 1 | 25 | 1 | 20 | 1 | 50 | 1 | 30 |
| Comparative Example | 30 | 1 | 1 | 50 | 1 | 50 | 1 | 25 | 1 | 20 | 1 | 100 | 1 | 50 |
| Inventive Example | 31 | 1 | 1 | 50 | 1 | 50 | 1 | 25 | 1 | 20 | 1 | 5 | — | 0 |
| Inventive Example | 32 | 1 | 1 | 50 | 1 | 50 | 1 | 25 | 1 | 20 | 1 | 5 | — | 0 |
| Inventive Example | 33 | 1 | 1 | 50 | 1 | 50 | 1 | 25 | 1 | 20 | 1 | 5 | — | 0 |
| Inventive Example | 34 | 1 | 1 | 50 | 1 | 50 | 1 | 25 | 1 | 20 | 1 | 5 | — | 0 |

TABLE 55

| | | Lubricant | | Film Thickness (μm) | Baking Temperature (° C.) | Properties | | | | | |
|---|---|---|---|---|---|---|---|---|---|---|---|
| | | | | | | | | | White Rust Resistance after | | Paint |
| Grouping | No. | Type *8 | Amount *9 | | | Film Appearance | White Rust Resistance (after 168 hours) | White Rust Resistance (after 192 hours) | degreasing with alkali | Electro-conductivity | Adhesiveness |
| Inventive Example | 18 | — | 0 | 1.0 | 140 | ○ | ○ | ○ | ○ | ○ | ◎ |
| Comparative Example | 19 | — | 0 | 1.0 | 140 | X | Δ | Δ | Δ | ○ | ◎ |
| Inventive Example | 20 | — | 0 | 1.0 | 140 | ○ | ◎ | ◎ | ◎ | ○ | ◎ |
| Inventive Example | 21 | — | 0 | 1.0 | 140 | ○ | ◎ | ◎ | ◎ | ○ | ◎ |
| Inventive Example | 22 | — | 0 | 1.0 | 140 | ○ | ○ | ○ | ○ | ○ | ◎ |
| Comparative Example | 23 | — | 0 | 1.0 | 140 | ○ | Δ | Δ | X | ○ | ◎ |
| Inventive Example | 24 | — | 0 | 1.0 | 140 | ○ | ◎ | ◎ | ◎ | ○ | ◎ |
| Inventive Example | 25 | — | 0 | 1.0 | 140 | ○ | ◎ | ◎ | ◎ | ○ | ◎ |
| Inventive Example | 26 | — | 0 | 1.0 | 140 | ○ | ◎ | ◎ | ◎ | ○ | ◎ |
| Inventive Example | 27 | — | 0 | 1.0 | 140 | ○ | ○ | ○ | ○ | ○ | ◎ |
| Inventive Example | 28 | — | 0 | 1.0 | 140 | ○ | ○— | ○— | ○— | ○ | ◎ |
| Inventive Example | 29 | — | 0 | 1.0 | 140 | ○ | ○— | ○— | ○ | ○ | ◎ |
| Comparative Example | 30 | — | 0 | 1.0 | 140 | X | X | X | X | ○ | ◎ |
| Inventive Example | 31 | 1 | 0.2 | 1.0 | 140 | ○ | ◎ | ◎ | ◎ | ○ | ○ |
| Inventive Example | 32 | 1 | 2 | 1.0 | 140 | ○ | ◎ | ◎ | ◎ | ○ | ◎ |
| Inventive Example | 33 | 1 | 10 | 1.0 | 140 | ○ | ◎ | ◎ | ◎ | ○ | ○ |
| Inventive Example | 34 | 1 | 20 | 1.0 | 140 | ○ | ◎ | ◎ | ◎ | ○ | ○ |

TABLE 56

| Grouping | No. | Plated Steel Sheet *1 | Water-Dispersible Resin Type *2 | Water-Dispersible Resin Amount *9 | Aqueous Urethane Resin Dispersion Type *3 | Aqueous Urethane Resin Dispersion Amount *9 | Silane Coupling Agent Type *4 | Silane Coupling Agent Amount *9 | Phosphoric acid or Hexafluoro-Metal Acid Type *5 | Phosphoric acid or Hexafluoro-Metal Acid Amount *9 | Water-Soluble Inorganic Component Type *6 | Water-Soluble Inorganic Component Amount *9 | Chromium-Free Antirust Additive Type *7 | Chromium-Free Antirust Additive Amount *9 |
|---|---|---|---|---|---|---|---|---|---|---|---|---|---|---|
| Inventive Example | 35 | 1 | 1 | 50 | 1 | 50 | 1 | 25 | 1 | 20 | 1 | 5 | — | 0 |
| Comparative Example | 36 | 1 | 1 | 50 | 1 | 50 | 1 | 25 | 1 | 20 | 1 | 5 | — | 0 |
| Inventive Example | 37 | 1 | 1 | 50 | 1 | 50 | 1 | 25 | 1 | 20 | 1 | 5 | — | 0 |
| Inventive Example | 38 | 1 | 1 | 50 | 1 | 50 | 1 | 25 | 1 | 20 | 1 | 5 | — | 0 |
| Inventive Example | 39 | 1 | 1 | 50 | 1 | 50 | 1 | 25 | 1 | 20 | 1 | 5 | — | 0 |
| Inventive Example | 40 | 1 | 1 | 50 | 1 | 50 | 1 | 25 | 1 | 20 | 1 | 5 | — | 0 |
| Inventive Example | 41 | 1 | 1 | 50 | 1 | 50 | 1 | 25 | 1 | 20 | 1 | 5 | — | 0 |
| Comparative Example | 42 | 1 | 1 | 50 | 1 | 50 | 1 | 25 | 1 | 20 | 1 | 5 | — | 0 |
| Comparative Example | 43 | 1 | 1 | 50 | 1 | 50 | 1 | 25 | 1 | 20 | 1 | 5 | — | 0 |
| Inventive Example | 44 | 1 | 1 | 50 | 1 | 50 | 1 | 25 | 1 | 20 | 1 | 5 | — | 0 |
| Inventive Example | 45 | 1 | 1 | 50 | 1 | 50 | 1 | 25 | 1 | 20 | 1 | 5 | — | 0 |
| Inventive Example | 46 | 1 | 1 | 50 | 1 | 50 | 1 | 25 | 1 | 20 | 1 | 5 | — | 0 |
| Inventive Example | 47 | 1 | 1 | 50 | 1 | 50 | 1 | 25 | 1 | 20 | 1 | 5 | — | 0 |
| Inventive Example | 48 | 1 | 1 | 50 | 1 | 50 | 1 | 25 | 1 | 20 | 1 | 5 | — | 0 |
| Comparative Example | 49 | 1 | 1 | 50 | 1 | 50 | 1 | 25 | 1 | 20 | 1 | 5 | — | 0 |
| Inventive Example | 50 | 2 | 1 | 50 | 1 | 50 | 1 | 25 | 1 | 20 | 1 | 5 | 1 | 10 |
| Inventive Example | 51 | 3 | 1 | 50 | 1 | 50 | 1 | 25 | 1 | 20 | 1 | 5 | 1 | 10 |

TABLE 57

| Grouping | No. | Lubricant Type *8 | Lubricant Amount *9 | Film Thickness (μm) | Baking Temperature (°C.) | Film Appearance | White Rust Resistance (after 168 hours) | White Rust Resistance (after 192 hours) | White Rust Resistance after degreasing with alkali | Electro-conductivity | Paint Adhesiveness |
|---|---|---|---|---|---|---|---|---|---|---|---|
| Inventive Example | 35 | 1 | 50 | 1.0 | 140 | ○ | ◎ | ◎ | ○ | ○ | ○ |
| Comparative Example | 36 | — | 0 | 0.005 | 140 | ○ | X | X | X | ○ | ◎ |
| Inventive Example | 37 | — | 0 | 0.05 | 140 | ○ | ○ | ○ | ○ | ○ | ◎ |
| Inventive Example | 38 | — | 0 | 0.1 | 140 | ○ | ◎ | ◎ | ◎ | ○ | ◎ |
| Inventive Example | 39 | — | 0 | 0.5 | 140 | ○ | ◎ | ◎ | ◎ | ○ | ◎ |
| Inventive Example | 40 | — | 0 | 1.0 | 140 | ○ | ◎ | ◎ | ◎ | ○ | ◎ |
| Inventive Example | 41 | — | 0 | 5.0 | 140 | ○ | ◎ | ◎ | ◎ | △ | ◎ |
| Comparative Example | 42 | — | 0 | 7.0 | 140 | ○ | ◎ | ◎ | ◎ | X | ◎ |
| Comparative Example | 43 | — | 0 | 1.0 | 25 | ○ | X | X | X | ○ | ○ |
| Inventive Example | 44 | — | 0 | 1.0 | 50 | ○ | ○ | ○ | ○ | ○ | ◎ |
| Inventive Example | 45 | — | 0 | 1.0 | 100 | ○ | ◎ | ◎ | ◎ | ○ | ◎ |
| Inventive Example | 46 | — | 0 | 1.0 | 200 | ○ | ◎ | ◎ | ◎ | ○ | ◎ |
| Inventive Example | 47 | — | 0 | 1.0 | 250 | ○ | ◎ | ◎ | ◎ | ○ | ◎ |
| Inventive Example | 48 | — | 0 | 1.0 | 300 | ○ | ○ | ○ | ○ | ○ | ◎ |
| Comparative Example | 49 | — | 0 | 1.0 | 350 | ○ | △ | △ | △ | ○ | ◎ |
| Inventive Example | 50 | — | 0 | 1.0 | 140 | ○ | ◎ | ◎ | ◎ | ○ | ◎ |
| Inventive Example | 51 | — | 0 | 1.0 | 140 | ○ | ◎ | ◎ | ◎ | ○ | ◎ |

TABLE 58

| Grouping | No. | Plated Steel Sheet *1 | Water-Dispersible Resin Type *2 | Water-Dispersible Resin Amount *9 | Aqueous Urethane Resin Dispersion Type *3 | Aqueous Urethane Resin Dispersion Amount *9 | Silane Coupling Agent Type *4 | Silane Coupling Agent Amount *9 | Phosphoric acid or Hexafluoro-Metal Acid Type *5 | Phosphoric acid or Hexafluoro-Metal Acid Amount *9 | Water-Soluble Inorganic Component Type *6 | Water-Soluble Inorganic Component Amount *9 | Chromium-Free Antirust Additive Type *7 | Chromium-Free Antirust Additive Amount *9 |
|---|---|---|---|---|---|---|---|---|---|---|---|---|---|---|
| Inventive Example | 52 | 4 | 1 | 50 | 1 | 50 | 1 | 25 | 1 | 20 | 1 | 5 | 1 | 10 |
| Inventive Example | 53 | 5 | 1 | 50 | 1 | 50 | 1 | 25 | 1 | 20 | 1 | 5 | 1 | 10 |
| Inventive Example | 54 | 6 | 1 | 50 | 1 | 50 | 1 | 25 | 1 | 20 | 1 | 5 | 1 | 10 |
| Inventive Example | 55 | 7 | 1 | 50 | 1 | 50 | 1 | 25 | 1 | 20 | 1 | 5 | 1 | 10 |
| Inventive Example | 56 | 8 | 1 | 50 | 1 | 50 | 1 | 25 | 1 | 20 | 1 | 5 | 1 | 10 |
| Inventive Example | 57 | 9 | 1 | 50 | 1 | 50 | 1 | 25 | 1 | 20 | 1 | 5 | 1 | 10 |
| Inventive Example | 58 | 10 | 1 | 50 | 1 | 50 | 1 | 25 | 1 | 20 | 1 | 5 | 1 | 10 |
| Inventive Example | 59 | 11 | 1 | 50 | 1 | 50 | 1 | 25 | 1 | 20 | 1 | 5 | 1 | 10 |
| Inventive Example | 60 | 12 | 1 | 50 | 1 | 50 | 1 | 25 | 1 | 20 | 1 | 5 | 1 | 10 |
| Inventive Example | 61 | 13 | 1 | 50 | 1 | 50 | 1 | 25 | 1 | 20 | 1 | 5 | 1 | 10 |
| Inventive Example | 62 | 14 | 1 | 50 | 1 | 50 | 1 | 25 | 1 | 20 | 1 | 5 | 1 | 10 |

TABLE 58-continued

| Grouping | No. | Plated Steel Sheet *1 | Water-Dispersible Resin Type *2 | Water-Dispersible Resin Amount *9 | Aqueous Urethane Resin Dispersion Type *3 | Aqueous Urethane Resin Dispersion Amount *9 | Silane Coupling Agent Type *4 | Silane Coupling Agent Amount *9 | Phosphoric acid or Hexafluoro-Metal Acid Type *5 | Phosphoric acid or Hexafluoro-Metal Acid Amount *9 | Water-Soluble Inorganic Component Type *6 | Water-Soluble Inorganic Component Amount *9 | Chromium-Free Antirust Additive Type *7 | Chromium-Free Antirust Additive Amount *9 |
|---|---|---|---|---|---|---|---|---|---|---|---|---|---|---|
| Comparative Example | 63 | 1 | 2 | 50 | 1 | 50 | 1 | 25 | 1 | 20 | 1 | 5 | 1 | 10 |
| Inventive Example | 64 | 1 | 1 | 50 | 1 | 50 | 2 | 25 | 1 | 20 | 1 | 5 | 1 | 10 |
| Inventive Example | 65 | 1 | 1 | 50 | 1 | 50 | 3 | 25 | 1 | 20 | 1 | 5 | 1 | 10 |
| Inventive Example | 66 | 1 | 1 | 50 | 1 | 50 | 4 | 25 | 1 | 20 | 1 | 5 | 1 | 10 |
| Inventive Example | 67 | 1 | 1 | 50 | 1 | 50 | 5 | 25 | 1 | 20 | 1 | 5 | 1 | 10 |
| Inventive Example | 68 | 1 | 1 | 50 | 1 | 50 | 6 | 25 | 1 | 20 | 1 | 5 | 1 | 10 |

TABLE 59

| Grouping | No. | Lubricant Type *8 | Lubricant Amount *9 | Film Thickness (μm) | Baking Temperature (°C.) | Film Appearance | White Rust Resistance (after 168 hours) | White Rust Resistance (after 192 hours) | White Rust Resistance after degreasing with alkali | Electro-conductivity | Paint Adhesiveness |
|---|---|---|---|---|---|---|---|---|---|---|---|
| Inventive Example | 52 | — | 0 | 1.0 | 140 | ○ | ◎ | ◎ | ◎ | ○ | ◎ |
| Inventive Example | 53 | — | 0 | 1.0 | 140 | ○ | ◎ | ◎ | ◎ | ○ | ◎ |
| Inventive Example | 54 | — | 0 | 1.0 | 140 | ○ | ◎ | ◎ | ◎ | ○ | ◎ |
| Inventive Example | 55 | — | 0 | 1.0 | 140 | ○ | ◎ | ◎ | ◎ | ○ | ◎ |
| Inventive Example | 56 | — | 0 | 1.0 | 140 | ○ | ◎ | ◎ | ◎ | ○ | ◎ |
| Inventive Example | 57 | — | 0 | 1.0 | 140 | ○ | ◎ | ◎ | ◎ | ○ | ◎ |
| Inventive Example | 58 | — | 0 | 1.0 | 140 | ○ | ◎ | ◎ | ◎ | ○ | ◎ |
| Inventive Example | 59 | — | 0 | 1.0 | 140 | ○ | ◎ | ◎ | ◎ | ○ | ◎ |
| Inventive Example | 60 | — | 0 | 1.0 | 140 | ○ | ◎ | ◎ | ◎ | ○ | ◎ |
| Inventive Example | 61 | — | 0 | 1.0 | 140 | ○ | ◎ | ◎ | ◎ | ○ | ◎ |
| Inventive Example | 62 | — | 0 | 1.0 | 140 | ○ | ◎ | ◎ | ◎ | ○ | ◎ |
| Comparative Example | 63 | — | 0 | 1.0 | 140 | ○ | Δ | Δ | Δ | ○ | ◎ |
| Inventive Example | 64 | — | 0 | 1.0 | 140 | ○ | ◎ | ◎ | ◎ | ○ | ◎ |
| Inventive Example | 65 | — | 0 | 1.0 | 140 | ○ | ◎ | ◎ | ◎ | ○ | ◎ |
| Inventive Example | 66 | — | 0 | 1.0 | 140 | ○ | ◎ | ◎ | ◎ | ○ | ◎ |
| Inventive Example | 67 | — | 0 | 1.0 | 140 | ○ | ◎ | ◎ | ◎ | ○ | ◎ |
| Inventive Example | 68 | — | 0 | 1.0 | 140 | ○ | ○ | ○ | ○ | ○ | ◎ |

TABLE 60

| Grouping | No. | Plated Steel Sheet *1 | Water-Dispersible Resin Type *2 | Water-Dispersible Resin Amount *9 | Aqueous Urethane Resin Dispersion Type *3 | Aqueous Urethane Resin Dispersion Amount *9 | Silane Coupling Agent Type *4 | Silane Coupling Agent Amount *9 | Phosphoric acid or Hexafluoro-Metal Acid Type *5 | Phosphoric acid or Hexafluoro-Metal Acid Amount *9 | Water-Soluble Inorganic Component Type *6 | Water-Soluble Inorganic Component Amount *9 | Chromium-Free Antirust Additive Type *7 | Chromium-Free Antirust Additive Amount *9 |
|---|---|---|---|---|---|---|---|---|---|---|---|---|---|---|
| Inventive Example | 69 | 1 | 1 | 50 | 1 | 50 | 7 | 25 | 1 | 20 | 1 | 5 | 1 | 10 |
| Inventive Example | 70 | 1 | 1 | 50 | 1 | 50 | 8 | 25 | 1 | 20 | 1 | 5 | 1 | 10 |
| Inventive Example | 71 | 1 | 1 | 50 | 1 | 50 | 1 | 25 | 2 | 20 | 1 | 5 | 1 | 10 |
| Inventive Example | 72 | 1 | 1 | 50 | 1 | 50 | 1 | 25 | 3 | 20 | 1 | 5 | 1 | 10 |
| Inventive Example | 73 | 1 | 1 | 50 | 1 | 50 | 1 | 25 | 4 | 20 | 1 | 5 | 1 | 10 |
| Inventive Example | 74 | 1 | 1 | 50 | 1 | 50 | 1 | 25 | 1 | 20 | 2 | 5 | — | 0 |
| Inventive Example | 75 | 1 | 1 | 50 | 1 | 50 | 1 | 25 | 1 | 20 | 3 | 5 | — | 0 |
| Inventive Example | 76 | 1 | 1 | 50 | 1 | 50 | 1 | 25 | 1 | 20 | 4 | 5 | — | 0 |
| Inventive Example | 77 | 1 | 1 | 50 | 1 | 50 | 1 | 25 | 1 | 20 | 5 | 5 | — | 0 |
| Inventive Example | 78 | 1 | 1 | 50 | 1 | 50 | 1 | 25 | 1 | 20 | 6 | 5 | — | 0 |
| Inventive Example | 79 | 1 | 1 | 50 | 1 | 50 | 1 | 25 | 1 | 20 | 7 | 5 | — | 0 |
| Inventive Example | 80 | 1 | 1 | 50 | 1 | 50 | 1 | 25 | 1 | 20 | 8 | 5 | — | 0 |
| Inventive Example | 81 | 1 | 1 | 50 | 1 | 50 | 1 | 25 | 1 | 20 | 9 | 5 | — | 0 |
| Inventive Example | 82 | 1 | 1 | 50 | 1 | 50 | 1 | 25 | 1 | 20 | 10 | 5 | — | 0 |
| Inventive Example | 83 | 1 | 1 | 50 | 1 | 50 | 1 | 25 | 1 | 20 | 11 | 5 | — | 0 |
| Inventive Example | 84 | 1 | 1 | 50 | 1 | 50 | 1 | 25 | 1 | 20 | 12 | 5 | — | 0 |
| Inventive Example | 85 | 1 | 1 | 50 | 1 | 50 | 1 | 25 | 1 | 20 | 13 | 5 | — | 0 |

TABLE 61

| Grouping | No. | Lubricant Type *8 | Lubricant Amount *9 | Film Thickness (μm) | Baking Temperature (° C.) | Film Appearance | White Rust Resistance (after 168 hours) | White Rust Resistance (after 192 hours) | White Rust Resistance after degreasing with alkali | Electro-conductivity | Paint Adhesiveness |
|---|---|---|---|---|---|---|---|---|---|---|---|
| Inventive Example | 69 | — | 0 | 1.0 | 140 | ○ | ○ | ○ | ○ | ○ | ◎ |
| Inventive Example | 70 | — | 0 | 1.0 | 140 | ○ | ○ | ○ | ○ | ○ | ◎ |
| Inventive Example | 71 | — | 0 | 1.0 | 140 | ○ | ○ | ○ | ○ | ○ | ◎ |
| Inventive Example | 72 | — | 0 | 1.0 | 140 | ○ | ◎ | ◎ | ◎ | ○ | ◎ |
| Inventive Example | 73 | — | 0 | 1.0 | 140 | ○ | ○ | ○ | ○ | ○ | ◎ |
| Inventive Example | 74 | — | 0 | 1.0 | 140 | ○ | ◎ | ◎ | ◎ | ○ | ◎ |
| Inventive Example | 75 | — | 0 | 1.0 | 140 | ○ | ◎ | ◎ | ◎ | ○ | ◎ |
| Inventive Example | 76 | — | 0 | 1.0 | 140 | ○ | ◎ | ◎ | ◎ | ○ | ◎ |
| Inventive Example | 77 | — | 0 | 1.0 | 140 | ○ | ◎ | ◎ | ◎ | ○ | ◎ |
| Inventive Example | 78 | — | 0 | 1.0 | 140 | ○ | ◎ | ◎ | ◎ | ○ | ◎ |
| Inventive Example | 79 | — | 0 | 1.0 | 140 | ○ | ◎ | ◎ | ◎ | ○ | ◎ |
| Inventive Example | 80 | — | 0 | 1.0 | 140 | ○ | ◎ | ◎ | ◎ | ○ | ◎ |
| Inventive Example | 81 | — | 0 | 1.0 | 140 | ○ | ◎ | ◎ | ◎ | ○ | ◎ |
| Inventive Example | 82 | — | 0 | 1.0 | 140 | ○ | ◎ | ◎ | ◎ | ○ | ◎ |
| Inventive Example | 83 | — | 0 | 1.0 | 140 | ○ | ◎ | ◎ | ◎ | ○ | ◎ |
| Inventive Example | 84 | — | 0 | 1.0 | 140 | ○ | ◎ | ◎ | ◎ | ○ | ◎ |
| Inventive Example | 85 | — | 0 | 1.0 | 140 | ○ | ◎ | ◎ | ◎ | ○ | ◎ |

TABLE 62

| Grouping | No. | Plated Steel Sheet *1 | Water-Dispersible Resin Type *2 | Water-Dispersible Resin Amount *9 | Aqueous Urethane Resin Dispersion Type *3 | Aqueous Urethane Resin Dispersion Amount *9 | Silane Coupling Agent Type *4 | Silane Coupling Agent Amount *9 | Phosphoric acid or Hexafluoro-Metal Acid Type *5 | Phosphoric acid or Hexafluoro-Metal Acid Amount *9 | Water-Soluble Inorganic Component Type *6 | Water-Soluble Inorganic Component Amount *9 | Chromium-Free Antirust Additive Type *7 | Chromium-Free Antirust Additive Amount *9 |
|---|---|---|---|---|---|---|---|---|---|---|---|---|---|---|
| Inventive Example | 86 | 1 | 1 | 50 | 1 | 50 | 1 | 25 | 1 | 20 | 1 | 5 | 2 | 10 |
| Inventive Example | 87 | 1 | 1 | 50 | 1 | 50 | 1 | 25 | 1 | 20 | 1 | 5 | 3 | 10 |
| Inventive Example | 88 | 1 | 1 | 50 | 1 | 50 | 1 | 25 | 1 | 20 | 1 | 5 | 4 | 10 |
| Inventive Example | 89 | 1 | 1 | 50 | 1 | 50 | 1 | 25 | 1 | 20 | 1 | 5 | 5 | 10 |
| Inventive Example | 90 | 1 | 1 | 50 | 1 | 50 | 1 | 25 | 1 | 20 | 1 | 5 | 1 | 10 |
| Inventive Example | 91 | 1 | 1 | 50 | 1 | 50 | 1 | 25 | 1 | 20 | 1 | 5 | — | 0 |
| Inventive Example | 92 | 1 | 1 | 50 | 1 | 50 | 1 | 25 | 1 | 20 | 1 | 5 | — | 0 |
| Comparative Example | 93 | 1 | 2 | 50 | 1 | 50 | 1 | 25 | 1 | 20 | 1 | 5 | — | 0 |
| Inventive Example | 94 | 1 | 1 | 50 | 2 | 50 | 1 | 25 | 1 | 20 | 1 | 5 | — | 0 |
| Inventive Example | 95 | 1 | 1 | 50 | 3 | 50 | 1 | 25 | 1 | 20 | 1 | 5 | — | 0 |
| Inventive Example | 96 | 1 | 1 | 50 | 4 | 50 | 1 | 25 | 1 | 20 | 1 | 5 | — | 0 |
| Inventive Example | 97 | 1 | 1 | 50 | 5 | 50 | 1 | 25 | 1 | 20 | 1 | 5 | — | 0 |
| Inventive Example | 98 | 1 | 1 | 50 | 6 | 50 | 1 | 25 | 1 | 20 | 1 | 5 | — | 0 |

TABLE 63

| Grouping | No. | Lubricant Type *8 | Lubricant Amount *9 | Film Thickness (μm) | Baking Temperature (° C.) | Film Appearance | White Rust Resistance (after 168 hours) | White Rust Resistance (after 192 hours) | White Rust Resistance after degreasing with alkali | Electro-conductivity | Paint Adhesiveness |
|---|---|---|---|---|---|---|---|---|---|---|---|
| Inventive Example | 86 | — | 0 | 1.0 | 140 | ○ | ◎ | ◎ | ◎ | ○ | ◎ |
| Inventive Example | 87 | — | 0 | 1.0 | 140 | ○ | ◎ | ◎ | ◎ | ○ | ◎ |
| Inventive Example | 88 | — | 0 | 1.0 | 140 | ○ | ◎ | ◎ | ◎ | ○ | ◎ |
| Inventive Example | 89 | — | 0 | 1.0 | 140 | ○ | ◎ | ◎ | ◎ | ○ | ◎ |
| Inventive Example | 90 | 2 | 10 | 1.0 | 140 | ○ | ◎ | ◎ | ◎ | ○ | ◎ |
| Inventive Example | 91 | — | 0 | upper layer*/lower layer = 0.5/0.5 | 140 | ○ | ◎ | ◎ | ◎ | ○ | ◎ |
| Inventive Example | 92 | — | 0 | 1.0 | 140 | ○ | ◎ | ◎ | ◎ | ○ | ◎ |
| Inventive Example | 93 | — | 0 | 1.0 | 140 | ○ | Δ | Δ | Δ | ○ | ◎ |
| Inventive Example | 94 | — | 0 | 1.0 | 140 | ○ | ◎ | ◎ | ◎ | ○ | ◎ |
| Inventive Example | 95 | — | 0 | 1.0 | 140 | ○ | ◎ | ◎ | ◎ | ○ | ◎ |

TABLE 63-continued

| | | Lubricant | | Film Thickness (μm) | Baking Temperature (°C.) | Properties | | | | | |
|---|---|---|---|---|---|---|---|---|---|---|---|
| | | | | | | Film Appearance | White Rust Resistance (after 168 hours) | White Rust Resistance (after 192 hours) | White Rust Resistance after degreasing with alkali | Electro-conductivity | Paint Adhesiveness |
| Grouping | No. | Type *8 | Amount *9 | | | | | | | | |
| Inventive Example | 96 | — | 0 | 1.0 | 140 | ◯ | ◎ | ◎ | ◎ | ◯ | ◎ |
| Inventive Example | 97 | — | 0 | 1.0 | 140 | ◯ | ◎ | ◎ | ◎ | ◯ | ◎ |
| Inventive Example | 98 | — | 0 | 1.0 | 140 | ◯ | ◎ | ◎ | ◎ | ◯ | ◎ |

*upper layer: organic resin film

Example 5

In samples 1 to 3 of the invention, used was a surface-treating composition that had been prepared by adding the silane coupling agent No. 1 in Table 3 and phosphoric acid to the aqueous epoxy resin dispersion No. 1 in Table 20. In the comparative sample, the aqueous epoxy resin dispersion No. 1 in Table 20 alone was used for the surface-treating composition. Concretely, the surface of the plated steel sheet No. 1 in Table 1 was degreased with alkali, washed with water, and dried, and the surface-treating composition was applied to it with a roll coater, and dried under heat at 140° C. to form thereon a surface treatment film having a thickness of 0.5 μm.

Thus obtained, the surface-treated steel sheet was tested according to a salt spray test (JIS Z 2371). Based on the time taken until the white rust area became 5%, the white rust resistance of each sample was evaluated according to the evaluation criteria mentioned below. The result is given in Table 64 along with the constitution of the surface-treating composition used.

◎: 168 hours or longer.
◯: from 96 hours to shorter than 168 hours.
◯—: from 72 hours to shorter than 96 hours.
Δ: from 24 hours to shorter than 72 hours.
X: shorter than 24 hours.

The surface-treated steel sheets, the samples 1 to 3 of the invention and the comparative sample were analyzed for the film structure, and the result is mentioned below. The condition for sample preparation and measurement is the same as that mentioned hereinabove.

Comparative Sample

An electromicroscopic picture (bright field image) of the cross section of the surface treatment film of the comparative sample is in FIG. 1. Since the surface treatment film of the comparative sample is the barrier layer alone of organic resin, its white rust resistance is unsatisfactory as in Table 64.

Sample 1 of the Invention

Figure 2:
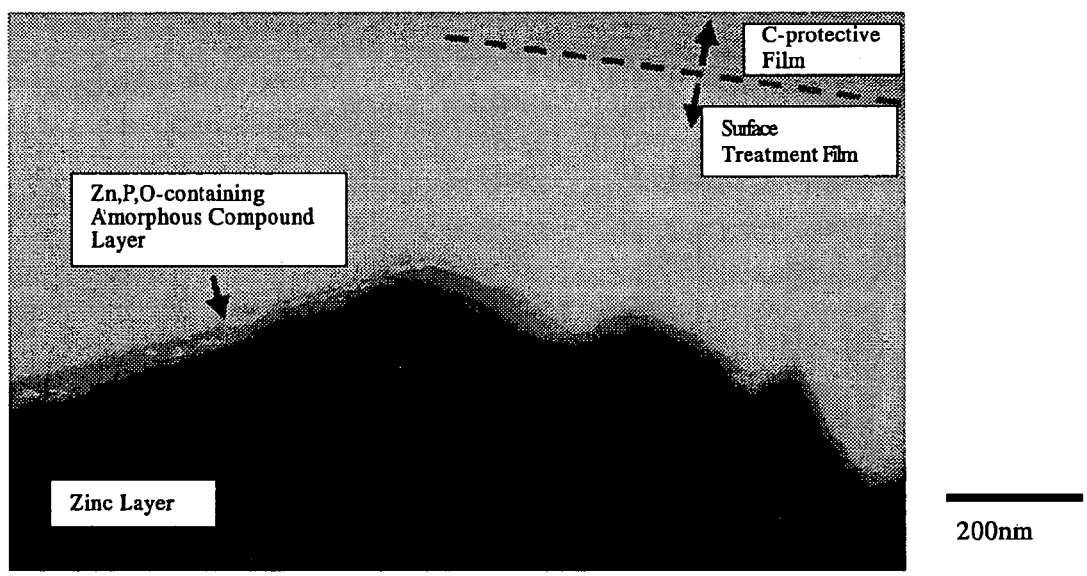
FIG. 2 is an enlarged electromicroscopic picture of the cross-section texture of the surface treatment film of a sample 1 of the invention in [Example 5].
Figure 3:
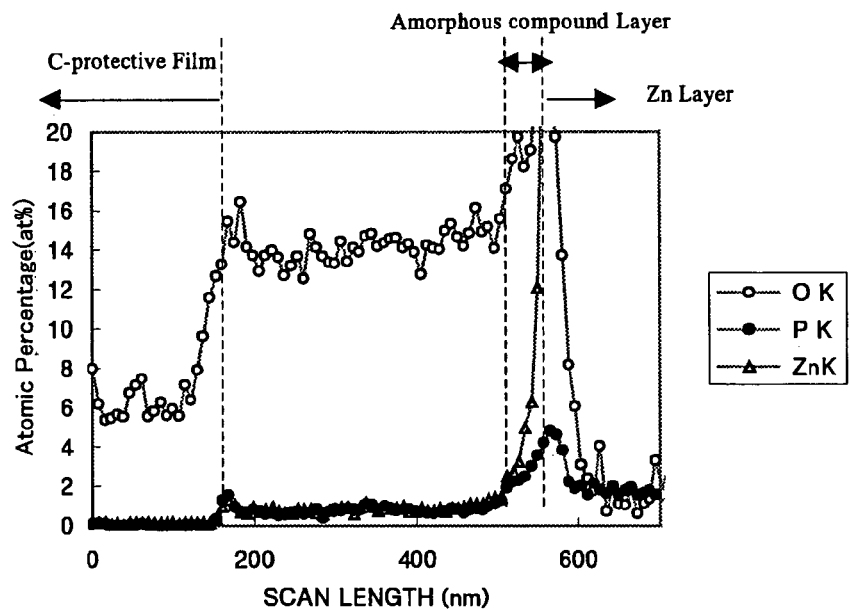
FIG. 3 is a graph showing the analytical data of the cross section of the surface treatment film of the surface-treated steel sheet of the sample 1 of the invention in [Example 5].
Figure 5:
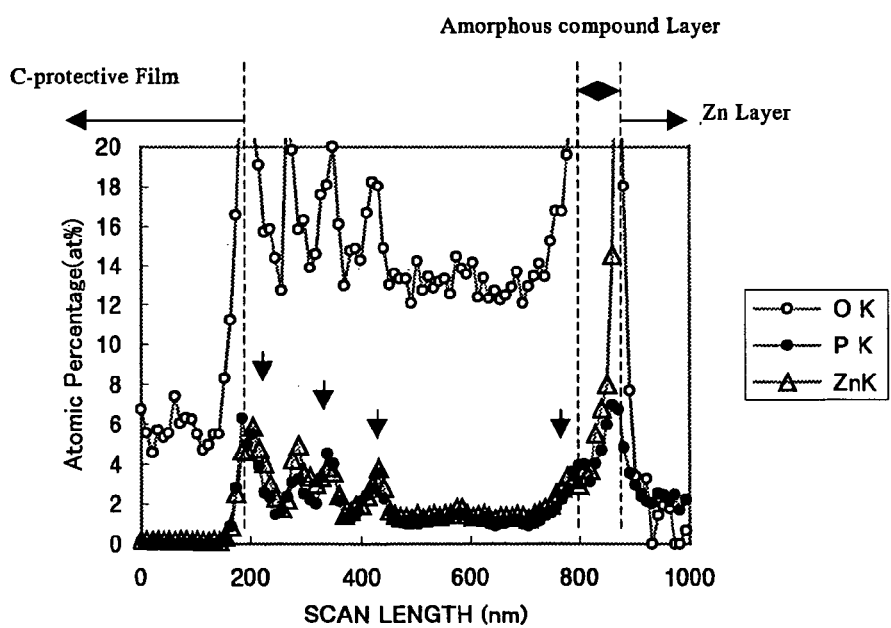
FIG. 5 is a graph showing the analytical data of the cross section of the surface treatment film of the surface-treated steel sheet of the sample 2 of the invention in [Example 5].
Figure 7:
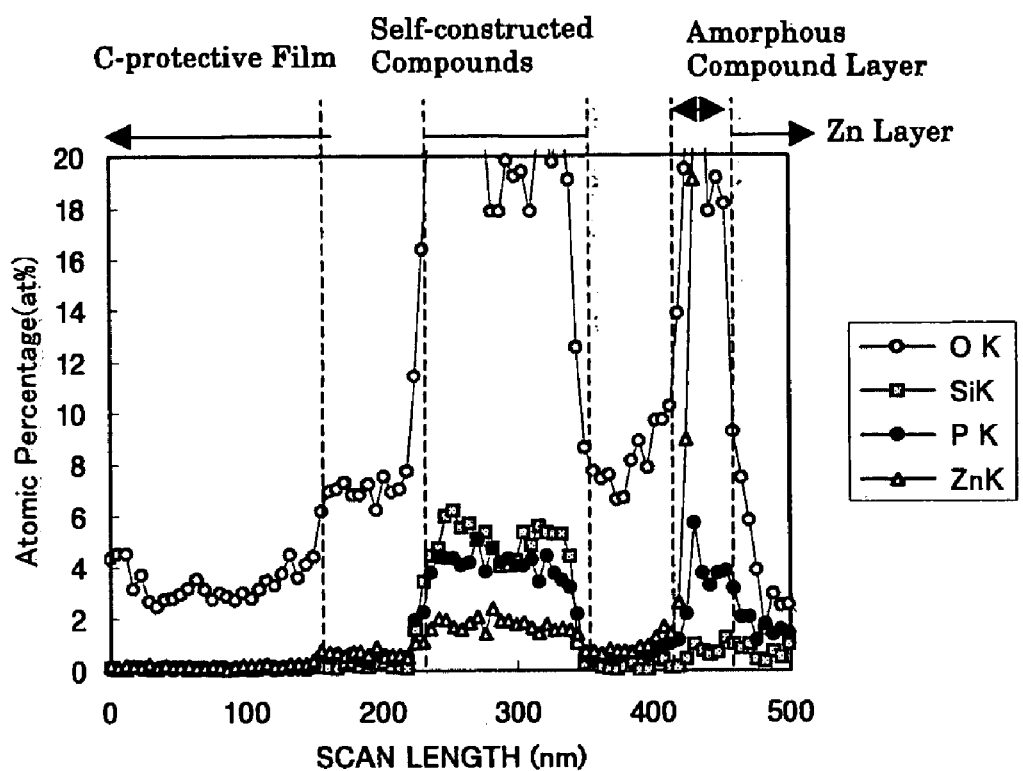
FIG. 7 is a graph showing the analytical data of the cross section of the surface treatment film of the surface-treated steel sheet of the sample 3 of the invention in [Example 5].

An electromicroscopic picture (bright field image) of the cross section of the surface treatment film of sample 1 of the invention is in FIG. 2; and the data of the composition analysis of the cross section of the film (line analysis: the vertical axis indicates the atomic percentage; since the C concentration is almost over-scale, its description is omitted; the same shall apply to FIG. 5 and FIG. 7 to be mentioned hereinunder.) is in FIG. 3. These confirm the formation of a surface treatment film in which the lower layer part is a compound layer (amorphous compound layer) containing P, Zn and O in the same molar ratio of Zn/P, and the upper layer part is an organic resin matrix layer. The electronic diffraction pattern shows that the compound layer is amorphous. In FIG. 3 (the same shall apply to FIG. 5 and FIG. 7 to be mentioned hereinunder), the reason why the ratio of Zn/P in the compound layer is away from the same molar ratio toward the Zn-rich side on the side of the zinc layer is because the probe diameter of the electron beam has a limited size (because the zinc plate layer and the compound layer are both within the probe diameter in the interface of compound layer/plate layer).

As in Table 64, the corrosion resistance of sample 1 of the invention is higher by at least 3 times than that of the comparative sample in terms of the time taken before the growth of white rust.

Sample 2 of the Invention

Figure 4:
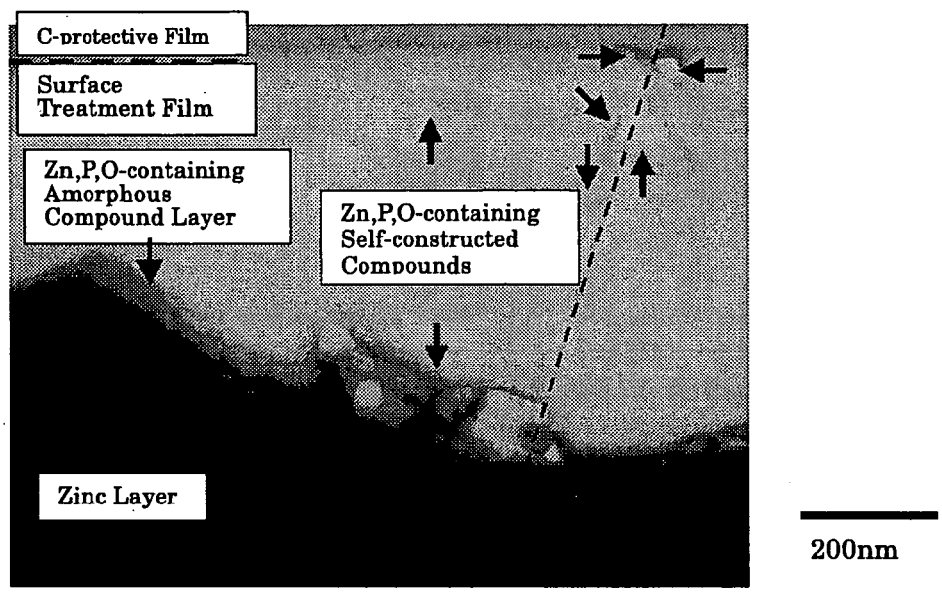
FIG. 4 is an enlarged electromicroscopic picture of the cross-section texture of the surface treatment film of a sample 2 of the invention in [Example 5].

An electromicroscopic picture (bright field image) of the cross section of the surface treatment film of sample 2 of the invention is in FIG. 4 (the arrows indicate the self-constructed compounds, and the inclined dotted line corresponds to the line analysis position in FIG. 5); and the data of the composition analysis of the cross section of the film (the downward arrows correspond to the position of the self-constructed compounds) is in FIG. 5. Like those for sample 1 of the invention, these confirm the formation of a compound layer (amorphous compound layer) containing P, Zn and O in the same molar ratio of Zn/P in the lower layer part of the surface treatment film. In addition, in sample 2 of the invention, a self-constructed compounds containing P, Zn and O are deposited in the surface treatment film. The electronic diffraction pattern shows that the compound layer and the self-constructed compounds are both amorphous.

As in Table 64, the corrosion resistance of sample 2 of the invention is higher by at least 4 times than that of the comparative sample in terms of the time taken before the growth of white rust.

Sample 3 of the Invention

Figure 6:
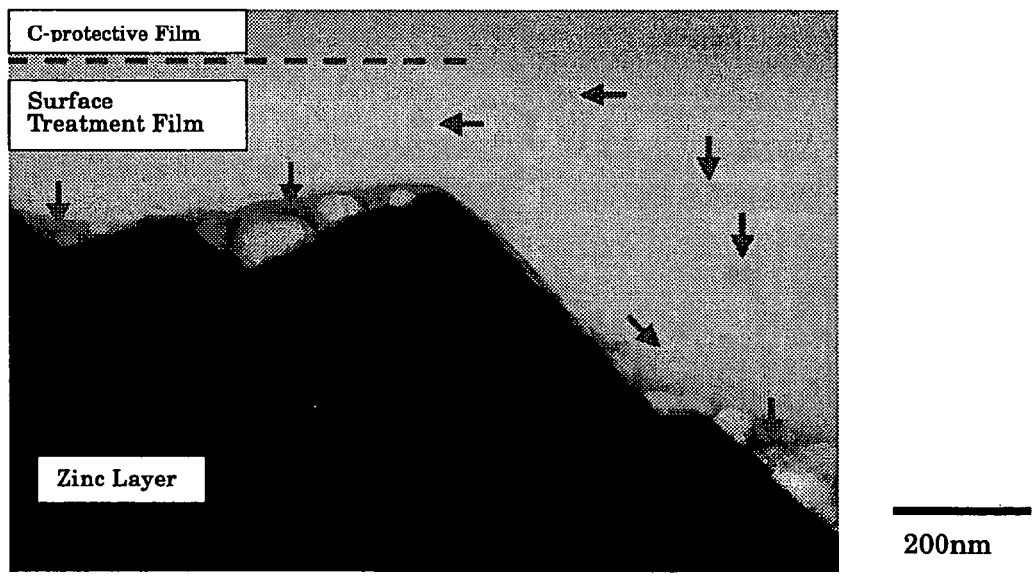
FIG. 6 is an enlarged electromicroscopic picture of the cross-section texture of the surface treatment film of a sample 3 of the invention in [Example 5].

An electromicroscopic picture (bright field image) of the cross section of the surface treatment film of sample 3 of the invention is in FIG. 6 (the arrows indicate the self-constructed compounds, and the inclined dotted line corresponds to the line analysis position in FIG. 7); and the data of the composition analysis of the cross section of the film (the downward arrows correspond to the position of the self-constructed compounds) is in FIG. 7. Like those for samples 1 and 2 of the invention, these confirm the formation of a compound layer (amorphous compound layer) containing P, Zn and O in the same molar ratio of Zn/P in the lower layer part of the surface treatment film. In addition, in sample 3 of the invention, self-constructed compounds containing Zn, P, Si and O is deposited in the surface treatment film. In the self-constructed compounds, the molar ratio of Zn/P, [Zn]/[P] is smaller than 1.0. The electronic diffraction pattern shows that the compound layer and the self-constructed compounds are both amorphous.

As in Table 64, the corrosion resistance of sample 3 of the invention is higher by at least 7 times than that of the comparative sample in terms of the time taken before the growth of white rust.

TABLE 64

| Grouping | Water-Dispersible Resin | | Silane Coupling Agent | | Phosphoric Acid or Hexafluoro-Metal Acid | | Film Thickness (μm) | White Rust Resistance |
|---|---|---|---|---|---|---|---|---|
| | Type *1 | Amount *4 | Type *2 | Amount *4 | Type *3 | Amount *4 | | |
| Comparative Sample | 1 | 100 | — | 0 | — | 0 | 0.5 | X |
| Sample 1 of the Invention | 1 | 100 | 1 | 1 | 1 | 5 | 0.5 | ◯— |
| Sample 2 of the Invention | 1 | 100 | 1 | 1 | 1 | 20 | 0.5 | ◯ |
| Sample 3 of the Invention | 1 | 100 | 1 | 25 | 1 | 20 | 0.5 | ◎ |

In Table 64, *1 to *4 mean the following:
*1: No. (water-dispersible resin) in Table 20.
*2: No (silane coupling agent) in Table 3.
*4: No. (phosphoric acid or hexafluoro-metal acid) in Table 4.
*4: part by mass.

INDUSTRIAL APPLICABILITY

The surface-treated steel sheet of the invention is usable, for example, as materials for automobiles, electric and electronic appliances for household use, constructions, etc.

The invention claimed is:

1. A surface-treated steel sheet of good white rust resistance, which is fabricated by applying a surface-treating composition that contains:
   (a) a water-dispersible resin and/or a water-soluble resin obtained through reaction of an epoxy group-containing resin (A) with an active hydrogen-containing compound (B) a part or all of which is an active hydrogen-containing hydrazine derivative,
   (b) a silane coupling agent, and
   (c) a phosphoric acid and/or a hexafluoro-metal acid, wherein the hydrazine derivative is at least one member selected from the group consisting of hydrazide compounds, pyrazole compounds, triazole compounds, tetrazole compounds, thiadiazole compounds and pyridadine compounds, the amount of the silane coupling agent is from 15 to 50 parts by mass relative to 100 parts by mass of the solid content of the organic resin, and the amount of the phosphoric acid and/or the hexafluoro-metal acid is from 5 to 50 parts by mass relative to 100 parts by mass of the organic resin, to a zinc-plated or aluminum-plated steel sheet followed by drying it to form thereon a surface treatment film having a thickness of from 0.02 to 5 μm.

2. A surface-treated steel sheet of good white rust resistance, which is fabricated by applying a surface-treating composition that contains:
   (a1) an aqueous epoxy resin dispersion of a modified epoxy resin dispersed in water, in which the modified epoxy resin is prepared by reacting an epoxy group-containing resin (A), an active hydrogen-containing compound (B) a part or all of which is an active hydrogen-containing hydrazine derivative, and a hydrophilic organic component (C),
   (b) a silane coupling agent, and
   (c) a phosphoric acid and/or a hexafluoro-metal acid, wherein the hydrazine derivative is at least one member selected from the group consisting of hydrazide compounds, pyrazole compounds, triazole compounds, tetrazole compounds, thiadiazole compounds and pyridadine compounds, the amount of the silane coupling agent is from 15 to 50 parts by mass relative to 100 parts by mass of the solid content of the organic resin, and the amount of the phosphoric acid and/or the hexafluoro-metal acid is from 5 to 50 parts by mass relative to 100 parts by mass of the organic resin, to a zinc-plated or aluminum-plated steel sheet followed by drying it to form thereon a surface treatment film having a thickness of from 0.02 to 5 μm.

3. A surface-treated steel sheet of good white rust resistance, which is fabricated by applying a surface-treating composition that contains:
   (a1) an aqueous epoxy resin dispersion of a modified epoxy resin dispersed in water, in which the modified epoxy resin is prepared by reacting an epoxy group-containing resin (A), an active hydrogen-containing compound (B) a part or all of which is an active hydrogen-containing hydrazine derivative, and a hydrophilic organic component (C),
   (b) a silane coupling agent,
   (c) a phosphoric acid and/or a hexafluoro-metal acid, and
   (d) an aqueous dispersion of an urethane resin, wherein the hydrazine derivative is at least one member selected from hydrazide compounds, pyrazole compounds, triazole compounds, tetrazole compounds, thiadiazole compounds and pyridadine compounds, the amount of the silane coupling agent is from 15 to 50 parts by mass relative to 100 parts by mass of the solid content of the organic resin, and the amount of the phosphoric acid and/or the hexafluoro-metal acid is from 0.1 to 80 parts by mass relative to 100 parts by mass of the organic resin, to a zinc-plated or aluminum-plated steel sheet followed by drying it to form thereon a surface treatment film having a thickness of from 0.02 to 5 μm.

4. The surface-treated steel sheet of good white rust resistance as claimed in claim 2 or 3, wherein the hydrophilic organic component (C) is a polyalkylene glycol-modified epoxy resin prepared by reacting a polyalkylene glycol having a number-average molecular weight of from 400 to 20000, a bisphenol-type resin, an active hydrogen-containing compound, and a polyisocyanate compound.

5. The surface-treated steel sheet of good white rust resistance as claimed in claim 2 or 3, wherein the hydrophilic organic component (C) is a primary amine compound and/or a secondary amine compound.

6. The surface-treated steel sheet of good white rust resistance as claimed in claim 1, 2 or 3, wherein the surface-treating composition further contains from 0.1 to 60 parts by mass, in terms of the solid content thereof and relative to 100 parts by mass of the solid content of the organic resin, of a water-soluble inorganic component.

7. The surface-treated steel sheet of good white rust resistance as claimed in claim 6, wherein the cation of the water-soluble inorganic component is one or more selected from Mg, Ca, Y, Ti, Zr, Nb, Zn, Mn, Co, Ni, Al, In, Ce and La and the anion thereof is one or more selected from nitrate, sulfate, acetate, carbonate, phosphate and chloride.

8. The surface-treated steel sheet of good white rust resistance as claimed in claim 1, 2 or 3, wherein the surface-treating composition further contains from 0.1 to 50 parts by mass, in terms of the solid content thereof and relative to 100 parts by mass of the solid content of the organic resin, of a chromium-free antirust additive.

9. The surface-treated steel sheet of good white rust resistance as claimed in claim 8, wherein the surface-treating composition contains at least one chromium-free antirust additives selected from the following (e1) to (e5):
 (e1) silicon oxide,
 (e2) calcium and/or calcium compounds,
 (e3) hardly-soluble phosphoric acid compounds,
 (e4) molybdic acid compounds,
 (e5) one or more, S atom-containing organic compounds selected from triazoles, thiols, thiadiazoles, thiazoles and thiurams.

10. The surface-treated steel sheet of good white rust resistance as claimed in claim 8, wherein the surface-treating composition contains calcium ion-exchanged silica as the chromium-free antirust additive.

11. The surface-treated steel sheet of good white rust resistance as claimed in claim 1, 2 or 3, wherein the surface-treating composition further contains from 1 to 50 parts by pass, in terms of its solid content and relative to 100 parts by mass of the solid content of the organic resin, of a solid lubricant.

12. The surface-treated steel sheet of good white rust resistance as claimed in claim 1, 2 or 3, wherein the surface-treating composition contains at least one silane coupling agent with a reactive functional amino group.

13. The surface-treated steel sheet of good white rust resistance as claimed in claim 1, 2 or 3, wherein the surface-treating composition contains at least one hexafluoro-metal acid with at least one or more elements selected from Ti, Si and Zr.

14. The surface-treated steel sheet of good white rust resistance as claimed in claim 1, 2 or 3, wherein the epoxy group-containing resin (A) is a bisphenol A-type epoxy resin having a number-average molecular weight of from 1500 to 10000 and an epoxy equivalent of from 150 to 5000.

15. The surface-treated steel sheet of good white rust resistance as claimed in claim 1, 2 or 3, wherein the aqueous epoxy resin dispersion further contains a curing agent that has a group capable of crosslinking with a hydroxyl group.

16. A surface-treated steel sheet of good white rust resistance, which has a surface treatment film formed on the surface of a zinc-plated or aluminium-plated steel sheet and in which the surface treatment film comprises an amorphous compound layer containing P, Zn and/or Al, and O, and an overlying organic resin matrix layer with a hydrazine derivative-modified epoxy group-containing resin or a hydrazine derivative-modified epoxy group-containing resin and an urethane resin as the matrix, and has a thickness of from 0.02 to 5 μm, wherein the surface treatment film is a film formed in one coating of a surface-treating composition, the amorphous compound layer and the organic resin matrix layer forming a layer having a profile of an inclined composition, the Zn and/or Al is derived from a plating film component, and the hydrazine derivative is at least one member selected from the group consisting of hydrazide compounds, pyrazole compounds, triazole compounds, tetrazole compounds, thiadiazole compounds and pyridadine compounds.

17. The surface-treated steel sheet of good white rust resistance as claimed in claim 16, wherein the surface treatment film further contains a silane compound.

18. The surface-treated steel sheet of good white rust resistance as claimed in claim 16 or 17, wherein the surface treatment film contains deposited compounds containing P, Zn and/or Al, and O.

19. The surface-treated steel sheet of good white rust resistance as claimed in claim 18, which has a surface treatment film on the surface of a zinc-plated steel sheet and in which the molar ratio of Zn to P in the deposited compounds in the surface treatment film, [Zn]/[P] falls between 0.8 and 1.4.

20. The surface-treated steel sheet of good white rust resistance as claimed in claim 18, which has a surface treatment film on the surface of a zinc-plated steel sheet and in which the molar ratio of Zn to P in the deposited compounds in the surface treatment film, [Zn]/[P] is smaller than 1.0.

21. The surface-treated steel sheet of good white rust resistance as claimed in claim 16 or 17, wherein the surface treatment film contains deposited compounds containing P, Zn and/or Al, Si, and O.

22. The surface-treated steel sheet of good white rust resistance as claimed in claim 21, which has a surface treatment film on the surface of a zinc-plated steel sheet and in which the molar ratio of Zn to P in the deposited compounds in the surface treatment film, [Zn]/[P] falls between 0.9 and 1.4.

23. The surface-treated steel sheet of good white rust resistance as claimed in claim 21, which has a surface treatment film on the surface of a zinc-plated steel sheet and in which the molar ratio of Zn to P in the deposited compounds in the surface treatment film, [Zn]/[P] is smaller than 1.0.

24. The surface-treated steel sheet of good white rust resistance as claimed in claim 16 or 17, which has a surface treatment film on the surface of a zinc-plated steel sheet and in which the molar ratio of Zn to P in the amorphous compound layer, [Zn]/[P] falls between 0.8 and 1.4.

25. The surface-treated steel sheet of good white rust resistance as claimed in claim 16 or 17, wherein the surface treatment film contains from 0.1 to 50 parts by mass, in terms of the solid content thereof and relative to 100 parts by mass of the solid content of the organic resin, of a chromium-free antirust additive.

26. The surface-treated steel sheet of good white rust resistance as claimed in claim 25, wherein the surface treatment film contains at least one chromium-free antirust additive selected from the following (e1) to (e5):
 (e1) silicon oxide,
 (e2) calcium and/or calcium compounds,
 (e3) hardly-soluble phosphoric acid compounds, (e4) molybdic acid compounds, (e5) one or more, S atom-containing organic compounds selected from triazoles, thiols, thiadiazoles, thiazoles and thiurams.

27. The surface-treated steel sheet of good white rust resistance as claimed in claim 26, wherein the surface treatment film contains calcium ion-exchanged silica as the chromium-free antirust additive.

28. The surface-treated steel sheet of good white rust resistance as claimed in claim 16 or 17, wherein the surface treatment film further contains from 1 to 50 parts by mass, in terms of its solid content and relative to 100 parts by mass of the solid content of the organic resin, of a solid lubricant.

29. The surface-treated steel sheet of good white rust resistance as claimed in claim 1, 2, 3, 16 or 17, wherein the surface treatment film has a thickness of from 0.02 µm to smaller than 5 µm, it is coated with an upper organic resin film having a thickness of from 0.02 µm to smaller than 5 µm, and the total thickness of the organic resin film and the surface treatment film is at most 5 µm.

30. A method for producing a surface-treated steel sheet of good white rust resistance, which comprises applying a surface-treating composition that contains:
(a) a water-dispersible resin and/or a water-soluble resin obtained through reaction of an epoxy group-containing resin (A) with an active hydrogen-containing compound (B) a part or all of which is an active hydrogen-containing hydrazine derivative,
(b) a silane coupling agent, and
(c) a phosphoric acid and/or a hexafluoro-metal acid, wherein the hydrazine derivative is at least one member selected from the group consisting of hydrazide compounds, pyrazole compounds, triazole compounds, tetrazole compounds, thiadiazole compounds and pyridadine compounds, the amount of the silane coupling agent is from 15 to 50 parts by mass relative to 100 parts by mass of the solid content of the organic resin, and the amount of the phosphoric acid and/or the hexafluoro-metal acid is from 5 to 50 parts by mass relative to 100 parts by mass of the organic resin, and has a controlled pH of from 0.5 to 6, onto the surface of a zinc-plated or aluminium-plated steel sheet, and not washing it with water, drying it under heat at an ultimate sheet temperature of from 50° C. to 300° C. to thereby form thereon a surface treatment film having a thickness of from 0.02 to 5 µm.

31. A method for producing a surface-treated steel sheet of good white rust resistance, which comprises applying a surface-treating composition that contains:
(a1) an aqueous epoxy resin dispersion of a modified epoxy resin dispersed in water, in which the modified epoxy resin is prepared by reacting an epoxy group-containing resin (A), an active hydrogen-containing compound (B) a part or all of which is an active hydrogen-containing hydrazine derivative, and a hydrophilic organic component (C),
(b) a silane coupling agent, and
(c) a phosphoric acid and/or a hexafluoro-metal acid, wherein the hydrazine derivative is at least one member selected from the group consisting of hydrazide compounds, pyrazole compounds, triazole compounds, tetrazole compounds, thiadiazole compounds and pyridadine compounds, the amount of the silane coupling agent is from 15 to 50 parts by mass relative to 100 parts by mass of the solid content of the organic resin, and the amount of the phosphoric acid and/or the hexafluoro-metal acid is from 5 to 50 parts by mass relative to 100 parts by mass of the organic resin, and has a controlled pH of from 0.5 to 6, onto the surface of a zinc-plated or aluminium-plated steel sheet, and not washing it with water, drying it under heat at an ultimate sheet temperature of from 50° C. to 300° C. to thereby form thereon a surface treatment film having a thickness of from 0.02 to 5 µm.

32. A method for producing a surface-treated steel sheet of good white rust resistance, which comprises applying a surface-treating composition that contains:
(a1) an aqueous epoxy resin dispersion of a modified epoxy resin dispersed in water, in which the modified epoxy resin is prepared by reacting an epoxy group-containing resin (A), an active hydrogen-containing compound (B) a part or all of which is an active hydrogen-containing hydrazine derivative, and a hydrophilic organic component (C),
(b) a silane coupling agent,
(c) a phosphoric acid and/or a hexafluoro-metal acid, and
(d) an aqueous dispersion of an urethane resin, wherein the hydrazine derivative is at least one member selected from the group consisting of hydrazide compounds, pyrazole compounds, triazole compounds, tetrazole compounds, thiadiazole compounds and pyridadine compounds, the amount of the silane coupling agent is from 15 to 50 parts by mass relative to 100 parts by mass of the solid content of the organic resin, and the amount of the phosphoric acid and/or the hexafluoro-metal acid is from 5 to 50 parts by mass relative to 100 parts by mass of the organic resin, and has a controlled pH of from 0.5 to 6, onto the surface of a zinc-plated or aluminium-plated steel sheet, and not washing it with water, drying it under heat at an ultimate sheet temperature of from 50° C. to 300° C. to thereby form thereon a surface treatment film having a thickness of from 0.02 to 5 µm.

33. A method for producing a surface-treated steel sheet of good white rust resistance, which comprises further forming an organic resin film on the surface of the surface treatment film of the surface-treated steel sheet obtained by the manufacturing method described in claim 30, 31 or 32, and in which the upper organic resin film has a thickness of from 0.02 µm to smaller than 5 µm, the lower surface treatment film has a thickness of from 0.02 µm to smaller than 5 µm, and the total thickness of the organic resin film and the surface treatment film is at most 5 µm.

* * * * *